United States Patent
Fujikawa et al.

(10) Patent No.: US 6,198,429 B1
(45) Date of Patent: Mar. 6, 2001

(54) RADAR AND LIKE SYSTEMS AND METHOD FOR IMPROVING IMAGE QUALITY

(75) Inventors: Takumi Fujikawa, Sanda; Motoji Kondo, Ashiya, both of (JP)

(73) Assignee: Furuno Electric Company, Limited, Hyogo-ken (JP)

( * ) Notice: Subject to any disclaimer, the term of this patent is extended or adjusted under 35 U.S.C. 154(b) by 0 days.

(21) Appl. No.: 09/328,498

(22) Filed: Jun. 9, 1999

(30) Foreign Application Priority Data

Jun. 9, 1998 (JP) ................................................. 10-160186
Jun. 9, 1998 (JP) ................................................. 10-160187

(51) Int. Cl.[7] ................................................................. G01S 7/298
(52) U.S. Cl. ........................... 342/176; 342/185; 342/179
(58) Field of Search .................................... 342/176, 179, 342/180, 181, 182, 183, 185, 186

(56) References Cited

U.S. PATENT DOCUMENTS

| | | | |
|---|---|---|---|
| 3,864,661 | 2/1975 | Ranalli | 367/11 |
| 4,383,258 | 5/1983 | Morin | 342/185 |
| 4,829,308 | * 5/1989 | Tol et al. | 342/185 |
| 4,833,475 | * 5/1989 | Pease et al. | 342/185 |
| 4,845,501 | * 7/1989 | Pease et al. | 342/185 |
| 5,157,406 | 10/1992 | Fujikawa et al. | 342/185 |
| 5,315,305 | * 5/1994 | Noll | 342/185 |
| 5,418,535 | * 5/1995 | Masucci | 342/185 |

FOREIGN PATENT DOCUMENTS

| | | |
|---|---|---|
| 0299666A2 | 1/1989 | (EP) . |
| 2169465 | 7/1986 | (GB) . |
| 2223640 | 4/1990 | (GB) . |

* cited by examiner

*Primary Examiner*—John B. Sotomayor

(57) ABSTRACT

The present invention provides a radar apparatus and like systems and method which comprise coordinate converting means for signals defined in a polar coordinate system to corresponding signals defined in Cartesian coordinate system, an image memory, and an indicator with pixels the number of which being the same as that of memory elements of the image memory, and further comprise means for drawing imaginary first and second sweep lines on pixels or memory elements of the image memory to determine a first sample point for a pixel on the second sweep line or to determine a last sample point for a pixel on the first sweep line, and perform a signal processing such as data correlation or interpolation in response to the detected last sample point or the first sample point detected so that displayed image quality is improved.

20 Claims, 36 Drawing Sheets

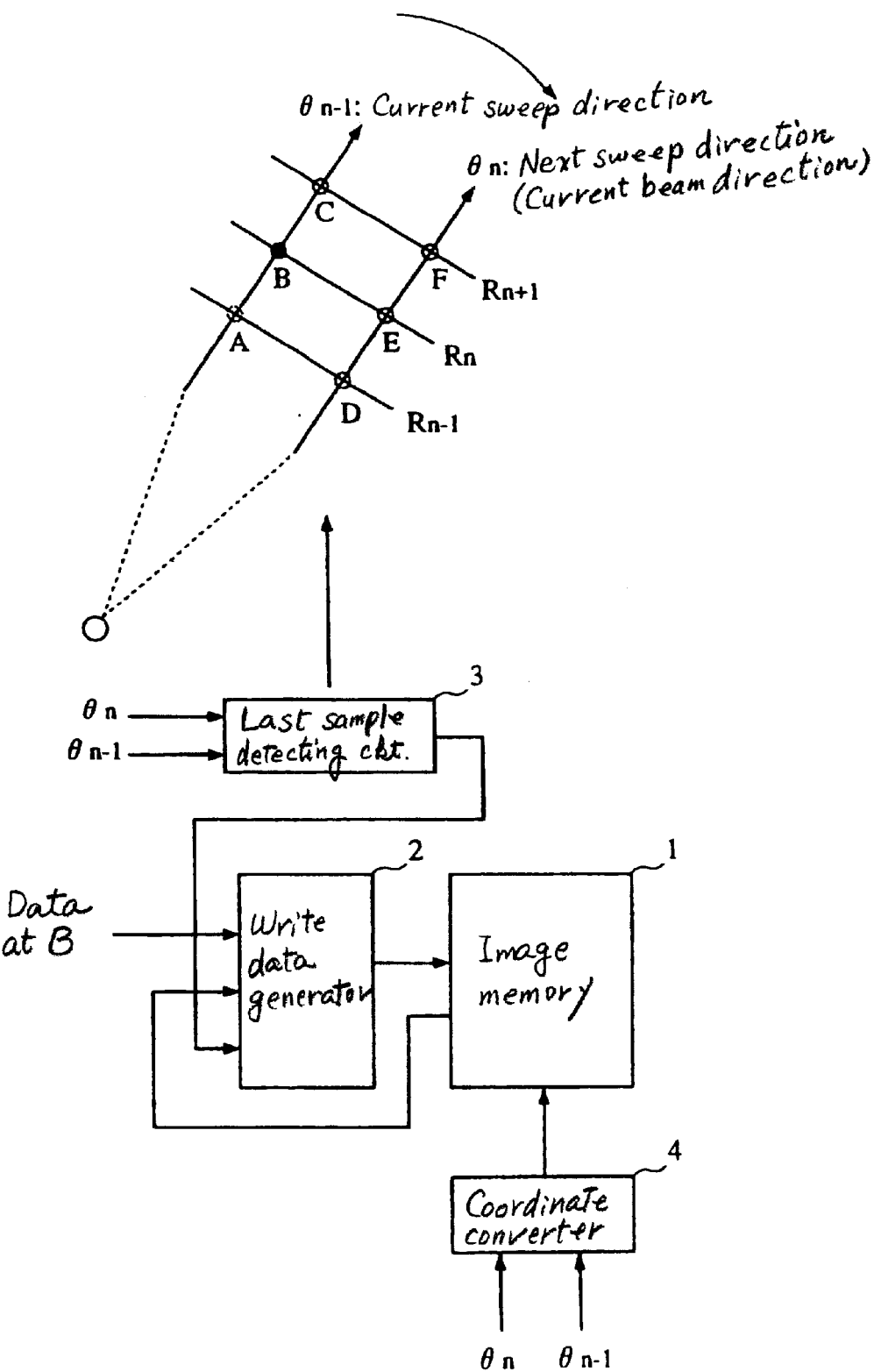

Fig. 8
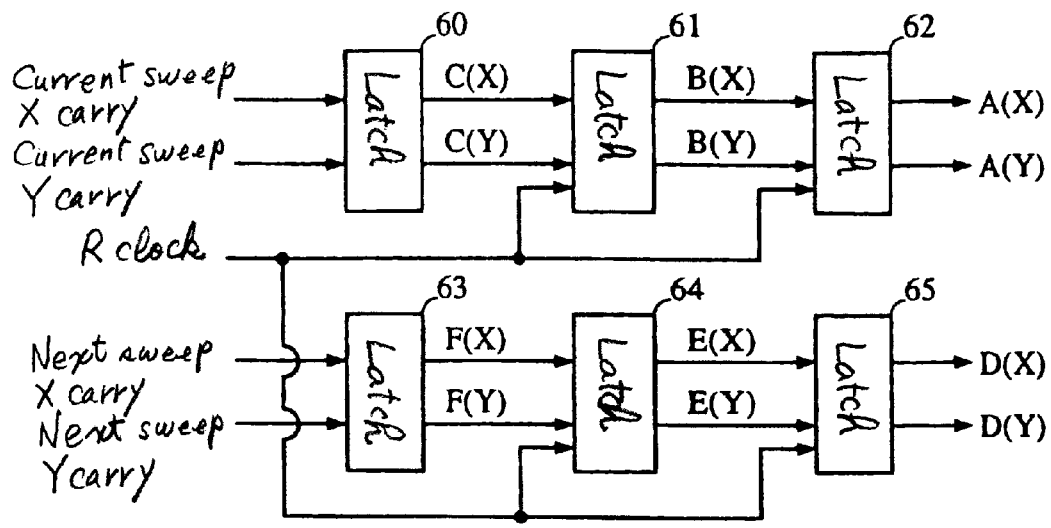
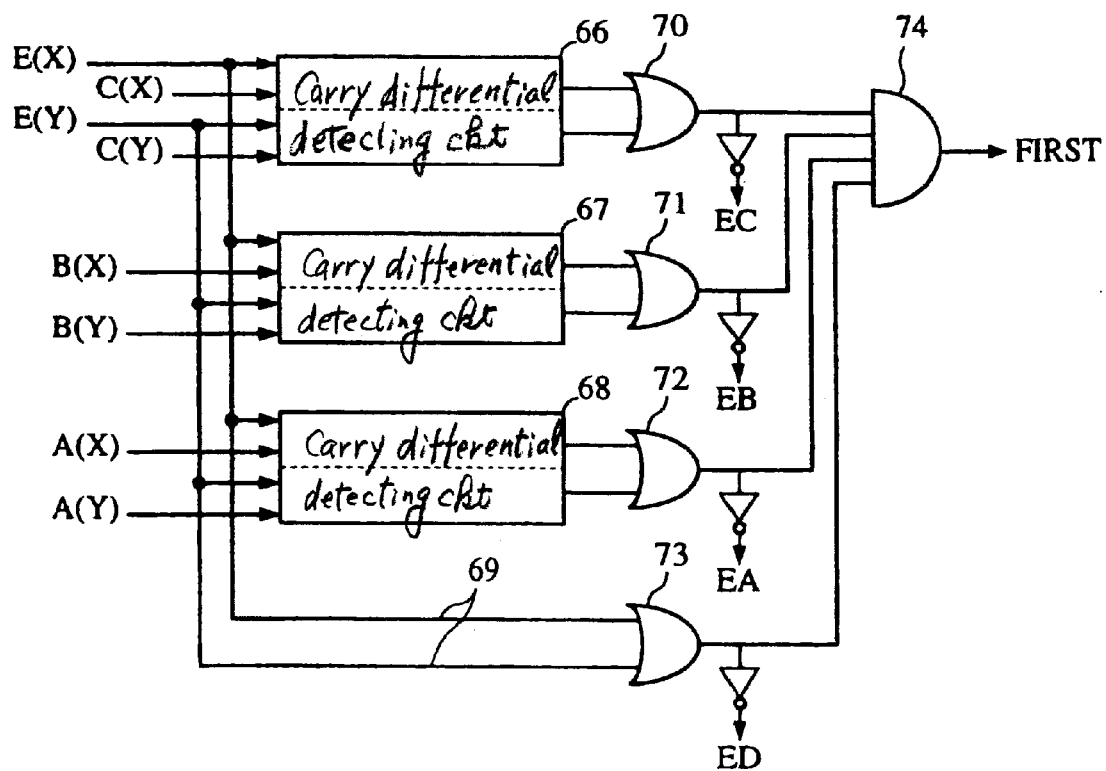

Fig. 25(A)
In Quadrant 0
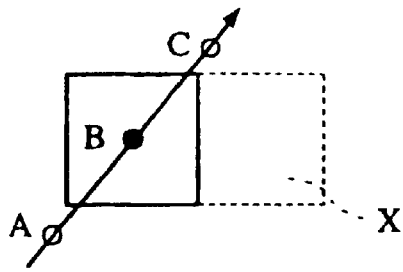
B To C
X carry
Y carry ⇒ Pixel dropout not apparent
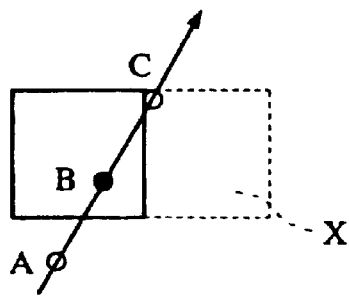
X carry
No Y carry ⇒ No pixel dropout
Fig. 25(B)
In Quadrant 1
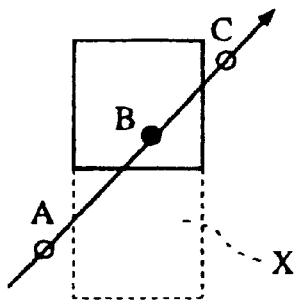
A To B
X carry
Y carry ⇒ Pixel dropout not apparent
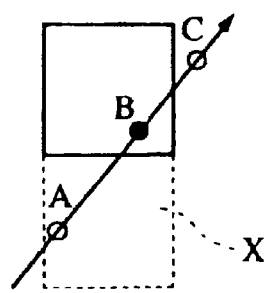
No X carry
Y carry ⇒ No pixel dropout

Fig. 26

| Quadrant | Clockwise | | | Counterclockwise | | |
|---|---|---|---|---|---|---|
| | Checkpoint | Condition for no pixel dropout | | Checkpoint | Condition for no pixel dropout | |
| 0 | C | X carry=1 | Y carry=0 | A | X carry=1 | Y carry=0 |
| 1 | A(carry occured?) | X carry=0 | Y carry=1 | C | X carry=0 | Y carry=1 |
| 2 | C | X carry=0 | Y carry=1 | A | X carry=0 | Y carry=1 |
| 3 | A(carry occured?) | X carry=1 | Y carry=0 | C | X carry=1 | Y carry=0 |
| 4 | C | X carry=1 | Y carry=0 | A | X carry=1 | Y carry=0 |
| 5 | A(carry occured?) | X carry=0 | Y carry=1 | C | X carry=0 | Y carry=1 |
| 6 | C | X carry=0 | Y carry=1 | A | X carry=0 | Y carry=1 |
| 7 | A(carry occured?) | X carry=1 | Y carry=0 | C | X carry=1 | Y carry=0 |

| Quadrant | Clockwise | | Counter-clockwise | |
|---|---|---|---|---|
| | X | Y | X | Y |
| ① $\theta_{n-1}$ | − | + | + | − |
| $\theta_n$ | + | − | − | + |
| ② $\theta_{n-1}$ | + | − | − | + |
| $\theta_n$ | − | + | + | − |
| ③ $\theta_{n-1}$ | − | + | + | − |
| $\theta_n$ | + | − | − | + |
| ④ $\theta_{n-1}$ | + | − | − | + |
| $\theta_n$ | − | + | + | − |

Type A

Type B

| Quadrant | Clockwise X | Interpolation direction Y |
|---|---|---|
| 0 | +1 | 0 |
| 1 | 0 | +1 |
| 2 | 0 | +1 |
| 3 | -1 | 0 |
| 4 | -1 | 0 |
| 5 | 0 | -1 |
| 6 | 0 | -1 |
| 7 | +1 | 0 |

| Counter-clockwise X | Interpolation direction Y |
|---|---|
| -1 | 0 |
| 0 | -1 |
| 0 | -1 |
| +1 | 0 |
| +1 | 0 |
| 0 | +1 |
| 0 | +1 |
| -1 | 0 |

RADAR AND LIKE SYSTEMS AND METHOD FOR IMPROVING IMAGE QUALITY

BACKGROUND OF THE INVENTION AND RELATED ART STATEMENT

The present invention relates to radar apparatuses, and like systems, in which a received echo signal originally formatted for a polar coordinate system is converted into an image signal for a Cartesian coordinate system and the image signal is stored in an image memory and then presented on a raster-scan display. The invention also relates to a method of writing the image signal in the image memory. Particularly, the invention relates to radar apparatuses and method which are capable of improving quality of displayed images.

One way to improve image quality is to use scan-to-scan correlation on received echo data.

In a system designed to convert received echo signals formatted for a polar coordinate system into signals for a Cartesian coordinate system and present the converted signals in raster-scan format, sampling points of an echo signal are densely distributed near the center of scanning, or sweep origin, and gradually become more sparse outward from the sweep origin as illustrated in FIG. 13. Accordingly, when the signal is converted into data for Cartesian coordinates (x, y), increasingly larger numbers of values of received data are allocated to pixels closer to the sweep origin, which corresponds to a central address in an image memory. If values of the received data for a particular pixel are simply written in succession over previously stored data in an memory element having a corresponding address in the image memory when more than one sampling point is allocated to that pixel, only the last written value will be finally preserved as effective data in the memory element for the pixel. This causes such a problem that when data having a high signal level is received halfway in the process of writing successive values for a single pixel, no information on the high-level signal is preserved in the image memory.

A known example of previous approaches directed to the solution of this problem is a maximum data sampling method, in which data having a maximum value among all received data for each pixel is written in a memory. In the maximum data sampling method, as disclosed in Japanese Examined Patent Publication Nos. 3-582 and 3-11669, for example, there is provided a first sample detecting circuit which detects a first access to an address corresponding to a specified pixel in the process of writing received data in an image memory. When the first sample detecting circuit has just detected the first sample allocated to a given pixel, the received data is written in the corresponding memory element. If newly received data is a second or later sample (and not the first sample) allocated to the pixel, a comparison is made between the previously written data and the newly received data, and the data whichever having a larger value is written in the same address, overwriting the existing data. This overwriting operation is repetitively carried out and, as a consequence, all the received data for each pixel are compared and the data having the maximum value is extracted and stored in the relevant memory element in the image memory.

Apart from the maximum data sampling method, radar systems usually employ a scan-to-scan correlation technique, in which echo signals derived from one antenna rotation after another are compared with each other, pixel to pixel, to eliminate unwanted signals, such as sea clutter. More specifically, a set of data obtained from the latest antenna rotation is compared with a set of data previously stored in a memory based on preceding antenna rotations, and data to be newly written in the memory is determined from this comparison. In one form of the correlation technique, the existing data derived from the preceding antenna rotations and the new data are simply averaged and mean values of the data thus obtained are written in the memory, overwriting the existing data. An example of the scan-to-scan correlation technique is disclosed in Japanese Examined Patent Publication No. 3-12266.

In a system employing the scan-to-scan correlation technique as described in the aforementioned Patent Publications, however, it is impossible to jointly employ the maximum data sampling method. Maximum data sampling and scan-to-scan correlation operations are performed by circuits having similar configurations because these operations have some similarity in that successively received data are compared and processed for each individual pixel. It is, however, impossible to simultaneously perform both of these operations by a single circuit. Even when two independent processing circuits are connected in series to carry out the two operations together, it is impossible to perform the scan-to-scan correlation operation using the data obtained by the maximum data sampling operation which is based simply on the detection of the first sample for each pixel, for reasons (1) and (2) explained below.

(1) Both the maximum data sampling operation and the scan-to-scan correlation operation determine values of data to be stored in a memory during each antenna rotation based on a comparison between existing data and newly received data as discussed above. However, the two operations differ in that the maximum data sampling operation, as applied to a radar system, for example, involves repetitive processing cycles which are conducted for each pixel every antenna rotation, whereas the scan-to-scan correlation operation involves only one processing cycle conducted for each pixel in one antenna rotation. It is therefore impossible to perform the two operations at the same time by a single circuit.

(2) In a case where maximum data sampling and scan-to-scan correlation circuits are separately provided and connected in series to successively perform the two operations, there arises another problem which is described below.

Since only one processing cycle is conducted for each pixel during each antenna rotation in the scan-to-scan correlation operation, it is necessary that data to be subjected to this operation be the data obtained as a result of the maximum data sampling operation performed for a given pixel. The data obtained by the maximum data sampling operation are simply written in succession in relevant memory elements in an image memory in the conventional maximum data sampling method and, therefore, it is not necessary in this process to know the timing of completion of the maximum data sampling operation for each pixel. For this reason, it has been impossible to perform the scan-to-scan correlation operation using the data obtained by the maximum data sampling operation even when these operations are carried out by separate processing circuits. Furthermore, the maximum data sampling circuit would require two image memories, which are expensive, to make it possible to perform the maximum data sampling and scan-to-scan correlation operations independently of each other, resulting in an uneconomical circuit configuration.

The other way to improve displayed image quality is to perform pixel data interpolation.

FIG. 41 is a block diagram showing a typical configuration of a conventional radar system.

While rotating at a specific rate in a horizontal plane, a radar antenna 201 transmits short bursts, or pulses, of radio waves at a specific pulse repetition rate and receives an echo signal reflected by targets. A receiver circuit 202 receives and amplifies the signal received by the antenna 201. An analog-to-digital (A/D) converter 203 converts an analog signal output from the receiver circuit 202 into a digital signal. A primary memory 204 stores A/D-converted data on received echoes for one radial sweep on a real-time basis and serves as a buffer which holds the data to be transferred to an image memory 207 until a new echo signal obtained from a next transmission from the antenna 201 is written. Since the data can not be transferred to the image memory 207 while it is being written into the primary memory 204 in real time, there is provided a secondary memory 205 between the primary memory 204 and the image memory 207 in some cases. In such cases, the data written into the primary memory 204 is immediately transferred to the secondary memory 205. The data is then sent from the secondary memory 205 to the image memory 207 while new data taken from the next transmission is written into the primary memory 204 in real time. A coordinate converter 206 gives an address of the image memory 207 corresponding to a pixel of a screen image by calculating its Cartesian coordinates (X, Y) from current beam direction $\theta$ as measured from a ship's heading, in which the antenna 201 is currently oriented, and the distance R of the pixel as measured from the sweep origin of the screen image. More specifically, the coordinate converter 206 is formed of a hardware device which can perform the following mathematical operations:

$$X = Xs + R \cdot \sin \theta$$

$$Y = Ys + R \cdot \cos \theta$$

where Xs: x-coordinate of sweep origin
　Ys: y-coordinate of sweep origin
　R: distance from sweep origin
　$\theta$: antenna direction The image memory 207 of FIG. 41 has a storage capacity to store the data received during one antenna rotation. An unillustrated display controller reads out the data content of the image memory 207 and outputs the same to a display 208 which is constructed essentially of a cathode ray tube (CRT) in synchronism with the scanning operation of the CRT.

The rotation speed, or angular velocity, of the antenna 201 and the pulse repetition frequency (PRF), or data input rate, are not synchronously controlled in most cases. While the rotation speed of the antenna 201 is typically set within a range of 12 to 60 rpm, the actual rotation speed can vary due to changes in air resistance or other conditions. On the other hand, the PRF typically falls within a range of several hundred to several thousand Hz. The PRF is set in several steps according to the choice of range scales. Specifically, high PRFs are used on short ranges while low PRFs are used on long ranges. Ideally, data on the screen image stored in the image memory 207 during one antenna rotation should be entirely updated with new data derived from a succeeding antenna rotation.

If, however, the rotation speed of the antenna 201 is high and the pulse repetition interval is long, and new data for a single sweep line is written into the image memory 207 after coordinate conversion operation performed every transmission of pulsed waves, it is impossible in certain cases to completely update the data for all pixels of the screen image in the image memory 207 during one antenna rotation. Therefore, the new data is usually written into the image memory 207 without any specific relationship in time, or synchronism, with the PRF. More specifically, although the data content of the primary memory 204 (or secondary memory 205) is immediately updated after each transmission, the updating of data for each sweep line stored in the image memory 207 is made by a predefined process including the steps of determining the direction of a sweep line from the beam direction, in which the antenna 201 was oriented at the time of transmission, reading out the data content of the primary memory 204 (or secondary memory 205), and writing the data for the relevant sweep line in the image memory 207. This process is repeatedly carried out for successive sweep lines to update the data on the complete screen image during one antenna rotation after another.

In this screen image updating process, there can arise a case where data derived from one sampling point is written into addresses of two or more adjacent pixels in the image memory 207. Contrary to this, there can also arise a case where a plurality of adjacent sampling points are allocated to a single pixel and different data derived from such sampling points are repetitively written into the address of the relevant pixel. In the latter case in which sampling points are allocated to the same pixel, only the last written data will be finally preserved in the address of the pixel if each successive data is simply written in the address, overwriting the previously written data. A conventional technique occasionally employed to avoid this inconvenience is a maximum data sampling method, in which data having a maximum value among all received data for each pixel is selectively written in its corresponding address.

Provided that the entire time can be used for the coordinate conversion operation, inequality (1) below must be satisfied in order that the updating of all the data in the image memory 207 is completed during one antenna rotation:

$$T \geq Tsweep \cdot N \quad (1)$$

where T: time required for one antenna rotation
　Tsweep: time required for coordinate conversion operation of data for one sweep line
　N: minimum number of sweep lines, or number of transmissions per antenna rotation, required for accessing all pixels of a screen image (N is proportional to R.)

Here, Tsweep is expressed as follows:

$$Tsweep = Rmax \cdot Tcyc \quad (2)$$

where Rmax: number of times the coordinate conversion operation is performed per row
　Tcyc: time required for one coordinate conversion operation, which is restricted by circuit characteristics Rmax increases as N becomes larger. Assuming that Rmax is proportional to N, $$N = k \cdot Rmax \quad (3)$$

where k: constant of proportionality

From the foregoing discussion, we obtain the following inequality:

$$T \geq Rmax \cdot Rmax \cdot Tcyc \cdot k \quad (4)$$

There is growing tendency in recent years to require high antenna rotation speeds to meet the requirements of high-speed vessels, as well as increased numbers of pixels to achieve improved display quality. If the inequality (4) is not satisfied, some pixels will not be accessed in one antenna rotation, causing "pixel dropouts", or the number of pixels will be limited. More specifically, Rmax becomes larger when the number of pixels is increased to improve the picture quality. Then, the antenna rotation speed at which all the pixels can be accessed in one antenna rotation will be decreased in proportion to the square of Rmax. When the antenna rotation speed is determined, an upper limit of the number of pixels which does not cause pixel dropouts is automatically determined.

There are two causes of pixel dropouts which are explained below. Although the direction $\theta_n$ of the sweep line changes in discrete steps in actuality, it is assumed here that the direction $\theta_n$ varies continuously, taking arbitrary values.

CAUSE 1

The first cause of the pixel dropout is that the distance between any two successive sweep lines increases in proportion to the distance from the sweep origin.

Referring to FIG. 42, a precondition for avoiding the occurrence of the pixel dropout due to its first cause is discussed below.

It is assumed that each pixel is square-shaped and its one side in the radial direction has unit length 1 (=1/Rmax) while its one side in the tangential direction has the same unit length 1. To ensure that at least one sweep line bisects any pixel of the screen image, there should be a relationship expressed by inequality (5) below between the distance R from the sweep origin and the minimum number N of sweep lines.

Because $R\theta \leq 1$ (where $\theta = 2\pi/N$), $$N \geq 2\pi R \qquad (5)$$

If Rmax=256, for example, the minimum number N of sweep lines per antenna rotation for avoiding the pixel dropout is N=1608.

CAUSE 2

Even when the precondition for avoiding the pixel dropout due to the aforementioned first cause is satisfied, a pixel dropout can occur should there exist a geometric relationship as illustrated in FIG. 43 between a particular pixel and two successive sweep lines.

In this case, there is a relationship expressed by the following inequality between the distance R from the sweep origin and the angle $\theta$ between the two sweep lines.

$$R\theta \leq \sqrt{2} - 1 \qquad (6)$$

Thus, $$N \geq 2\pi R/(\sqrt{2}-1) \qquad$$

The pixel dropout of this case is not caused by the fact that the distance between successive sweep lines increases outward from the sweep origin. The minimum number N of sweep lines per antenna rotation for avoiding this kind of pixel dropout is 2.4 times that for avoiding the pixel dropout due to the first cause.

If Rmax =256, for example, the minimum number N of sweep lines per antenna rotation for avoiding the pixel dropout due to this second cause is N=1608/($\sqrt{2}$-1)=3882.

Previous approaches to the solution of the aforementioned pixel dropout problem are found in Japanese Examined Patent Publication No. 6-19429 and Japanese Unexamined Patent Publication No. 9-318729, for example.

In a system according to the approach disclosed in Japanese Examined Patent Publication No. 6-19429, beam directions $\theta_n$ in which the antenna 201 is oriented and transmits pulsed waves are grouped into odd-numbered and even-numbered directions and pixels on sweep lines in the odd-numbered and even-numbered beam directions are separately accessed to update the complete screen image with two successive antenna rotations.

A system according to the approach disclosed in Japanese Unexamined Patent Publication No. 9-318729 has, in addition to a primary image memory, an unaccessed pixel identification memory which has the same address structure as the primary image memory. The system identifies pixels which have not been accessed during coordinate conversion operation and stores locations of such pixels in the unaccessed pixel identification memory. When image data is output from the image memory to a display, the data content of the unaccessed pixel identification memory is read out simultaneously, and if there are any unaccessed pixels, image data stored for adjacent pixels preceding the unaccessed pixels in time are read out from the image memory and the image data taken from the adjacent pixels are inserted, or interpolated, into the unaccessed pixels to thereby avoid the pixel dropout.

Although the system of Japanese Examined Patent Publication No. 6-19429 has such advantages that the antenna rotation speed is doubled from that of the earlier-described primary radar system and the value of Rmax can be increased in relation to the antenna rotation speed, it is associated with the following problems:

(a) The bearing discrimination of the screen image is deteriorated.

(b) It is impossible to update all pixels of the screen image in one antenna rotation.

(c) It is impossible to avoid pixel dropouts due to the first cause discussed with reference to FIG. 42.

Although the system of Japanese Unexamined Patent Publication No. 9-318729 has such advantages that the antenna rotation speed is doubled from that of the primary radar system and the value of Rmax can be increased in relation to the antenna rotation speed, it is associated with the following problems:

(d) The bearing discrimination of the screen image is deteriorated because the number of bearing data is intentionally halved to ensure that the pixels accessed would not change from one antenna rotation after another.

(e) Since the direction of data used for interpolation is determined by the rotating direction (or scanning direction) of the sweep line on the display, the interpolation is made in an unnatural fashion.

(f) This system requires the unaccessed pixel identification memory having a storage capacity for the data on the full-circle screen image in addition to the primary image memory, and this causes an increase in product cost.

SUMMARY OF THE INVENTION

An object of the present invention is to provide a radar apparatus and like systems and method which are capable of improving displayed image quality.

Another object of the invention is to provide a radar apparatus and like systems and method which comprise coordinate converting means for signals defined in a polar coordinate system to corresponding signals defined in Cartesian coordinate system, an image memory, and an indicator with pixels the number of which being the same as that of memory elements of the image memory, and which are capable of improving quality of images displayed on the screen of the indicator.

Another object of the invention is to provide a radar apparatus and like systems and method which comprise coordinate converting means for signals defined in a polar coordinate system to corresponding signals defined in Cartesian coordinate system, an image memory, and an indicator with pixels the number of which being the same as that of memory elements of the image memory, and which further comprise means for drawing imaginary first and second sweep lines on pixels or memory elements of the image memory to determine a last sample point for a pixel on the first sweep line and means for performing signal processing in response to the detected last sample point so that displayed image quality is improved.

Another object of the invention is to provide a radar apparatus and like systems and method which comprise coordinate converting means for signals defined in a polar coordinate system to corresponding signals defined in Cartesian coordinate system, an image memory, and an indicator with pixels the number of which being the same as that of memory elements of the image memory, and which further comprise means for drawing imaginary first and second sweep lines on pixels or memory elements of the image memory to determine a first sample point for a pixel on the second sweep line or to determine a last sample point for a pixel on the first sweep line, and perform a signal processing such as data correlation or interpolation in response to the detected first sample point or the second sample point detected so that displayed image quality is improved.

Another object of the invention is to provide a radar apparatus and like systems and method which comprise coordinate converting means for signals defined in a polar coordinate system to corresponding signals defined in Cartesian coordinate system, an image memory, and an indicator with pixels the number of which being the same as that of memory elements of the image memory, and which further comprise means for drawing imaginary first and second sweep lines on pixels or memory elements of the image memory to determine a first sample point for a pixel on the second sweep line, and perform an interpolation processing to provide a dropout pixel with a signal so that displayed image quality is improved.

Another object of the invention is to provide a radar apparatus and like systems or methods which are capable of simultaneously performing data extraction and scan-to-scan correlation operations with a simple circuit configuration.

Another object of the invention is to provide a radar apparatus and like systems or methods which are capable of detecting a dropout pixel and providing the dropout pixel with an interpolation signal so that quality of a displayed image is improved.

According to one aspect of the present invention, a radar or like system is comprised with an image memory for storing signals defined in a Cartesian coordinate system which are converted from corresponding signals defined in a polar coordinate system, means for drawing a first and a second sweep lines on pixels, means for detecting the last sample point on the first sweep line for a pixel, and means for performing correlation operation on the data having been stored in said image memory means and fresh input data when the last sample point is detected and for rewriting resultant correlation signals in the same memory element of the image memory means corresponding to the pixel for rotations of the antenna.

According to another aspect of the present invention, a radar or like system is comprised with, an antenna rotating at substantially constant speed, transmitting successively search signals and receiving echo signals in a direction corresponding to a second sweep line, an image memory for storing signals defined in a Cartesian coordinate system which are converted from corresponding signals defined in a polar coordinate system, means for drawing a first and the second sweep lines on pixels, means for detecting the first sample point on the second sweep line for a pixel, means for generating fresh data for the pixel when the first sample point is detected, means for detecting the last sample point on the first sweep line for a pixel, means for performing correlation operation on the data having been stored in said image memory means and fresh data when the last sample point is detected and for rewriting resultant correlation signals in the same memory element of the image memory means corresponding to the pixel for rotations of the antenna, and an indicator for displaying the data output from said image memory.

According to further aspect of the present invention, a radar or like system is comprised with an antenna rotating at substantially constant speed, transmitting successively search signals and receiving echo signals in a direction corresponding to a second sweep line, an image memory for storing signals defined in a Cartesian coordinate system which are converted from corresponding signals defined in a polar coordinate system, means for drawing a first and the second sweep lines on pixels, means for detecting the first sample point on the second sweep line for a pixel, means for generating fresh data for the pixel when the first sample point is detected, means for detecting the last sample point on the first sweep line for a pixel, means for performing correlation operation on the data having been stored in said image memory means and fresh data when the last sample point is detected and for rewriting resultant correlation signals in the same memory element of the image memory means corresponding to the pixel for rotations of the antenna, means for detecting a dropout pixel which is adjacent to the pixel to which the last sample point belongs when the last sample point is detected, means for providing an interpolation signal with the dropout pixel and writing the signal into a memory elements of said image memory, and an indicator for displaying the data output from said image memory.

One aspect of the invention will be first explained.

FIG. 1 is a diagram generally showing a circuit configuration for detecting a last sampling point and its working in a radar system according to the invention. Although the radar system is discussed below as a practical example, basically the same discussion applies to other systems, such as PPI sonars, which present image signals formatted for a Cartesian coordinate system obtained by converting received signals which are originally formatted for a polar coordinate system.

Referring to FIG. 1, $\theta_n$ indicates the current direction of a receiving beam formed by a radar antenna while $\theta_{n-1}$ indicates the direction in which a preceding receiving beam was produced. As will be understood from the following explanation, a sweep line on a radar screen is drawn, in the direction $\theta_{n-1}$ when the antenna is oriented in the direction $\theta_n$, so that the direction of the current sweep line for display corresponds to the preceding beam direction $\theta_{n-1}$. Likewise, the current beam direction $\theta_n$ will be the direction of a next sweep line.

Signals obtained from successive sampling points in each beam direction are processed one after another at the frequency of a clock signal R. A last sample detecting circuit 3 shown in FIG. 1 determines whether data derived from a given sampling point i in the preceding beam direction (current sweep direction) $\theta_{n-1}$ is a last sample allocated to a corresponding pixel. If the data taken from the sampling point i is the last sample for its corresponding pixel, later-described data having a maximum value among sampling points allocated to the pixel is sent to a write-data generator 2 as the data to be subjected to a scan-to-scan correlation operation. When a particular sampling point gives the last sample, the relevant sampling point defines a last access to the corresponding pixel, and this means that it is now possible to perform the scan-to-scan correlation operation for that pixel.

For the sake of the following explanation, a given sampling point i in the preceding beam direction (current sweep direction) $\theta_{n-1}$ is designated as point B and an immediately outer sampling point in the same sweep direction $\theta_{n-1}$ is designated as point C, as depicted in FIG. 1. Similarly, successive sampling points in the current beam direction (next sweep direction) $\theta_n$ are designated as points D, E and F in this order outward. Of the latter three successive sampling points D, E, F, the point E in the next sweep direction $\theta_n$ is located at the same distance from the sweep origin as the point B in the current sweep direction $\theta_{n-1}$, while the inner point D and the outer point F in the next sweep direction $\theta_n$ are immediately adjacent to the point E.

As will be described later in further detail, the necessary and sufficient condition for determining whether the point B is a last sampling point is satisfied by judging whether the point B and any of the four points C–F are allocated to a common pixel. Specifically, the necessary and sufficient condition for determining that the point B is a last sampling point is that the pixel to which the point B is allocated does not coincide with any of the pixels to which the points C–F are allocated. This judgment, hereinafter referred to as the last sample identification judgment, for the point B on the current sweep line (preceding beam direction $\theta_{n-1}$) is made when the antenna is oriented in the direction of the next sweep line (current beam direction $\theta_n$).

If the pixel to which the point B is allocated does not coincide with any of the pixels to which the points C–F are allocated, the point B is judged to be the last sampling point allocated its corresponding pixel. In this case, data having the maximum value among the sampling points allocated to the pixel to which the sampling point B is allocated can be subjected to the scan-to-scan correlation operation. In other words, it is possible to judge whether or not the point B is the last sampling point by making a last sample identification judgment for the point B on the current sweep line (preceding beam direction $\theta_{n-1}$) against the other points C–F when the antenna is oriented in the direction of the next sweep direction $\theta_n$, and if the point B is judged to be the last sampling point for its corresponding pixel, it is then possible to subject the data having the maximum value, which is already stored in a later-described extracted data memory 6a, to the scan-to-scan correlation operation.

In FIG. 1, the last sample detecting circuit 3 makes a judgment as to whether each sampling point on the preceding beam direction (current sweep direction) $\theta_{n-1}$ is a last sampling point in the aforementioned fashion and transmits the result of the judgment to the write-data generator 2. If the point B has been judged to be the last sampling point allocated to its corresponding pixel, for example, the write-data generator 2 performs a scan-to-scan correlation operation on the data having the maximum value for the pixel held in the extracted data memory 6a and existing data previously stored in an image memory 1 and the result of this correlation operation is written in the image memory 1, overwriting the previously stored data. If the point B is not the last sampling point, however, the write-data generator 2 rewrite the previously stored data in the image memory 1 so that its data contents remain unchanged.

Although it is possible to determine whether or not the point B is the last sampling point by making a last sample identification judgment for the point B against a desired number of properly selected nearby sampling points, the necessary and sufficient condition is satisfied by making a last sample identification judgment for the point B against the four points C–F shown in FIG. 1. The reason for this is that it is not necessary to make a last sample identification judgment for the point B against its immediately adjacent inner sampling point A in the preceding beam direction (current sweep direction) $\theta_{n-1}$ or against those sampling points located on the outside the point C, because the last sample identification judgment for individual sampling points on the same sweep line is successively made outward along the current sweep line. It is easily understood that if the pixel to which the point C is allocated does not coincide with the pixel to which the point B is allocated, no sampling point on the same sweep line swept after the point C is allocated to the same pixel as the point B. Further, it is not necessary to make a last sample identification judgment for the point B against any sampling point located on the inside of the point D or outside of the point F in the current beam direction (next sweep direction) $\theta_n$. This is because if the pixel to which the point F is allocated does not coincide with the pixel to which the point B is allocated, no sampling point in the current beam direction (next sweep direction) $\theta_n$ swept after the point F is allocated to the same pixel as the point B, and if the pixel to which the point D is allocated does not coincide with the pixel to which the point B is allocated, no sampling point in the current beam direction (next sweep direction) $\theta_n$ is allocated to the same pixel as the point B.

It is recognized from the above discussion that the aforementioned four sampling points are necessary and sufficient comparative sampling points for determining whether the point B is a last sampling point, the four sampling points including the point C immediately on the outside of the point B in the preceding beam direction (current sweep direction) $\theta_{n-1}$, the point E located at the same distance from the sweep origin as the point B but in the current beam direction (next sweep direction) $\theta_n$, and the points D and F located immediately on the inside and outside of the point E, respectively.

In the circuit configuration shown in FIG. 1, it is possible to determine whether or not data taken from a given sampling point i in the preceding beam direction (current sweep direction) $\theta_{n-1}$ is a last sample for the pixel to which the sampling point i is allocated when the antenna is oriented in the direction $\theta_n$, and if the data taken from the sampling point i is the last sample for the relevant pixel, data having the maximum value among sampling points allocated to the pixel is subjected to the scan-to-scan correlation operation.

A circuit configuration for performing a maximum data sampling operation when the antenna is oriented in the direction $\theta_n$ of the next sweep line is now described.

FIG. 2 shows the configuration of a maximum data sampling section.

The maximum data sampling section comprises a first sample detecting circuit 5 and a maximum data extracting circuit 6. The first sample detecting circuit 5 judges whether a given sampling point j in the current beam direction (next sweep direction) $\theta_n$ is a first sampling point which gives a first sample for a corresponding pixel. This judgment, hereinafter referred to as the first sample identification judgment, is made to identify the first sample allocated to each pixel.

The first sample identification judgment for the point E in the current beam direction (next sweep direction) $\theta_n$, for example, is made by judging whether the pixel to which the point E is allocated coincides with the pixel to which the point D in the same direction $\theta_n$ or any of the points A, B and C in the preceding beam direction (current sweep direction) $\theta_{n-1}$ is allocated. If none of the latter four points A–D is allocated to the pixel to which the point E is allocated, the point E is judged to be a first sampling point. On the other hand, if any of the four points A–D is allocated to the same pixel as the point E, the point E is not a first sampling point. As is the case with the detection of the last sampling point depicted in FIG. 1, the necessary and sufficient condition for determining whether the point E is the first sampling point is satisfied by judging whether or not the point E and any of the four points A–D shown in FIG. 2 are allocated to a common pixel.

The maximum data extracting circuit 6 obtains data having a maximum value for each pixel to which any of the sampling points in the current beam direction (next sweep direction) $\theta_n$ is allocated and stores the data in the extracted data memory 6a. Having a storage capacity corresponding to a single sweep line, the extracted data memory 6a stores the data having the maximum value for each pixel to which any of the sampling points in the current beam direction (next sweep direction) $\theta_n$ is allocated. The extracted data memory 6a serves also as a time-delay buffer whose storage capacity corresponds to one sweep line. It preserves the data having the maximum value obtained for each pixel to which any of the sampling points in the current beam direction (next sweep direction) $\theta_n$ is allocated until the last sample detecting circuit 3 of FIG. 1 detects the last sampling point for each pixel.

When the point E has been judged to be a first sampling point, new input data obtained from the point E is stored in the extracted data memory 6a. If, however, the point E is not the first sampling point for its corresponding pixel, the data obtained from the point E is compared with data previously stored for the corresponding pixel in the extracted data memory 6a, and the new or previously stored data, whichever having a larger value, is stored in the extracted data memory 6a. By repetitively performing this data storage operation, the extracted data memory 6a maintains data having the maximum value for each pixel.

As thus far described, the maximum data sampling operation is performed for each pixel in the current beam direction (next sweep direction) $\theta_n$ while the last sample detecting circuit 3 performs the last sample identification judgment to determine whether each sampling point in the preceding beam direction (current sweep direction) $\theta_{n-1}$ is a last sampling point allocated to its corresponding pixel. It is recognized from the foregoing discussion that the scan-to-scan correlation operation for the current sweep line, which is oriented in the preceding beam direction $\theta_{n-1}$, is performed based on the results of the maximum data sampling operation and last sample identification judgment performed for the sampling points in the preceding beam direction $\theta_{n-1}$ when the antenna is oriented in the next sweep direction $\theta_n$.

Another aspect of the invention will be explained below.

FIG. 14 is a diagram generally showing a circuit configuration for carrying out a first method of pixel data interpolation and its working in a radar system in one form of the invention.

In FIG. 14, $\theta_n$ indicates the current direction of a receiving beam produced by a radar antenna while $\theta_{n-1}$ indicates the direction in which a preceding receiving beam was produced. As will be understood from the following discussion, a sweep line on a radar screen is drawn, in the direction $\theta_{n-1}$ when the antenna is oriented in the direction $\theta_n$, so that the direction of the current sweep line corresponds to the preceding beam direction $\theta_{n-1}$. Likewise, the current beam direction $\theta_n$ becomes the direction of a next sweep line.

Signals obtained from successive sampling points in each beam direction are processed one after another at the frequency of a clock signal R. A last sample detecting circuit 210 shown in FIG. 14 judges whether data derived from a given sampling point i in the preceding beam direction (current sweep direction) $\theta_{n-1}$ is a last sample allocated to a corresponding pixel. If the sampling point i has been judged to be a last sampling point for its corresponding pixel, its state of being the last sampling point is sent to a pixel dropout detector 211. In this case (i.e., the sampling point i is the last sampling point), the pixel dropout detector 211 judges whether a pixel adjacent in the scanning direction to the pixel to which the last sampling point i is allocated coincides with any of pixels to which sampling points adjacent to the sampling point i are allocated. If the judgment result is in the negative, the pixel dropout detector 211 concludes that no sampling point is allocated to the pixel adjacent in the scanning direction to the pixel to which the last sampling point i is allocated, whereby the occurrence of a pixel dropout is detected.

When the pixel dropout has been detected, an interpolation address generator 212 generates interpolation address of the relevant adjacent pixel, which should be interpolated. When the interpolation address has been generated, an image memory 213 interpolates the pixel designated by the interpolation address using data borrowed from a nearby pixel.

In the example shown in FIG. 14, the last sample detecting circuit 210 makes a judgment to determine whether point B on the current sweep line in the preceding beam direction $\theta_{n-1}$ is a last sampling point allocated to pixel X-1. This judgment, hereinafter referred to as the last sample identification judgment, is made on point C in the current sweep line as well as on points D–F on the next sweep line in the current beam direction $\theta_n$. As will be explained later, it is not necessary to make the last sample identification judgment on point A on the current sweep line. Since the pixel X-1 to which the point B is allocated does not coincide with any of pixels to which the points C–F are allocated in the example of FIG. 14, the point B is judged to be the last sampling point for the pixel X-1.

The pixel dropout detector 211 examines whether any of the pixels to which the points C–F are allocated coincides with pixel X which is adjacent in the scanning direction to the pixel X-1 to which the point B is allocated. Since none of the pixels to which the points C–F are allocated coincides with the pixel X adjacent to the pixel X-1 in the example of FIG. 14, the pixel dropout detector 211 judges that a pixel dropout occurs at the pixel X. In this situation, the interpolation address generator 212 generates the interpolation address of the pixel X which should be interpolated by using data borrowed from its adjacent pixel X-1. Upon receiving the interpolation address specifying the pixel X to be interpolated, the image memory 213 writes the data derived from the point B, or the data written in the pixel X-1, in the address of the pixel X.

The reason why it is necessary to make a last sample identification judgment for detecting pixel dropouts is as follows.

In an example shown in FIG. 15A, the point E in the current beam direction $\theta_n$ is found to be a sampling point allocated to the pixel X−1 after the point B in the preceding beam direction $\theta_{n-1}$ has been judged to be allocated to the same pixel X−1 so that the point B is not the last sampling point for the pixel X−1. Likewise, the point B is not the last sampling point for the pixel X−1 in an example shown in FIG. 15B either. It is apparent from these examples that it is impossible to judge whether a pixel dropout occurs at the pixel X unless the point B is the last sampling point for the pixel X−1.

FIG. 16 is a diagram generally showing a circuit configuration for carrying out a second method of pixel data interpolation and its working in a radar system according to the invention.

The circuit configuration of FIG. 16 includes a first sample detecting circuit 215 instead of the last sample detecting circuit 210 of FIG. 14. In the circuit configuration of FIG. 14, the last sample detecting circuit 210 determines whether the point B on the current sweep line in the preceding beam direction $\theta_{n-1}$ is a last sampling point, and if the point B is a last sampling point, the pixel dropout detector 11 examines whether a pixel dropout occurs at the pixel X. In the circuit configuration of FIG. 16, however, the first sample detecting circuit 215 determines whether the point E on the next sweep line in the current beam direction $\theta_n$ is a first sampling point allocated to pixel X+1, and if the point E is a first sampling point, the pixel dropout detector 211 examines whether any of the pixels to which five points A–D, F are allocated coincides with the pixel X which is adjacent to the pixel X+1 in the direction opposite to the scanning direction. If none of the pixels to which the five points A–D, F are allocated coincides with the pixel X adjacent to the pixel X+1, the pixel dropout detector 211 judges that a pixel dropout occurs at the pixel X.

The reason why the first sample detecting circuit 215 for making the aforementioned first sample identification judgment is required in the configuration of FIG. 16 is explained below with reference to FIG. 17.

In an example shown in FIG. 17, a sampling point other than the point E is found to be allocated to the pixel X+1 before the point E is judged to be allocated to the same pixel X−1 so that the point E is not the first sampling point for the pixel X+1. In this example, there is a possibility that a sampling point on a preceding sweep line $\theta_{n-2}$ has been allocated to the pixel X which is adjacent to the pixel X+1. It is therefore impossible to judge whether a pixel dropout occurs at the pixel X unless the point E is the first sampling point for the pixel X+1.

As is the case with the detection of the last sampling point depicted in FIG. 14, the necessary and sufficient condition for determining whether the point E is the first sampling point is satisfied by judging whether the point E and any of the four points A–D shown in FIG. 16 are allocated to a common pixel. This does not necessarily mean that the number of sampling points referenced in the first sample identification judgment for a given sampling point is not limited to four but more than four nearby sampling points may be referenced. Since the pixel X is interpolated using data borrowed from the adjacent pixel X−1 when the antenna is oriented in the direction $\theta_n$ of the next sweep line in the first method of pixel data interpolation depicted in FIG. 14, there is the need for a time-delay buffer having a storage capacity to preserve received signals for one sweep line. In the second method of pixel data interpolation depicted in FIG. 16, however, the pixel X is interpolated using data borrowed from the adjacent pixel X+1 in the current beam direction $\theta_n$. The second method of FIG. 16 has an advantage in that it does not require the time-delay buffer because the interpolation is made by using the data obtained from the current beam direction $\theta_n$.

It is reasonable to assume that pixel dropouts occur along the scanning direction, or between successive sweep lines. In analyzing how the pixel dropouts occur, the full-circle area is divided into eight sectors, numbered sector 0 to sector 7 clockwise as shown in FIG. 18. In the system of FIG. 14 employing the last sample detecting circuit 210, the point B and a pixel to be interpolated in each of the eight sectors are located as illustrated in FIG. 18, wherein solid arrows indicate a situation in which the receiving beam produced by the antenna rotates clockwise while broken arrows indicate a situation in which the receiving beam produced by the antenna rotates counterclockwise.

Here, it is assumed that the scanning direction is clockwise and both the preceding beam direction (current sweep direction) $\theta_{n-1}$ and the current beam direction (next sweep direction) $\theta_n$ lie in sector 0. If the Cartesian coordinates of the point B are (x, y), the Cartesian coordinates of the pixel at which a pixel dropout may occur are (x+1, y). If at least one of pixels to which five nearby sampling points A, C–F are allocated coincides with the pixel (x+1, y), the pixel dropout does not occur at the relevant pixel. In sector 1, given the Cartesian coordinates (x, y) of the point B, the Cartesian coordinates of the pixel at which a pixel dropout may occur are (x, y+1), wherein the positive end of the Y-axis is directed downward as illustrated. When a ship makes a quick turn to port (counterclockwise), the receiving beam produced by the antenna could possibly turn counterclockwise for a short moment although the antenna continuously rotates clockwise. The situation shown by the broken arrows of FIG. 18 occurs when the receiving beam rotates counterclockwise for such a reason.

According to the aforementioned methods of pixel data interpolation, the bearing discrimination of the screen image is not deteriorated because it is not necessary to decrease the number of beam directions $\theta_n$ in which the antenna is oriented and transmits pulsed waves. Further, it is possible to update all pixels of the screen image in one antenna rotation. Furthermore, it is possible to carry out the interpolation in a natural fashion because the interpolation is made along the scanning direction, or between successive sweep lines, without requiring an extra memory having a large storage capacity. Moreover, it is possible to increase the antenna rotation speed and scanning speed compared to similar systems of the prior art.

These and other objects, features and advantages of the invention will become more apparent upon reading the following detailed description in conjunction with the accompanying drawings.

BRIEF DESCRIPTION OF THE DRAWINGS

FIG. 8 is a block diagram of a first sample detecting circuit for the invention;

FIG. 18 is a diagram showing a geometric relationship between point B and a pixel to be interpolated in each of eight sector areas around the sweep origin;

FIGS. 25A and 25B are diagrams showing how a pixel dropout is detected based on a comparison of the point B against points A and C;

FIG. 26 is a chart showing how a pixel dropout is detected based on a comparison of the point B against the points A and C in individual sector areas;

FIGS. 36A and 36B show in which direction a pixel dropout should be interpolated depending on the location of a pixel to be interpolated and the scanning direction, wherein FIG. 23A is for clockwise scanning and FIG. 23B is for counterclockwise scanning.

DETAILED DESCRIPTION OF THE PREFERRED EMBODIMENTS OF THE INVENTION

Figure 3:
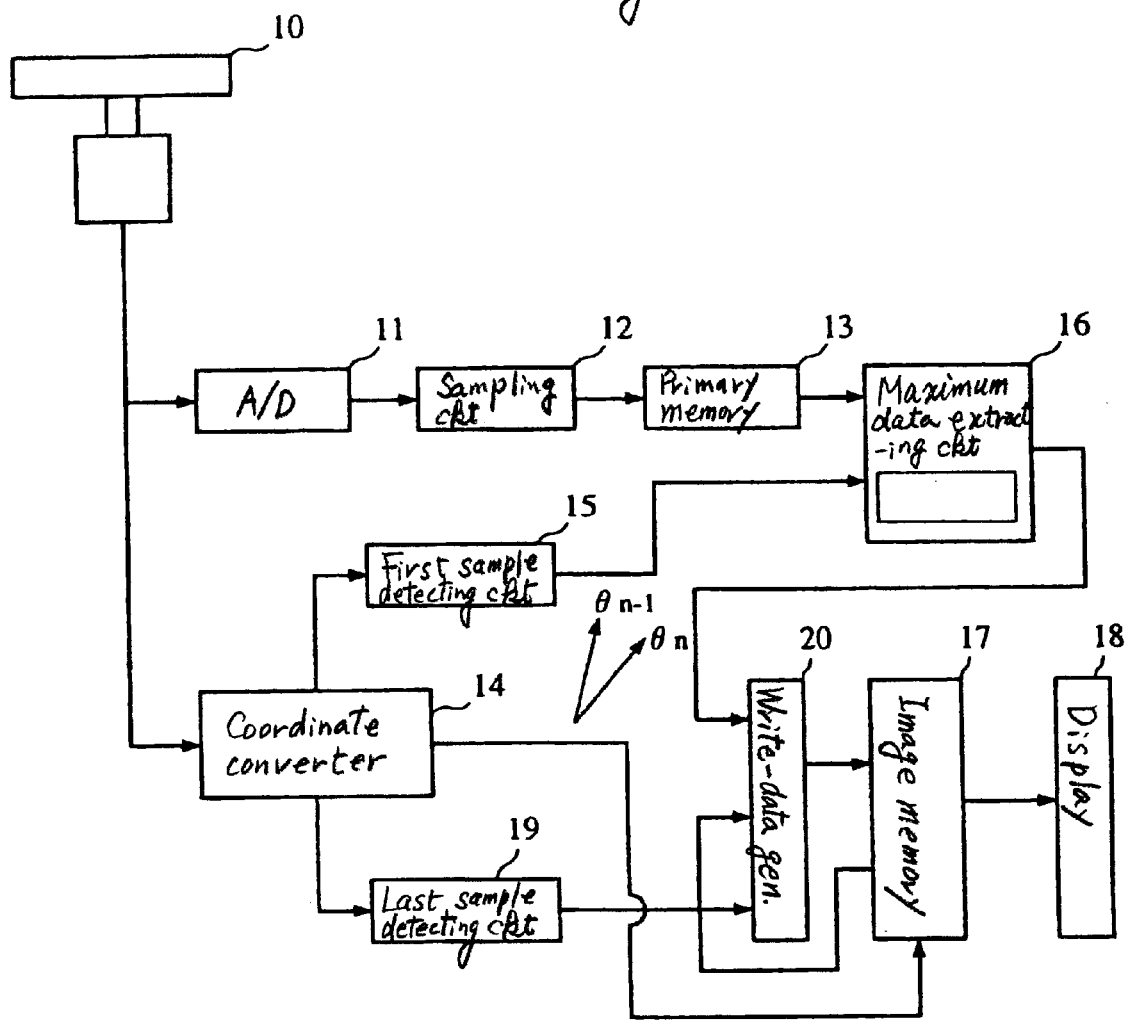
FIG. 3 is a block diagram of a radar system according to an embodiment of the invention.

FIG. 3 is a block diagram of a radar system according to a preferred embodiment of the invention.

An echo analog signal received by and fed from an antenna 10 is converted into digital values by an analog-to-digital (A/D) converter 11 and sampled by a sampling circuit 12 at a clock frequency determined in accordance with a range scale in use. Data obtained by this sampling operation for each radial sweep are stored in a primary memory 13 on a real-time basis. The primary memory 13 is provided since the sampling operation is carried out at a considerably high speed. It serves as a time-delay buffer which once stores the input data and introduces some time delays so that the data can be read out and written into an image memory 17 in a later stage with proper timing.

Although the originally received analog signal is formatted for a polar coordinate system, the image memory 17 requires an image signal formatted for a Cartesian coordinate system for presentation on a raster-scan display 18. For this reason, there is provided a coordinate converter 14 which converts polar coordinates (R, θ) into Cartesian coordinates (x, y). The coordinate conversion operation performed by the coordinate converter 14 is expressed by the following equations: X=R·sin θ, Y=R·cos θ.

A first sample detecting circuit 15 judges whether a given sampling point in a current beam direction (next sweep direction for display) $\theta_n$ is a first sampling point, or a second or later sampling point, allocated to a corresponding pixel in a manner previously described with reference to FIG. 2. The first sample detecting circuit 15 makes this first sample identification judgment based on carry pulses generated by the coordinate converter 14.

Figure 2:
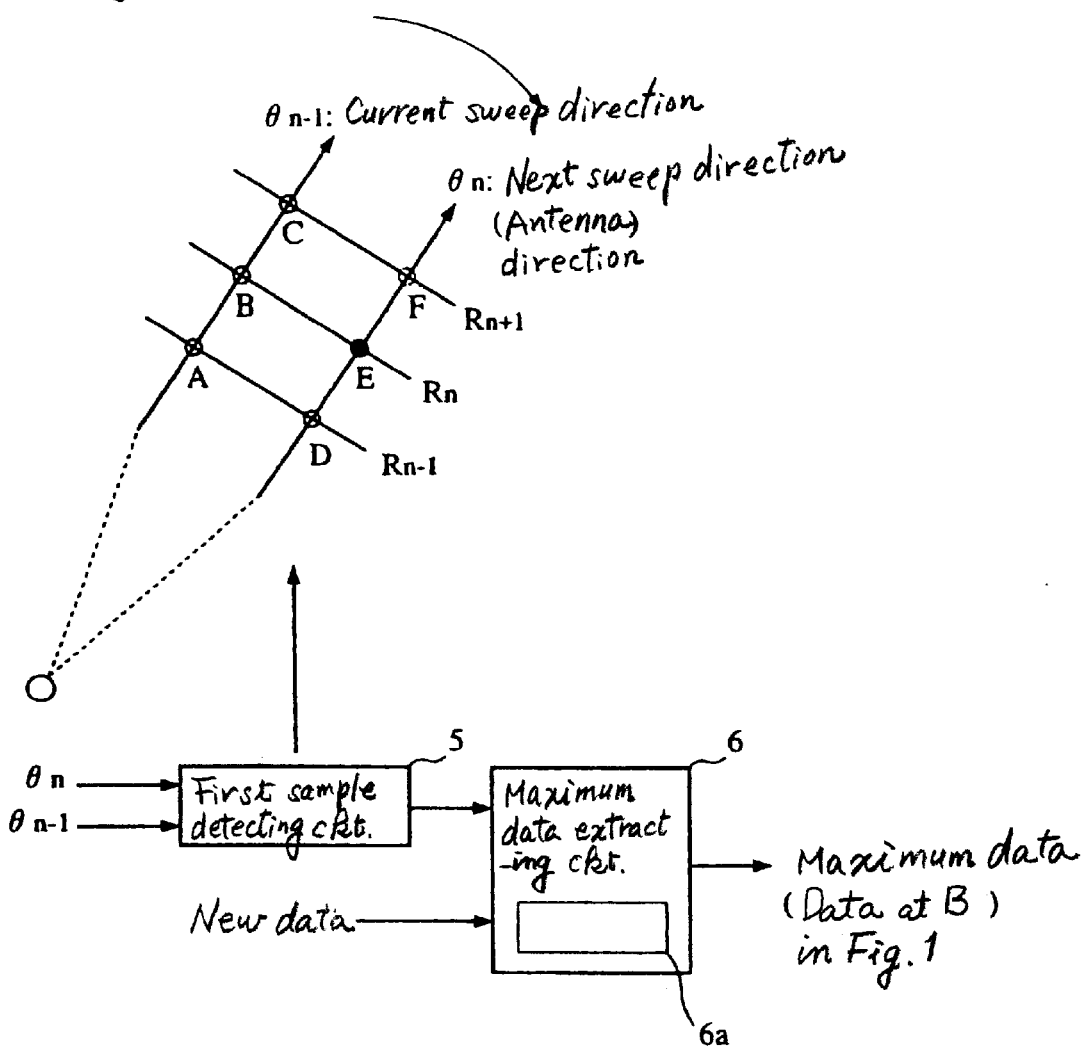
FIG. 2 is a diagram illustrating the operation of a maximum data sampling section comprising a first sample detecting circuit and a maximum data extracting circuit used for the present invention.

Like the maximum data extracting circuit 6 of FIG. 2, a maximum data extracting circuit 16 of FIG. 3 has an extracted data memory 100 (shown in FIG. 12) for storing data having a maximum value for each pixel on one complete sweep line. The maximum data extracting circuit 16 performs a maximum data sampling operation in the following manner. When the antenna 10 is oriented in the direction $\theta_{n-1}$ of FIG. 2, the extracted data memory 100 stores data having a maximum value for each pixel existing on a sweep line to be drawn in the direction $\theta_{n-1}$, and when the antenna 10 is oriented in the direction $\theta_n$ of FIG. 2, the extracted data memory 100 stores data having a maximum value for each pixel existing on a sweep line to be drawn in the direction $\theta_n$. Provided that the antenna 10 is currently oriented in the direction $\theta_n$ and a given sampling point in the preceding beam direction (current sweep direction) $\theta_{n-1}$ has been judged to be a last sampling point for a pixel to which the sampling point is allocated, the maximum data extracting circuit 16 outputs data having the maximum value for the same pixel stored in the extracted data memory 100 to a later-described write-data generator 20.

The image memory 17 stores image data for one complete screen image. Each time a scan-to-scan correlation operation is performed, the image data stored in the image memory 17 is read out and output to the write-data generator 20. Coordinates (x, y) specifying each address in the image memory 17 to be accessed are output from the coordinate converter 14. The display 18 presents the screen image in raster-scan format based on the image data stored in the image memory 17.

A last sample detecting circuit 19 judges whether each sampling point in the preceding beam direction (current sweep direction) $\theta_{n-1}$ is a last sampling point allocated to a corresponding pixel. When a particular sampling point on the preceding beam direction (current sweep direction) $\theta_{n-1}$ is judged to be a last sampling point, the write-data generator 20 reads out data having the maximum value for the relevant pixel from the extracted data memory 100 and compares the data having the maximum value with the image data for the same pixel fed back from the image memory 17 to thereby perform the scan-to-scan correlation operation. The result of the scan-to-scan correlation operation is written anew in an address in the image memory 17 corresponding to the relevant pixel, overwriting the previously stored image data.

In the above-described configuration, the maximum data extracting circuit 16 performs the maximum data sampling operation for each sampling point in the current beam direction (next sweep direction for display) $\theta_n$ while the last sample detecting circuit 19 makes a last sample identification judgment to determine whether each sampling point in the preceding beam direction (current sweep direction) $\theta_{n-1}$ is a last sampling point allocated to a corresponding pixel at the same time. When a particular sampling point on the current sweep line drawn along the preceding beam direction $\theta_{n-1}$ has been judged to be a last sampling point, the write-data generator 20 performs the scan-to-scan correlation operation for the pixel to which the sampling point is allocated and the data obtained as a result of the scan-to-scan correlation operation is written anew in the relevant address in the image memory 17. The display 18 reads out the data stored in the image memory 17 and presents the screen image at a high refresh rate which is set separately from the clock frequency for controlling the maximum data sampling and scan-to-scan correlation operations. The write-data generator 20 performs the scan-to-scan correlation operation once for any given pixel during every antenna rotation. Although the write-data generator 20 gives a mean value of the data previously stored in the image memory 17 and the new input data having the maximum value for each pixel in this embodiment, the scan-to-scan correlation operation may take other form of mathematical operation than averaging.

Figure 4:
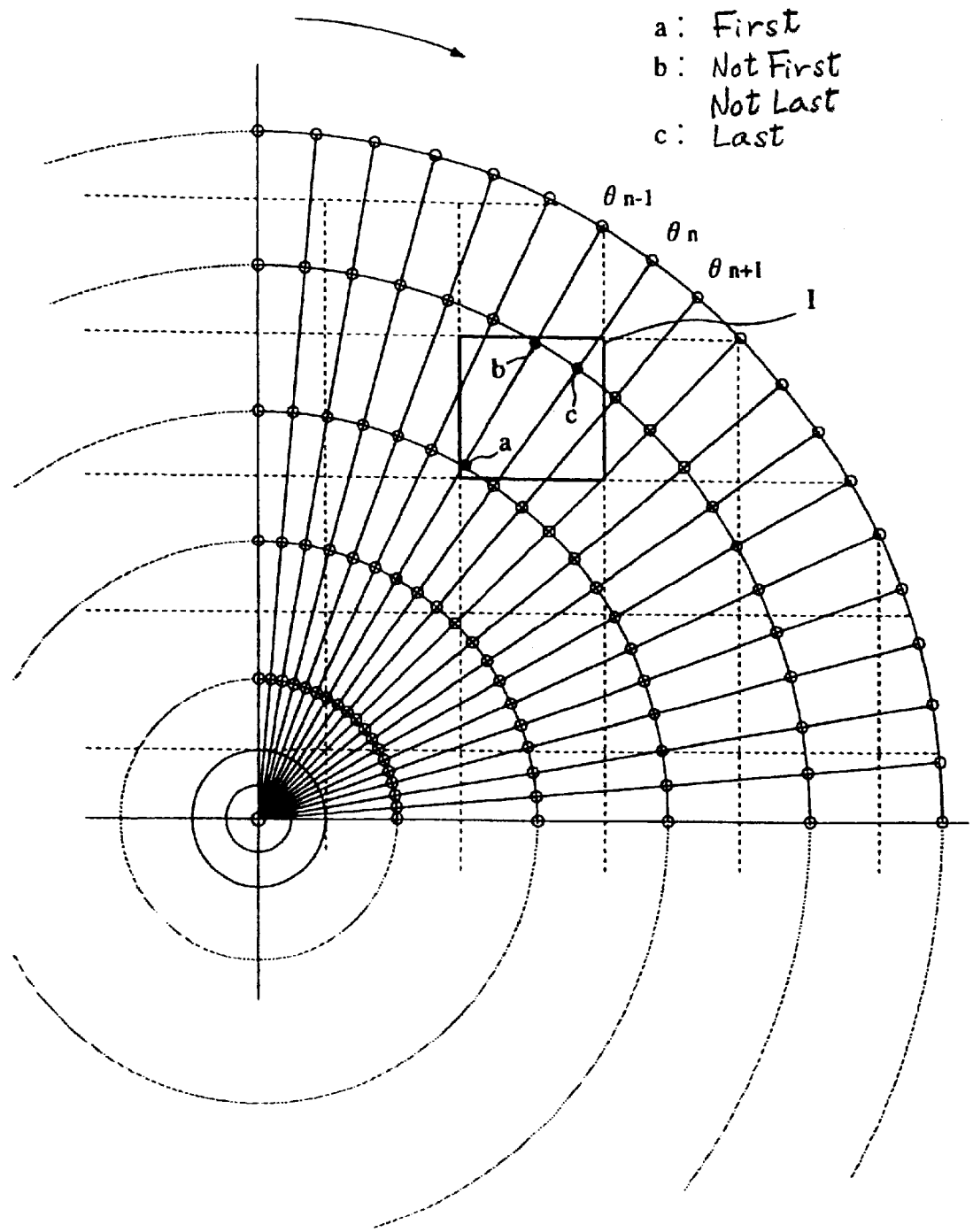
FIG. 4 is a diagram showing the operation of the radar system according to the invention.

FIG. 4 is a scheme showing how the sampling points, including the first and last sampling points, are allocated to individual pixels. In FIG. 4, points a, b and c are sampling points allocated to pixel I. When the radar antenna 10 rotates clockwise as illustrated, the point a is detected as a first sampling point for the pixel I, the point b as a second (or later) sampling point, and the point c as a last sampling point.

For the purpose of explanation, it is now assumed that data obtained from these sampling points have the following values: a=3, b=4, c=6. As the point a is detected as a first sampling point for the pixel I when the antenna 10 is oriented in the direction $\theta_{n-1}$, data "3" is stored in an address in the extracted data memory 100 that corresponds to the pixel I. As the point b is detected as a second (or later) sampling point in a succeeding sampling cycle, the maximum data extracting circuit 16 compares data "4" obtained from the point b with data "3" obtained from the point a and previously stored in the extracted data memory 100. Since data "4" is judged to be larger than data "3" as a result of comparison, data "4" is stored in the address corresponding to the pixel I in the extracted data memory 100. When the antenna 10 is subsequently oriented in the direction $\theta_n$, a judgment is made to determine whether the point c is a first sampling point. Since the point c is not a first sampling point, however, it is judged to be a second or later sampling point allocated to pixel I. Data "6" obtained from the point c is then compared with data "4" obtained from the point b and previously stored in the extracted data memory 100. Since data "6" is larger than data "4", data "6" is stored in the address corresponding to the pixel I in the extracted data memory 100. In the latter data comparison operation, it is not necessary to compare data "6" obtained from the point c with data "3" obtained from the point a. This is because the data taken from the point a or b, whichever having a larger value, is already stored in the extracted data memory 100 at this stage.

When the antenna 10 is oriented in the direction $\theta_n$, an additional judgment is made to determine whether the point a or b in the preceding beam direction $\theta_{n-1}$ is a last sampling point. Neither the point a nor the point b is judged to be a last sampling point because the point c in the current beam direction $\theta_n$ is allocated to the same pixel I, however. Therefore, the scan-to-scan correlation operation is not performed for the pixel I at this point in time (when the antenna 10 is subsequently oriented in the direction $\theta_n$). When the antenna 10 is subsequently oriented in a succeeding beam direction $\theta_{n+1}$, the point c is detected as a last sampling point for the pixel I. The scan-to-scan correlation operation for the pixel I is performed at this point in time. Specifically, data "6" obtained from the point c and stored in the extracted data memory 100 is output to the write-data generator 20 as the maximum value of data for the pixel I while the image data stored for the same pixel I in the image memory 17 one antenna rotation before is read out and transferred to the write-data generator 20 and, then, the mean value of these data is calculated and written anew in the address in the image memory 17 corresponding to the pixel I.

Figure 5:
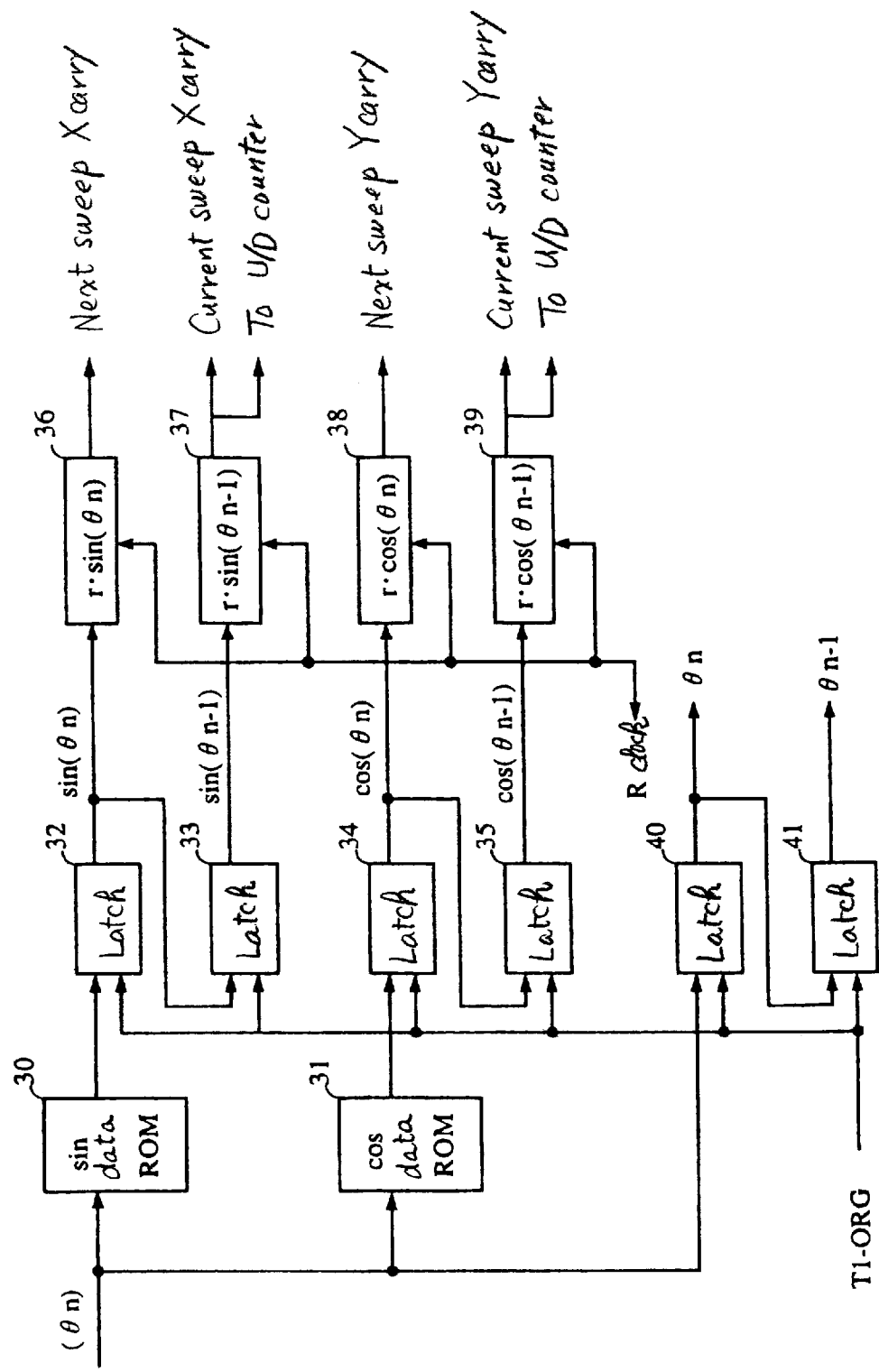
FIG. 5 is a block diagram of an upstream stage of a coordinate converter for the invention.

FIG. 5 is a block diagram of an upstream stage of the coordinate converter 14. Data on the current beam direction $\theta_n$ in which the antenna 10 is currently oriented is obtained from an antenna driving section and input to both a sine data read-only memory (ROM) 30 and a cosine data ROM 31. Outputs of the sine data ROM 30 and the cosine data ROM 31 are input to latches 32 and 34 respectively so that there are provided latch outputs sin ($\theta_n$), sin ($\theta_{n-1}$), cos ($\theta_n$) and cos ($\theta_{n-1}$) from latches 32 through 35 respectively. The output data of the latches 32–35 are input to an accumulator 36 for calculating r·sin ($\theta_n$), an accumulator 37 for calculating r·sin ($\theta_{n-1}$), an accumulator 38 for calculating r·cos ($\theta_n$) and an accumulator 39 for calculating r·cos ($\theta_{n-1}$), respectively, together with a clock signal R which is generated at a rate of one pulse per sampling cycle. These accumulators 36–39 are circuits known in the art that are designed to perform the above-mentioned mathematical operations. The accumulators 36–39 output a carry each time the value of x- or y-coordinate of the Cartesian coordinate system is incremented or decremented by an amount corresponding to the width or height of one pixel as a result of coordinate conversion operation. Specifically, the accumulator 36 outputs an x-carry pulse for the next sweep line in the current beam direction $\theta_n$, the accumulator 37 outputs an x-carry pulse for the current sweep line in the preceding beam direction $\theta_{n-1}$, the accumulator 38 outputs a y-carry pulse for the next sweep line in the current beam direction $\theta_n$, and the accumulator 39 outputs a y-carry pulse for the current sweep line in the preceding beam direction $\theta_{n-1}$. Latches 40 and 41 store the data on the current beam direction $\theta_n$ and preceding beam direction $\theta_{n-1}$ which are used in later-described quadrant judgment and sweep direction judgment.

The latches 32–35, 40, 41 latch successive data on the current beam direction $\theta_n$ in synchronism with a transmission trigger T1-ORG, which is a firing pulse produced in each successive beam direction. With this latching operation, data on the current beam direction $\theta_n$ is delayed by as much as one sweep interval, or pulse repetition interval, and used as data for the next sweep direction.

Figure 6:
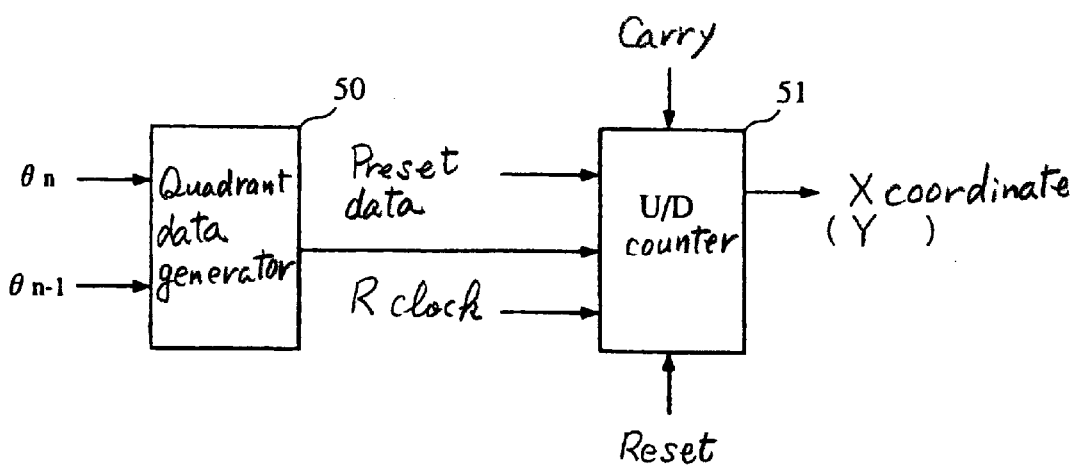
FIG. 6 is a block diagram of a downstream stage of the coordinate converter for the invention.

FIG. 6 is a block diagram of a downstream stage of the coordinate converter 14 that includes a quadrant data generator 50 and an up/down counter 51.

A full-circle area covered by each antenna rotation is divided into four 90-degree sectors, or quadrants. In this radar system, the upper-right quadrant is referred to as the first quadrant, the lower-right quadrant is referred to as the second quadrant, the lower-left quadrant is referred to as the third quadrant, and the upper-left quadrant is referred to as the fourth quadrant, unlike the common practice in mathematics.

The quadrant data generator 50 determines in which quadrant a currently processed sampling point is located and outputs quadrant data to the up/down counter 51.

The up/down counter 51 increments the value of x- or y-coordinate each time a carry pulse is entered and outputs an incremented x- or y-coordinate to the image memory 17. What is entered to the up/down counter 51 is only the x-carry pulse for the current sweep line in the preceding beam direction $\theta_{n-1}$ from the accumulator 37 and the y-carry pulse for the preceding beam direction $\theta_{n-1}$ from the accumulator 39. This is because the scan-to-scan correlation operation for the current sweep line, for which the coordinate conversion operation is actually required, is performed only when the last sample identification judgment has been made for the sampling points in the preceding beam direction $\theta_{n-1}$ and, thus, only the carry pulses for the pixels in the preceding beam direction (current sweep direction) $\theta_{n-1}$ are required. Accordingly, there is actually provided a pair of up/down counters 51 individually connected to outputs of the accumulators 37 and 39.

Figure 7:
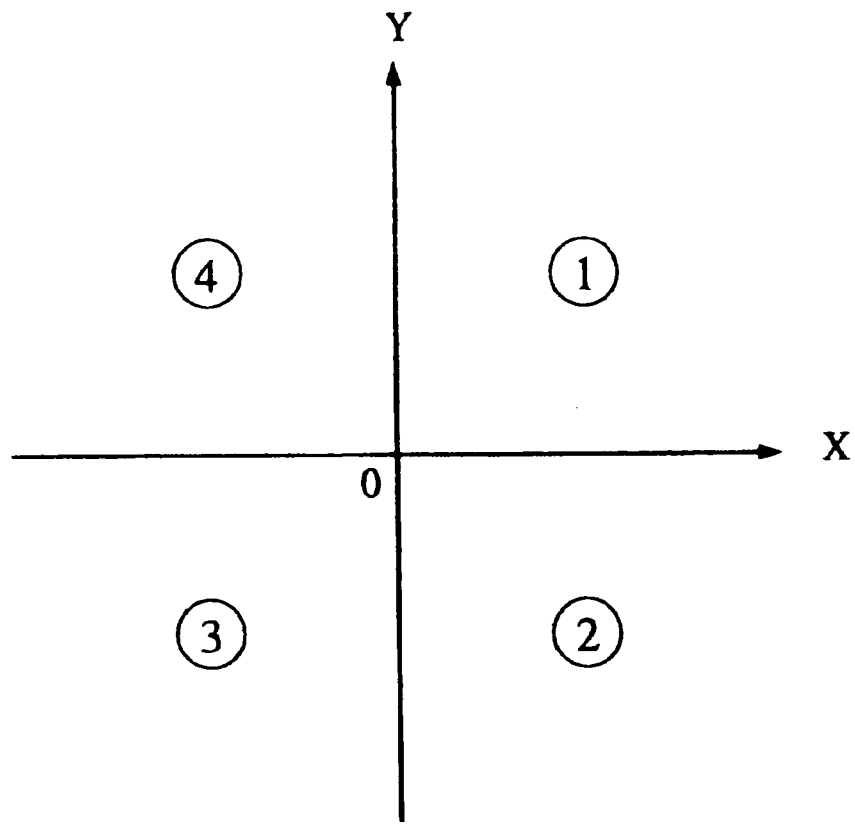
FIG. 7 is a diagram depicting counting directions of x- and y-coordinates of an up/down counter shown in FIG. 6 in individual quadrantal scanning zones.

The quadrant data generator 50 outputs the quadrant data which specifies counting (ascending or descending) directions for x- and y-coordinates of the up/down counter 51 in the first to fourth quadrants as shown in FIG. 7. In the first quadrant, for example, it is necessary to successively increment both the x-coordinate and the y-coordinate along each sweep line outward from the sweep origin 0. In the second quadrant, however, it is necessary to successively increment the x-coordinate and successively decrement the y-coordinate along each sweep line outward from the sweep origin. As will be understood from these examples, it is necessary to alter the counting directions of the up/down counter 51 depending on in which quadrant the current sweep line is located. The quadrant data generator 50 produces the quadrant data indicating the current quadrant and outputs the same to the up/down counter 51. Also input to the up/down counter 51 is preset data which sets initial values for the x/y-coordinate counting operation of the up/down counter 51. These initial values specify starting coordinates (x0, y0) from which the coordinate conversion operation is commenced.

FIG. 8 is a block diagram of the first sample detecting circuit 15. The x- and y-carry pulses for the current sweep line in the preceding beam direction $\theta_{n-1}$ fed respectively from the accumulator 37 and the accumulator 39 of the coordinate converter 14 shown in FIG. 5 are entered into a latch 60. The latch 60 is series-connected to latches 61 and 62 in this order, together forming a shift circuit. Let us now assume that the first sample detecting circuit 15 is going to judge whether the point E in FIG. 2 is a first sampling point. At this point in time, the latches 60–62 output the x- and y-carry pulses for the points C, B and A on the current sweep line in the preceding beam direction $\theta_{n-1}$ shown in FIG. 2, respectively. Similarly, the x- and y-carry pulses for the next sweep line in the current beam direction $\theta_n$ fed respectively from the accumulator 36 and the accumulator 38 of FIG. 5 are entered into a latch 63. The latch 63 is series-connected to latches 64 and 65 in this order, together forming a shift circuit. Thus, the latches 63–65 output the x- and y-carry pulses for the points F, E and D on the next sweep line in the current beam direction $\theta_n$ shown in FIG. 2, respectively.

It would be possible to judge whether any of adjacent sampling points is allocated to the same pixel (coordinates) as the point E by comparing the Cartesian coordinates of the individual sampling points after the coordinate conversion operation. In this embodiment, however, such a sample allocation judgment for determining whether the adjacent sampling points are allocated to the same pixel (coordinates) is made by comparing the number of carry pulses obtained by the latches 60–65. Specifically, two sampling points are judged to be allocated to different pixels (coordinates) when they are associated with different numbers of carry pulses, whereas the two sampling points are judged to be allocated to a common pixel (coordinates) when they are associated with the same number of carry pulses. Outputs of the individual latches 60–65 are entered into carry differential detecting circuits 66–68 formed of counters which count up or down only when there is a difference in the number of carry pulses.

Referring to FIG. 2, sampling points in the preceding beam direction (current sweep direction) $\theta_{n-1}$ and the current beam direction (next sweep direction) $\theta_n$ to be subjected to the aforementioned sample allocation judgment are successively shifted outward away from the sweep origin 0 at a rate determined by the clock signal R. If two sampling points in the directions $\theta_{n-1}$ and $\theta_n$ to be subjected to the sample allocation judgment are allocated to the same pixel (coordinates), there is no difference in the number of carry pulses. If the two sampling points are allocated to different pixels (coordinates), however, there arises a difference in the number of carry pulses. If there is a carry for the sampling point in the current beam direction (next sweep direction) $\theta_n$ and there is no carry for the sampling point in the preceding beam direction (current sweep direction) $\theta_{n-1}$, for example, the relevant counter is caused to count up by one. Contrary to this, if there is no carry for the sampling point in the current beam direction (next sweep direction) $\theta_n$ and there is a carry for the sampling point in the preceding beam direction (current sweep direction) $\theta_{n-1}$, the relevant counter is caused to count down by one. If there is a carry for the sampling point in each of the directions $\theta_{n-1}$ and $\theta_n$, or if there is no carry for the sampling point in either of the directions $\theta_{n-1}$ and $\theta_n$, the counter does not count up or down. This operation is performed on successive sampling points on each sweep line outward away from the sweep origin 0 according to the clock signal R. If the count value of the counter into which carry pulses for the points E and C of FIG. 2 are entered is "0" (initial value), for example, the points E and C are allocated to the same pixel. If, however, the count value of the counter is "1", the point E is allocated to a pixel next to a pixel to which the point C is allocated. The aforementioned counter is formed of an up/down counter whose counting (ascending or descending) direction varies depending on in which quadrant the sweep line is located.

Figure 9:
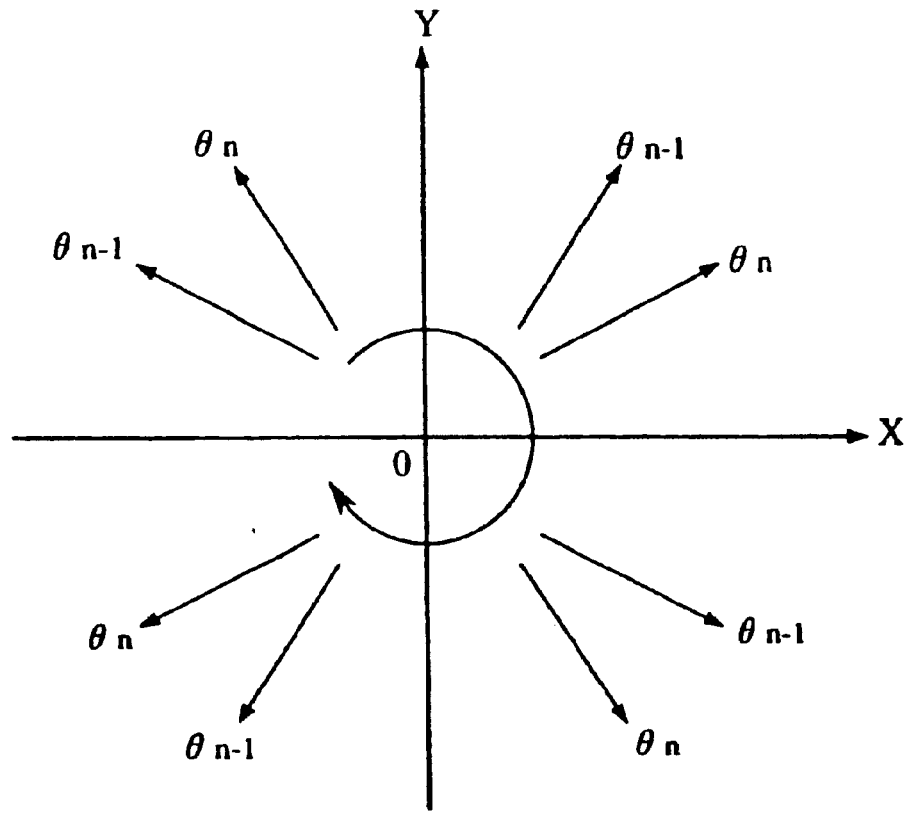
FIG. 9 is a diagram depicting counting directions of the first sample detecting circuit in each quadrant.

FIG. 9 shows counting (ascending or descending) directions in the first to fourth quadrants. When the radar antenna 10 rotates clockwise as illustrated, the sampling point in the current beam direction (next sweep direction) $\theta_n$, among the two sampling points to be subjected to the sample allocation judgment, precedes the sampling point in the preceding beam direction (current sweep direction) $\theta_{n-1}$ with respect to the number of x-carry pulses in the first quadrant. Thus, the x-carry pulses for the sampling points in the direction $\theta_n$ are counted in the ascending direction (+) and those in the direction $\theta_{n-1}$ are counted in the descending direction (−) in the first quadrant so that the difference in the number of the x-carry pulses has a positive (+) value. On the other hand, the sampling point in the preceding beam direction (current sweep direction) $\theta_{n-1}$, among the two sampling points to be subjected to the sample allocation judgment, precedes the sampling point in the current beam direction (next sweep direction) $\theta_n$ with respect to the number of y-carry pulses in the first quadrant. Thus, the y-carry pulses for the sampling points in the direction $\theta_{n-1}$ are counted in the ascending direction (+) and those in the direction $\theta_n$ are counted in the descending direction (−) in the first quadrant so that the difference in the number of the y-carry pulses has a positive (+) value.

Plus and minus signs in FIG. 9 indicate the counting directions that always give a positive count value (difference in the number of carry pulses) in any of the four quadrants.

Referring again to FIG. 8, the counters 66–68 give the differences in the number of carry pulses between the point E and each of its adjacent sampling points shown in FIG. 2. More particularly, the counter 66 gives the difference in the number of x-carry pulses and the difference in the number of y-carry pulses between the points E and C, the counter 67 gives the difference in the number of x-carry pulses and the difference in the number of y-carry pulses between the points E and B, and the counter 68 gives the difference in the number of x-carry pulses and the difference in the number of y-carry pulses between the points E and A.

Of these three counters 66–68, the counter 66 for obtaining the difference in the number of x-carry pulses between the points E and C, for example, gives the count value "1" when the number of the x-carry pulses from the sweep origin 0 for the point E differs from that for the point C. It is not necessary to provide any circuit for detecting a difference in the number of carry pulses between sampling points on the same sweep line. This is because if a carry occurs when sampling point is shifted from the point D to point E in the current beam direction (next sweep direction) $\theta_n$ in FIG. 2, creating a difference in the number of carry pulses between the points D and E, for example, it is apparent that these sampling points (D and E) are allocated to different pixels. Therefore, lines 69 shown in FIG. 8 convey the x- and y-carry pulses for the point E directly to a gate circuit in a succeeding stage.

OR gates 70–73 individually produce logical sums of signals output from the counters 66–68 and signals delivered through the lines 69. Outputs of these OR gates 70–73 are entered into an AND gate 74. The AND gate 74 outputs a state "1" when all the inputs are "1", that is, when none of the adjacent four points A–D is allocated to the same pixel as the point E. The state "1" output from the AND gate 74 indicates that the point E is the first sampling point.

While the description of the sample allocation judgment given above referring to FIGS. 8 and 9 applies to a case in which both the current sweep line (preceding beam direction $\theta_{n-1}$) and the next sweep line (current beam direction $\theta_n$) lie in the same quadrant, a different judgment operation is required when the two sweep lines are located in different quadrants.

Figure 10:
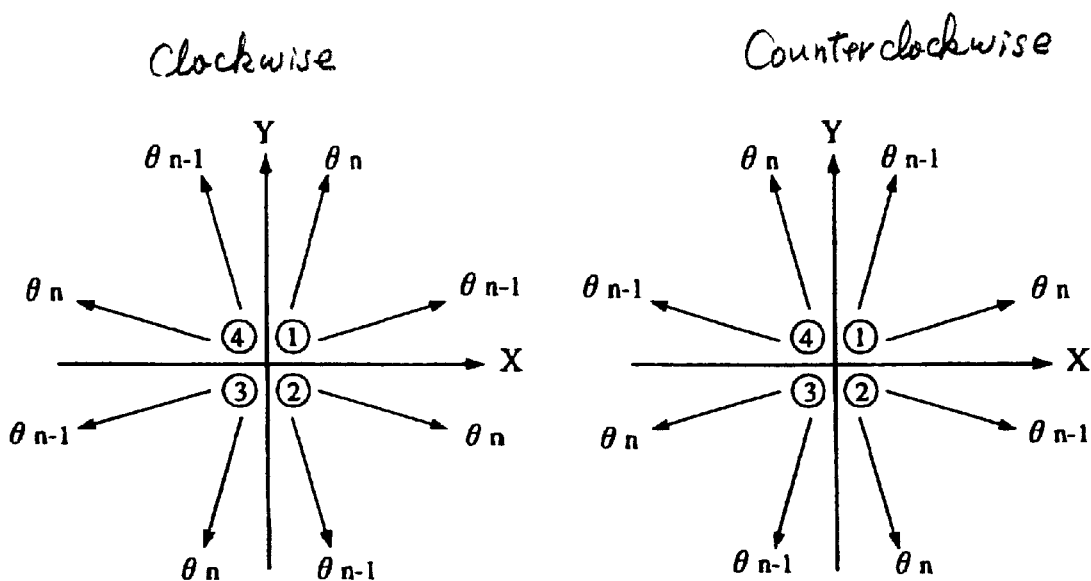
FIG. 10 is a diagram depicting counting directions of the first sample detecting circuit when two currently processed sweep lines are located in different quadrants.

FIG. 10 shows counting directions of the first sample detecting circuit 15 when the two sweep lines are located in different quadrants. It is assumed here that the radar antenna 10 rotates clockwise. When the next sweep line in the current beam direction $\theta_n$ is located in the first quadrant and the current sweep line in the preceding beam direction $\theta_{n-1}$ is located in the fourth quadrant, for instance, x-carry pulses are counted in the same direction if there is a carry for the sampling point on either sweep line (direction $\theta_n$ or $\theta_{n-1}$). In this case, y-carry pulses are counted when there is a difference in the number of carry pulses between sampling points on the two sweep lines (directions $\theta_n$, $\theta_{n-1}$), and this counting operation is made in the ascending or descending direction depending on in which direction ($\theta_n$ or $\theta_{n-1}$) the carry occurs. The differential counters 66–68 of FIG. 8 are used for the counting operation when the two sweep lines are located in different quadrants as well.

Figure 11:
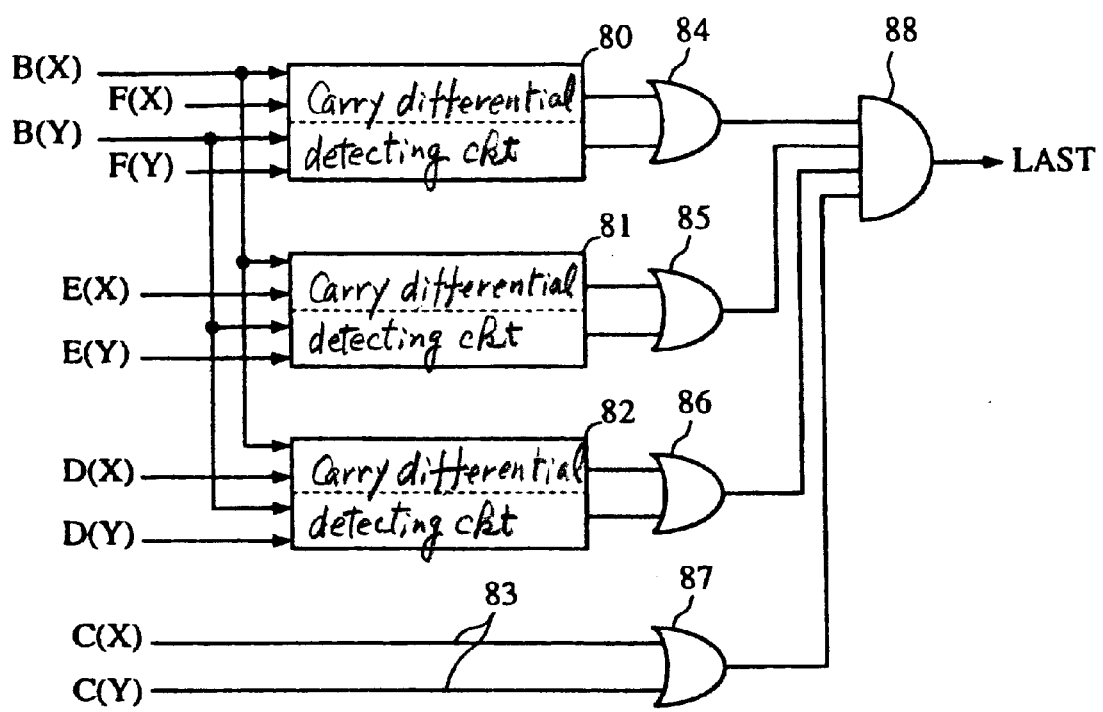
FIG. 11 is a block diagram of a last sample detecting circuit for the invention.
Figure 12:
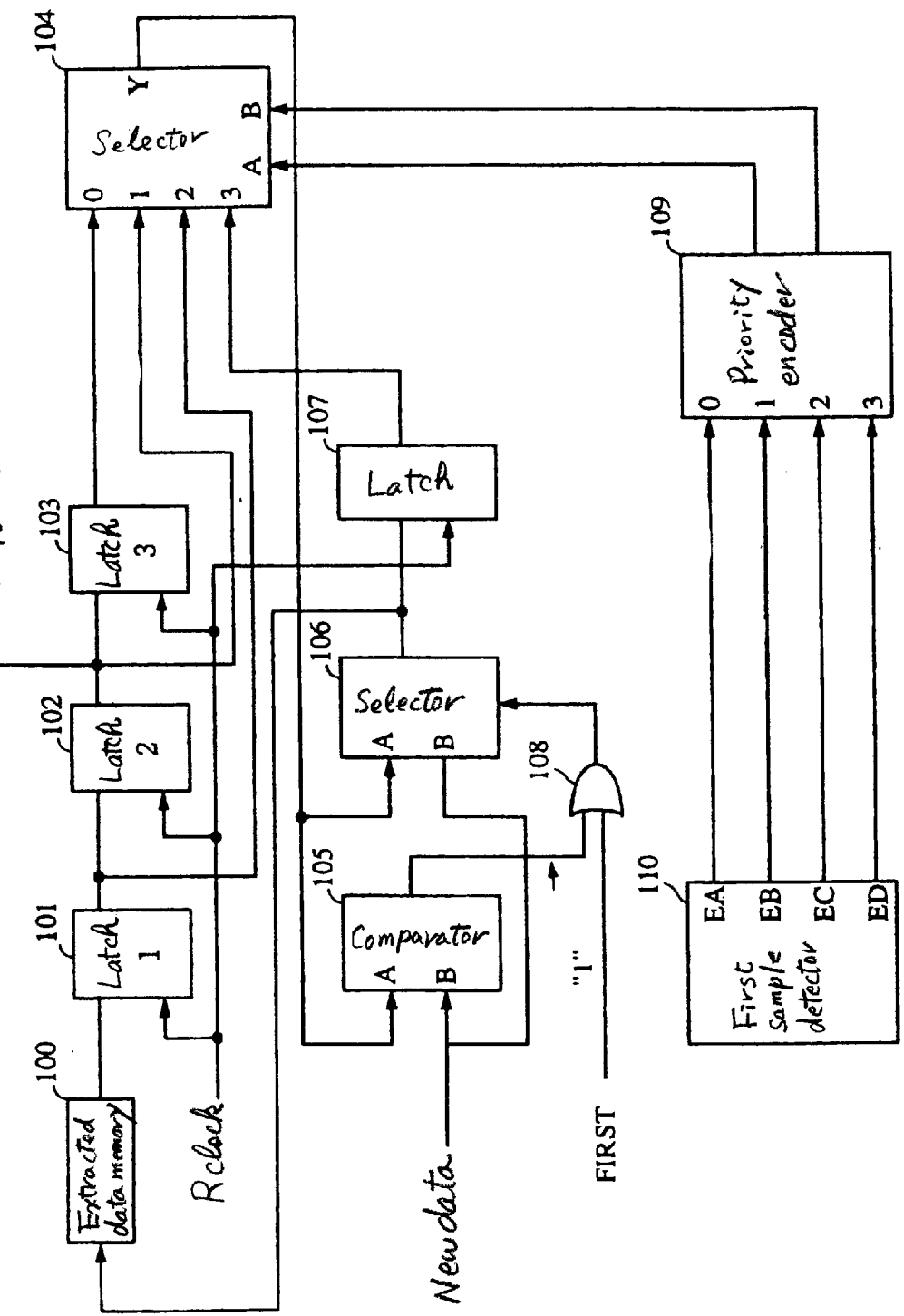
FIG. 12 is a block diagram of a maximum data extracting circuit.
Figure 13:
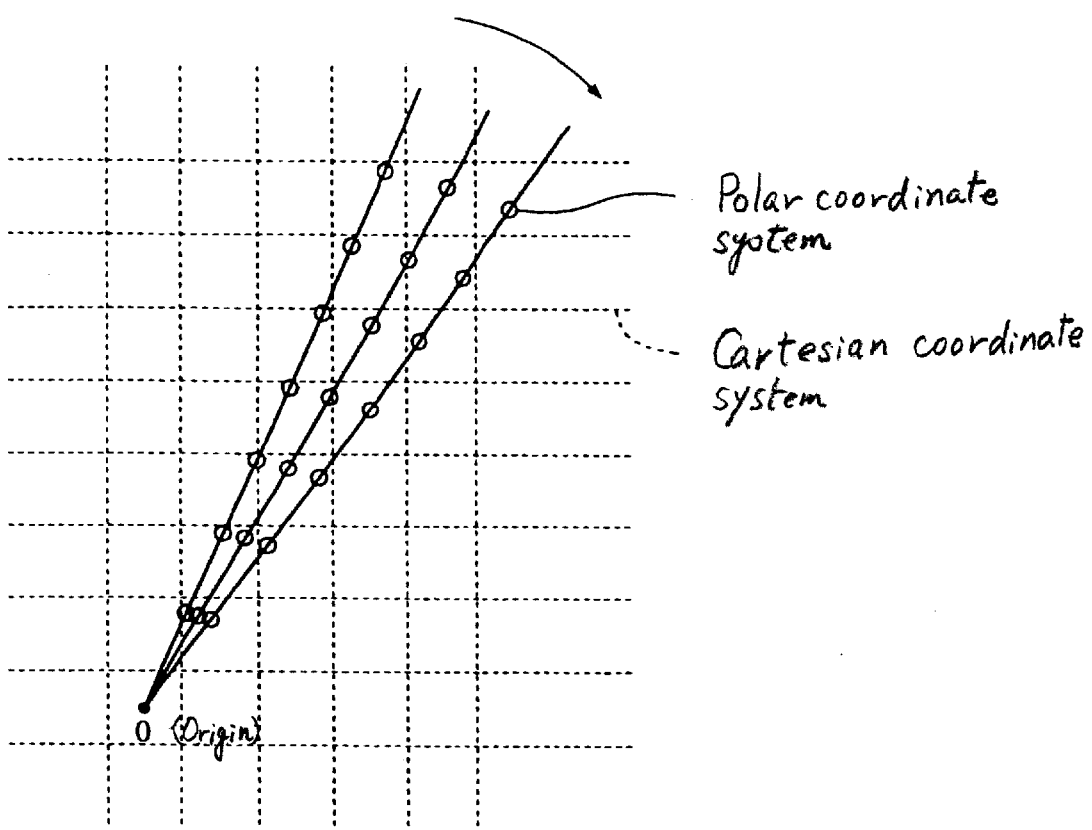
FIG. 13 is a diagram showing a relationship between pixels on a Cartesian coordinate system and sampling points on a polar coordinate system.

The last sample detecting circuit 19 is now described referring to FIGS. 11 and 12.

Figure 1B:
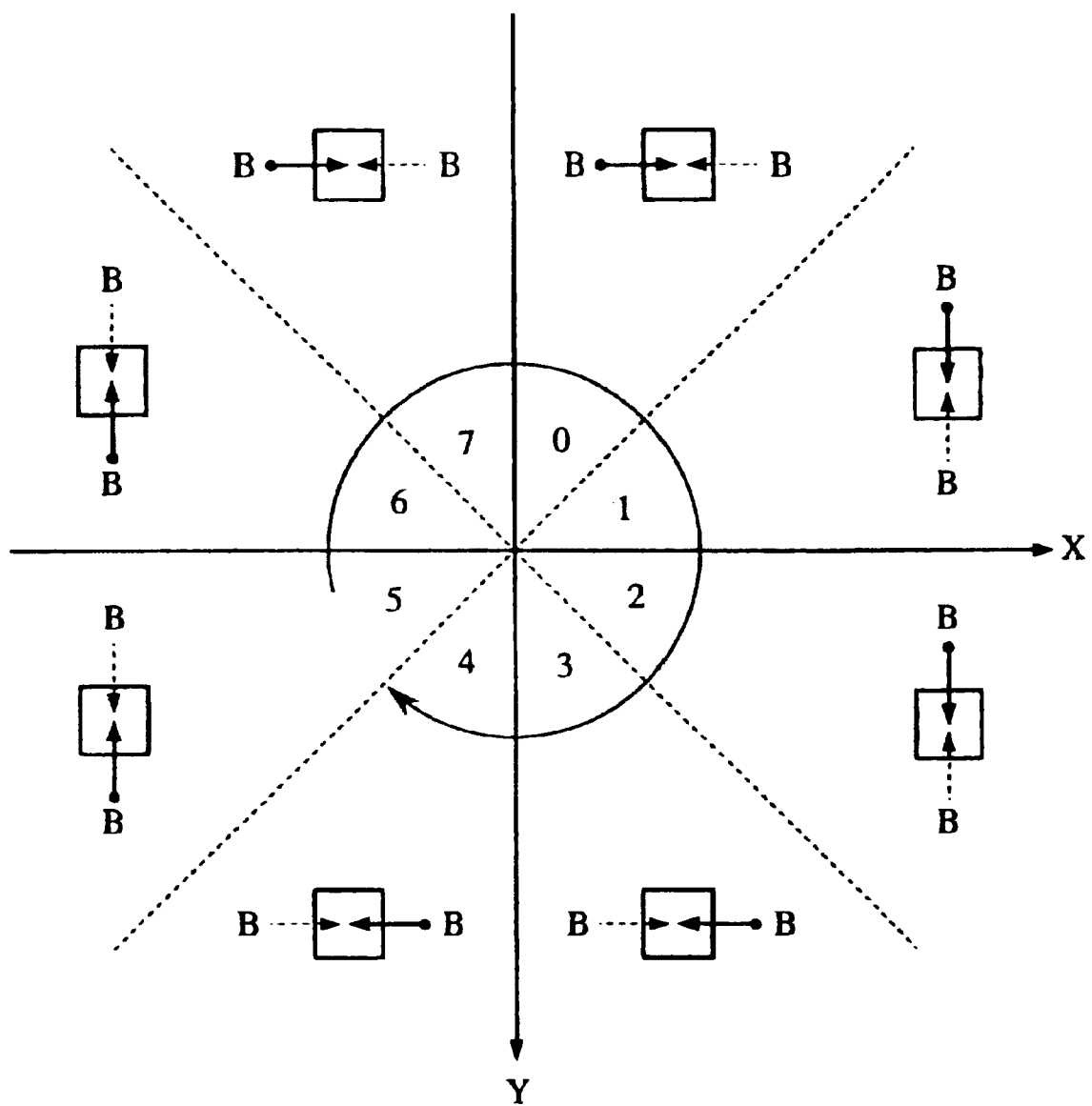
FIG. 1 is a diagram illustrating the operation of a last sample detecting section and the construction thereof used for the present invention.

FIG. 11 is a block diagram of the last sample detecting circuit 19. As can be seen from FIG. 1, the last sample identification judgment is made between the point B and each of the points C–F. Accordingly, the last sample detecting circuit 19 includes counters 80–82 for detecting differences in the number of x- and y-carry pulses, OR gates 84–87 and an AND gate 88, wherein outputs of the counters 80–82 are entered into the OR gates 84–86, respectively, lines 83 convey the x and y-carry pulses for the point B directly to the OR gate 87, and outputs of the OR gates 84–87 are entered into the AND gate 88. The AND gate 88 outputs a signal indicating whether or not the point B is a last sampling point. The counters 80–82 are identical to the counters 66–68 of the first sample detecting circuit 15, and the lines 83 are identical to the lines 69. With this construction, the AND gate 88 outputs a state "1" when none of the adjacent four points C–F is allocated to the same pixel as the point B. The state "1" output from the AND gate 88 indicates that the point B is the last sampling point.

FIG. 12 is a block diagram of the maximum data extracting circuit 16. The extracted data memory 100 for storing data having a maximum value for each pixel on the next sweep line in the current beam direction $\theta_n$. When the point E of FIG. 2 has been judged to be a first sampling point, the extracted data memory 100 unconditionally stores new data sampled from the point E that is output from the primary memory 13 of FIG. 3. If, however, the point E is not the first sampling point for its corresponding pixel, the extracted data memory 100 stores the new data obtained from the point E or data selected by a selector 104, whichever having a larger value.

A comparator 105 compares the data selected by the selector 104 and the new data output from the primary memory 13 with each other, and if the new data has a larger value, the comparator 105 outputs a state "1" to a selector 106.

The selector 106 selects its B terminal when the logical sum of the output of the comparator 105 and the output of the AND gate 74, which indicates whether or not the point E is the first sampling point, is "1". Otherwise, the selector 106 selects its A terminal to which the output of the selector 104 is connected. Accordingly, the new data is selected by the selector 106 and output to the extracted data memory 100 when the point E shown in FIG. 2 is a first sampling point, whereas the comparator 105 compares the output data of the selector 104 and the new data with each other and the data having a larger value is selected by the selector 106 and output to the extracted data memory 100 when the point E is not a first sampling point. A latch 107 delays the output of the selector 106 by as much as one sampling cycle and outputs data which has a maximum value for a pixel to which the point D is allocated and was previously written into the extracted data memory 100. This output from the latch 107 is input to the selector 104 as the data having the maximum value for the pixel to which the point D is allocated at this time.

Data is read from the extracted data memory 100 approximately in a first half of a sampling cycle and data having a maximum value is written into the extracted data memory 100 in a second half of the sampling cycle. The output of the extracted data memory 100 is delayed by latches 101–103. These latches 101–103 output data having maximum values for pixels to which the points C, B and A are allocated, respectively. These data are entered into the selector 104 while the output of the latch 102, or the data having the maximum value for the pixel to which the point B is allocated, is output to the write-data generator 20 as data to be subjected to a scan-to-scan correlation operation. As previously stated, the output data of the latch 102 having the maximum value for the pixel to which point B is allocated is used as the data to be subjected to the scan-to-scan correlation operation when the point B has been judged to be a last sampling point for the pixel.

The selector 104 outputs the data having a maximum value among the data from the points A–D only when the point E is not a first sampling point. The data to be output from the selector 104 is determined by a priority encoder 109. The priority encoder 109 serves to produce a select signal for the selector 104. If the points A–D are allocated to the same pixel as the point E, a maximum value is selected from a set of five individual data including the new data for the point E fed from the primary memory 13 and the data obtained from the points A–D. The data having the maximum value is always the last selected data. Therefore, the data having the maximum value among the data from the points A–D is the data obtained from the point D. This means that it is not necessary to compare the new data with all the four individual data by the comparator 105.

In this circumstance, four pixel concordance data from a first sample detector 110 are input to the priority encoder 109. This gives priority encoder 109 priority to the points A, B, C and D in such a way that the point D has the first priority and outputs a signal to the selector 104 so that it selects the data having the maximum value among the data from any of the points A–D that are allocated to the same pixel as the point E. The priority encoder 109 functions only when the point E is not a first sampling point. When the point E is a first sampling point, the new data is unconditionally written in the extracted data memory 100 as the data having the maximum value.

As so far described, it is possible to identify a last sampling point allocated to each pixel in the image memory 17 with the provision of the last sample detecting circuit 19 and, as a consequence, data transferred to the write-data generator 20 when the last sampling point has been accessed can be subjected to the scan-to-scan correlation operation for the pixel to which the last sampling point is allocated. It is also possible to perform the maximum data sampling operation in the aforementioned construction because the data transferred to the write-data generator 20 when the last sampling point has been accessed is the data having the maximum value selected by the first sample detecting circuit 15 and the maximum data extracting circuit 16.

In summary, it is possible to perform the maximum data sampling operation for each pixel in the current beam direction (next sweep direction) $\theta_n$ while the scan-to-scan correlation operation is being performed for the current sweep line, which is oriented in the preceding beam direction $\theta_{n-1}$. Furthermore, the extracted data memory 100 of the maximum data extracting circuit 16 is required to have a storage capacity corresponding to one sweep line only, and it is not necessary to separately provide a costly image memory for performing the maximum data sampling operation. Furthermore, because the sample allocation judgment for determining whether adjacent sampling points are allocated to the same pixel (coordinates) as a given sampling point is made by using the carry pulses output from the accumulators 36–39, the overall circuit configuration of this embodiment can be simplified compared to a circuit configuration in which the sample allocation judgment is made by comparing the Cartesian coordinates of the individual sampling points after the coordinate conversion operation.

Figure 19:
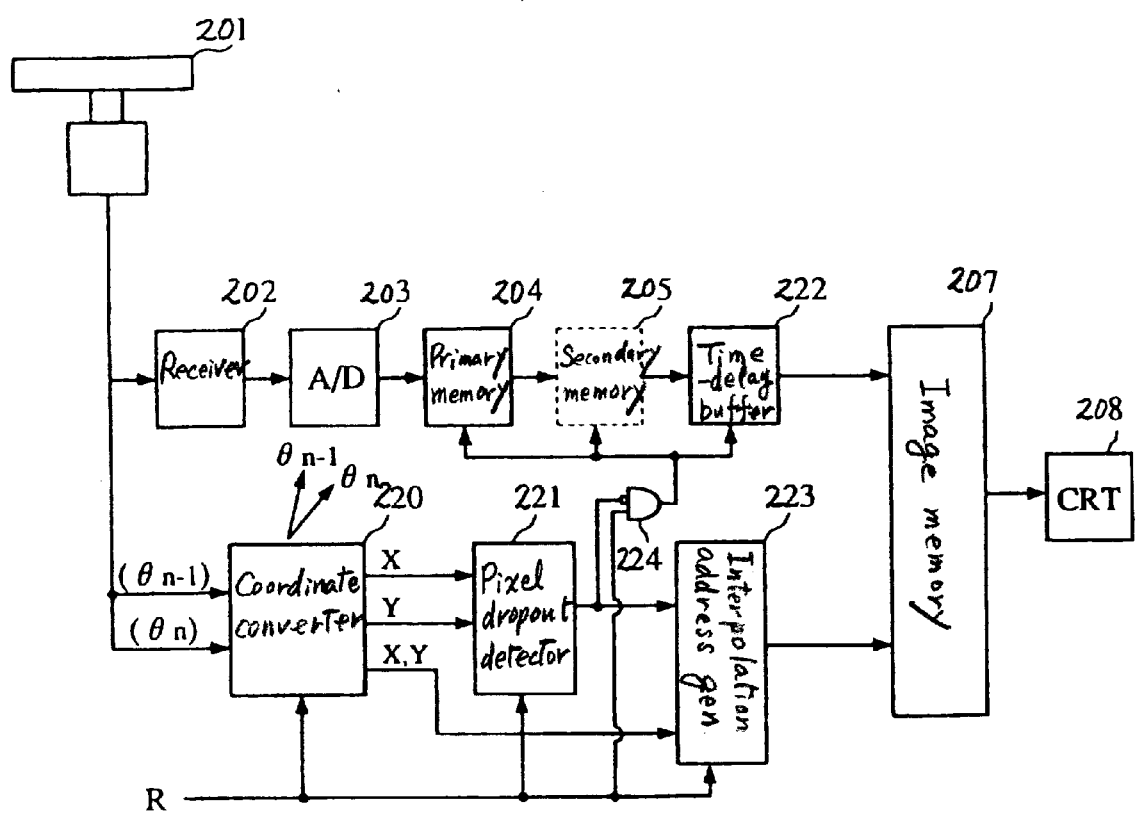
FIG. 19 is a block diagram of a radar system according to an embodiment of the invention.

FIG. 19 is a block diagram of a radar system according to a first embodiment of the invention, particularly showing the configuration of its control section.

Figure 41:
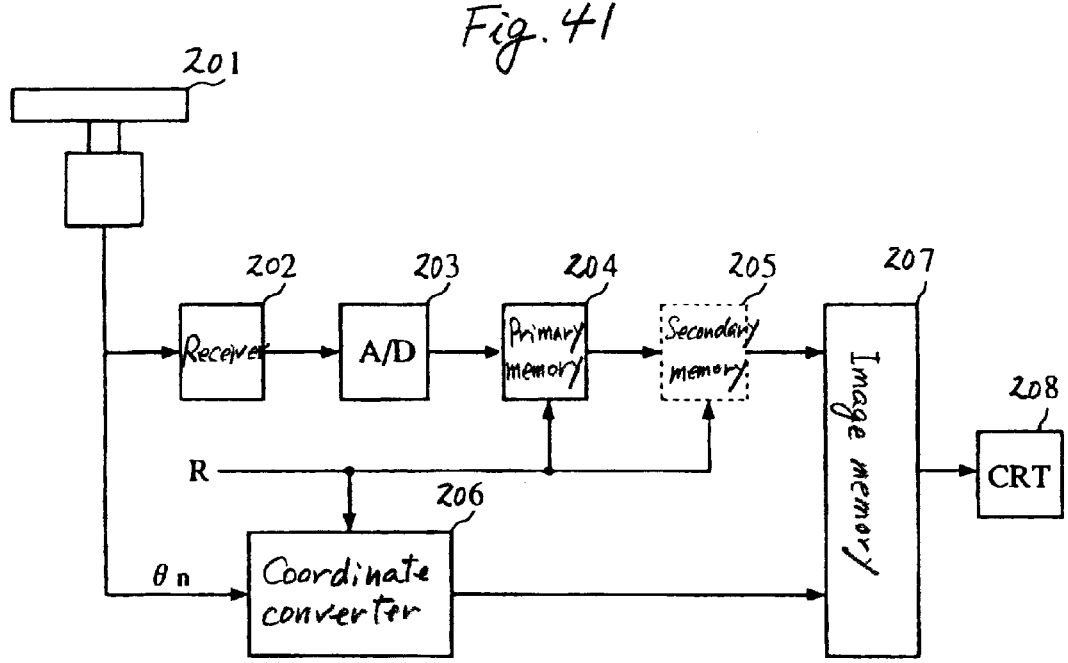
FIG. 41 is a block diagram of a conventional radar system.
Figure 42:
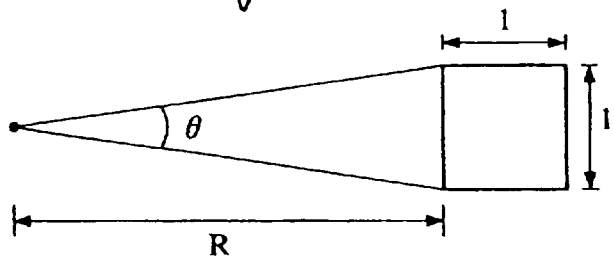
FIG. 42 is a diagram depicting a first cause of a pixel dropout.
Figure 43:
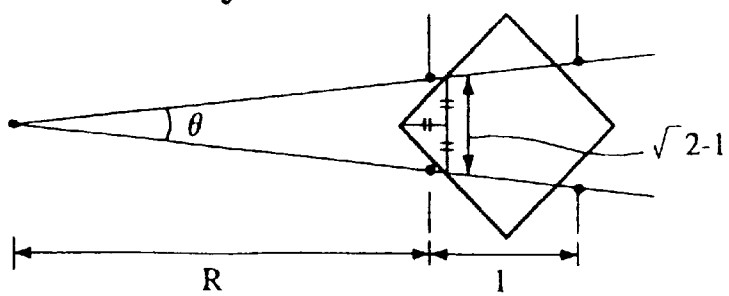
FIG. 43 is a diagram depicting a second cause of the pixel dropout.

This radar system comprises, in addition to the elements of the conventional radar system shown in FIG. 41, a pixel dropout detector 221, a time-delay buffer 222, an interpolation address generator 223 and a clock gate 224. The radar system of this embodiment further comprises a coordinate converter 220 which is modified from the coordinate converter 206 of the conventional radar system.

The coordinate converter 220 generates x- and y-coordinates and x- and y-carry pulses for a current sweep line in preceding beam direction $\theta_{n-1}$ and for a next sweep line in current beam direction $\theta_n$.

The pixel dropout detector 221 detects pixel dropouts using the x- and y-carry pulses. In this embodiment, the detection of pixel dropouts is made based on the difference in the numbers of x- and y-carry pulses which are generated in the coordinate converter 220 during the process of coordinate conversion operation, without reference to the x- and y-coordinates. An advantage of the use of the x- and y-carry pulses for pixel dropout detection is that the overall circuit configuration can be reduced.

Figure 20:
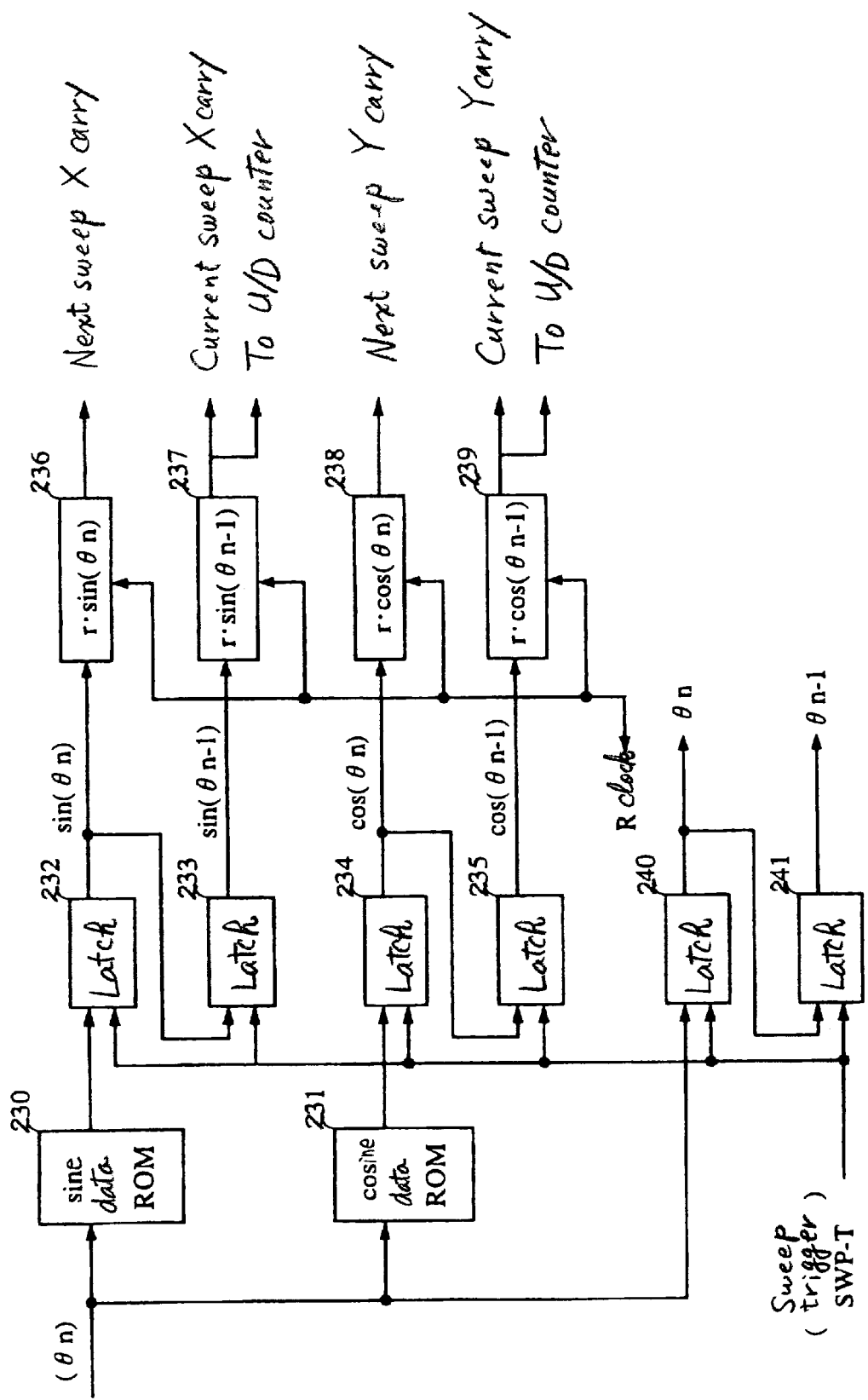
FIG. 20 is a circuit diagram of an upstream stage of a coordinate converter of FIG. 19.

FIG. 20 is a circuit diagram of an upstream stage of the coordinate converter 220.

Data on the current beam direction $\theta_n$ in which the antenna 201 is currently oriented is obtained from an antenna driving section and input to both a sine data read-only memory (ROM) 230 and a cosine data ROM 231. Outputs of the sine data ROM 230 and the cosine data ROM 231 are input to latches 232–235, which provide latch outputs sin ($\theta_n$), sin ($\theta_{n-1}$), cos ($\theta_n$) and cos ($\theta_{n-1}$), respectively. The output data of the latches 232–235 are input to an accumulator 236 for calculating r·sin ($\theta_n$), an accumulator 237 for calculating r·sin ($\theta_{n-1}$), an accumulator 238 for calculating r·cos ($\theta_n$) and an accumulator 239 for calculating r·cos ($\theta_{n-1}$), respectively, together with a clock signal R which is generated at a rate of one pulse per sampling cycle. These accumulators 236–239 are circuits known in the art that are designed to perform the above-mentioned mathematical operations. The accumulators 236–239 output a carry each time the value of x- or y-coordinate of the Cartesian coordinate system is incremented or decremented by an amount corresponding to the width or height of one pixel as a result of coordinate conversion operation. Specifically, the accumulator 236 outputs an x-carry pulse for the next sweep line in the current beam direction $\theta_n$, the accumulator 237 outputs an x-carry pulse for the current sweep line in the preceding beam direction $\theta_{n-1}$, the accumulator 238 outputs a y-carry pulse for the next sweep line in the current beam direction $\theta_n$, and the accumulator 39 outputs a y-carry pulse for the current sweep line in the preceding beam direction $\theta_{n-1}$. Latches 240 and 241 output the data on the current beam direction $\theta_n$ and preceding beam direction $\theta_{n-1}$ which are used in later-described quadrant judgment and sweep direction judgment.

The latches 232–235, 240, 241 latch successive data on the current beam direction $\theta_n$ in synchronism with a transmission trigger T1-ORG, which is a firing pulse produced in each successive beam direction. With this latching operation, data on the current beam direction $\theta_n$ is delayed by as much as one sweep interval, or pulse repetition interval, and used as data for the next sweep direction.

Figure 21:
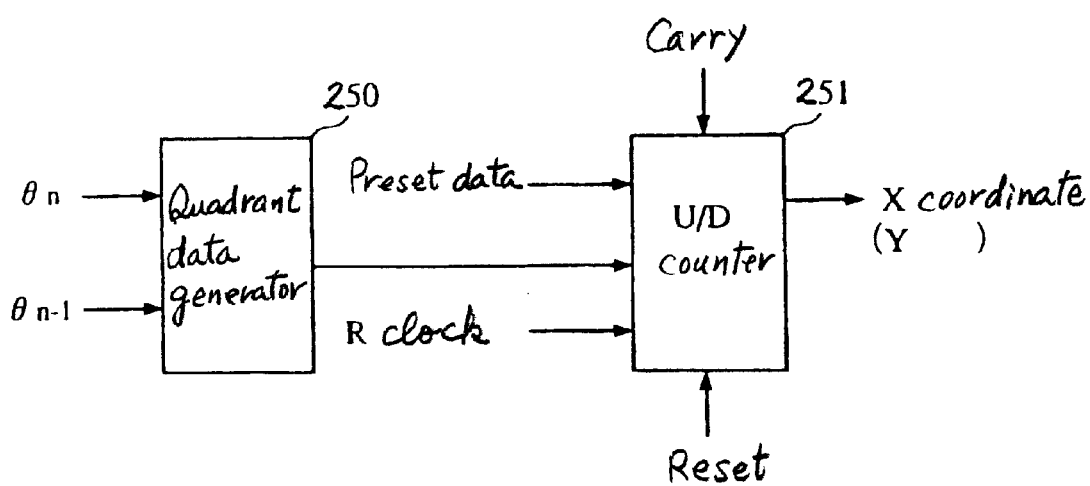
FIG. 21 is a circuit diagram of a downstream stage of the coordinate converter of FIG. 19.

FIG. 21 is a circuit diagram of a downstream stage of the coordinate converter 220 that includes a quadrant data generator 250 and an up/down counter 251.

The full-circle area covered by each antenna rotation is divided into four 90-degree sectors, or quadrants. In this radar system, the upper-right quadrant is referred to as the first quadrant, the lower-right quadrant is referred to as the second quadrant, the lower-left quadrant is referred to as the third quadrant, and the upper-left quadrant is referred to as the fourth quadrant, unlike the common practice in mathematics.

The quadrant data generator 250 determines in which quadrant a currently processed sampling point is located and outputs quadrant data to the up/down counter 251.

The up/down counter 251 increments the value of x- or y-coordinate each time a carry pulse is entered and outputs an incremented x- or y-coordinate to the image memory 207. What is entered to the up/down counter 251 is only the x-carry pulse for the current sweep line in the preceding beam direction $\theta_{n-1}$ from the accumulator 237 and the y-carry pulse for the preceding beam direction $\theta_{n-1}$ from the accumulator 239. This is because it becomes necessary to actually perform the coordinate conversion operation only when the last sample identification judgment is made for sampling points in the preceding beam direction $\theta_{n-1}$ and, thus, only the carry pulses for the pixels in the preceding beam direction (current sweep direction) $\theta_{n-1}$ are required. Accordingly, there is actually provided a pair of up/down counters 251 individually connected to outputs of the accumulators 237 and 239.

Figure 22:
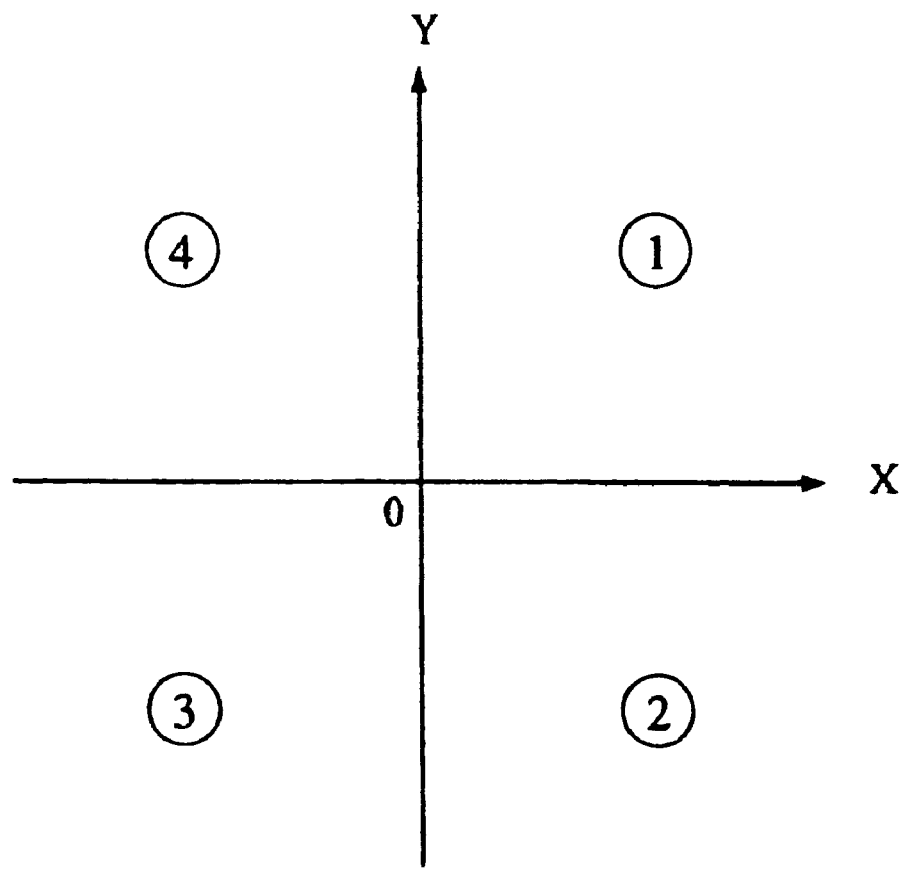
FIG. 22 is a diagram depicting counting directions of x- and y-coordinates of an up/down counter.

The quadrant data generator 250 outputs the quadrant data which specifies counting (ascending or descending) directions for x- and y-coordinates of the up/down counter 251 in the first to fourth quadrants as shown in FIG. 22. In the first quadrant, for example, it is necessary to successively increment the x-coordinate and decrement the y-coordinate, wherein the left-to-right direction is taken as the ascending direction for the X-axis and the upward direction is taken as the ascending direction for the Y-axis. In the second quadrant, however, it is necessary to successively decrement both the x-coordinate and they-coordinate. As will be understood from these examples, it is necessary to alter the counting direction of the up/down counter 251 depending on the scanning direction and the quadrant in which the sweep line is located. The quadrant data generator 250 produces the quadrant data indicating the counting direction and outputs the same to the up/down counter 251. Also input to the up/down counter 251 is preset data which sets initial values for the x/y-coordinate counting operation of the up/down counter 251. These initial values specify starting coordinates from which the coordinate conversion operation is commenced.

Figure 23:
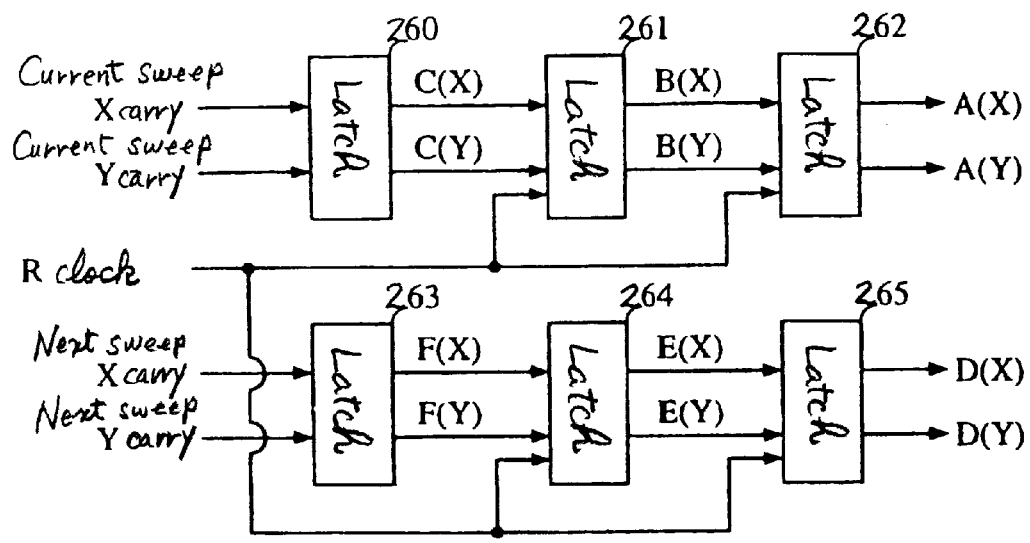
FIG. 23 is a circuit diagram of aportion of a pixel dropout detector of FIG. 19.

FIG. 23 is a circuit diagram of a portion of the pixel dropout detector 221. This portion of the pixel dropout detector 221 comprises three-stage shift circuits for the x- and y-carry pulses for the next sweep line in the current beam direction $\theta_n$ and for the x- and y-carry pulses for the current sweep line in the preceding beam direction $\theta_{n-1}$. As shown in FIG. 23, latches 260–265 generate carry signals for the individual sampling points A–F of FIG. 14.

Figure 24:
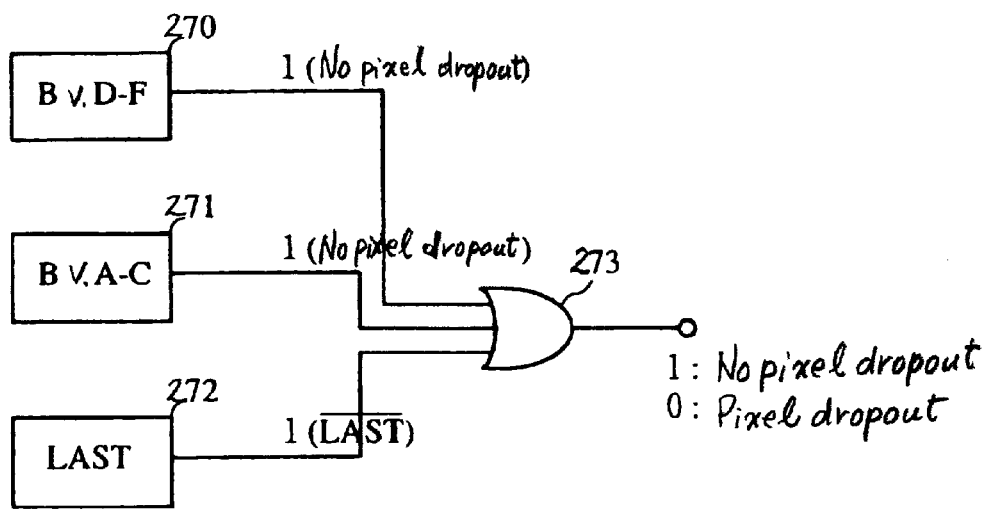
FIG. 24 is a circuit diagram of another portion of the pixel dropout detector of FIG. 19.

FIG. 24 is a circuit diagram of another portion of the pixel dropout detector 221. To detect pixel dropouts, this portion of the pixel dropout detector 221 comprises a B versus D–F comparison circuit 270 for comparing the point B against points D–F, a B versus A–C comparison circuit 271 for comparing the point B against the points A and C, a last sample detecting circuit 272, and an OR gate 273. The OR gate 273 outputs a state "1" indicating that no pixel dropout occurs if the B versus D–F comparison circuit 270 or the B versus A–C comparison circuit 271 detects that there is no pixel dropout or the last sample detecting circuit 272 detects that the point B is not a last sampling point. On the contrary, the OR gate 273 outputs a state "0" indicating that a pixel dropout occurs if both the B versus D–F comparison circuit 270 and the B versus A–C comparison circuit 271 output "0" and the last sample detecting circuit 272 detects that the point B is a last sampling point.

As depicted in FIG. 24, the process of pixel dropout detection with respect to the point B includes two operations carried out independently of each other. These are a comparison of the point B against each of the points D–F and a comparison of the point B against the points A and C. These comparisons are carried out differently in individual sector areas.

FIGS. 25A–25B and 26 are diagrams illustrating the operation of the B versus A–C comparison circuit 271.

FIGS. 25A–25B depict how a pixel dropout is detected in different sector areas. For the purpose of pixel dropout detection performed by the pixel dropout detector 221, the full-circle area is divided into eight sectors, numbered sector 0 to sector 7 clockwise as shown in FIG. 18.

When the points A–C are located in sector 0 as shown in FIG. 25A, for example, it is possible to judge that a pixel dropout occurs at a given pixel X in some cases while it is impossible in other cases. Specifically, it is impossible to judge whether a pixel dropout occurs at the pixel X if both x- and y-carries occur when moving from the point B to the point C. If an x-carry occurs when there is no y-carry, it is apparent that no pixel dropout occurs at the pixel X. In this case, it is not necessary to take into consideration the point A because it is never allocated to the pixel X.

When the points A–C are located in sector 1 as shown in FIG. 25B, it is impossible to judge whether a pixel dropout occurs at the pixel X if both x- and y-carries occur when moving from the point A to the point B. If a y-carry occurs when there is no x-carry, it is apparent that no pixel dropout occurs at the pixel X. In this case, it is not necessary to take into consideration the point C because it is never allocated to the pixel X.

As discussed above referring to the examples of FIGS. 25A–25B, sampling points which may be disregarded in performing the pixel dropout detection process and conditions for judging that no pixel dropout occurs vary depending on in which sector the point B is located. It is possible to simplify the pixel dropout detection process and the circuit configuration for performing it by excluding the aforementioned "irrelevant" sampling points which may be disregarded.

Figure 27:
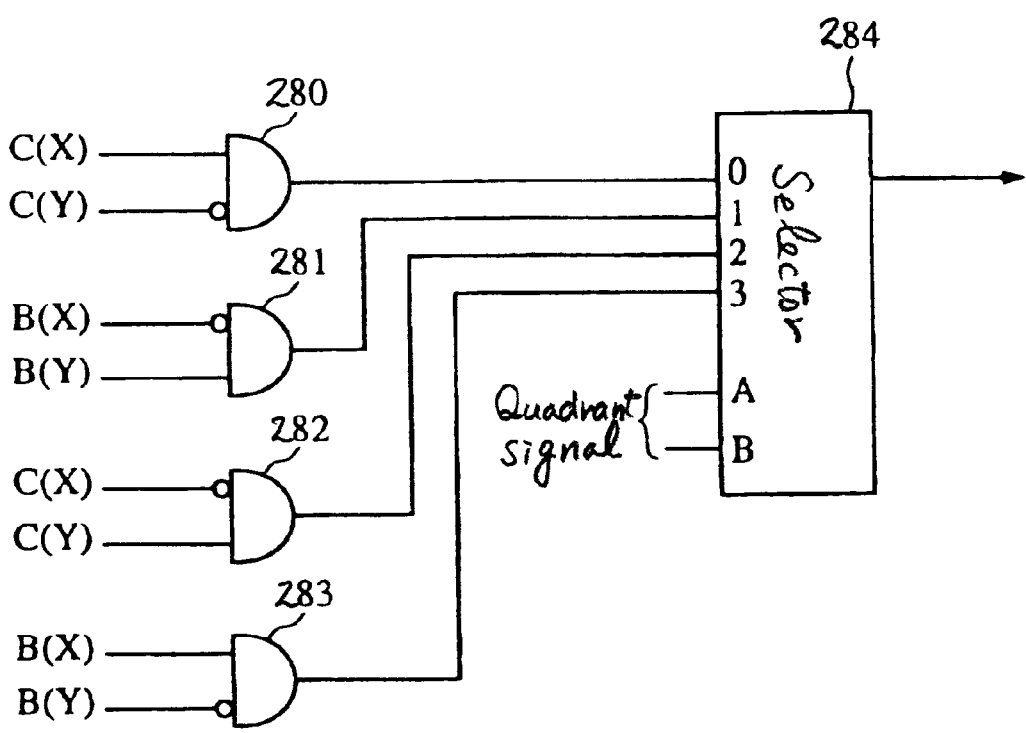
FIG. 27 is a circuit diagram of a B versus A–C comparison circuit of FIG. 24.
Figure 28:
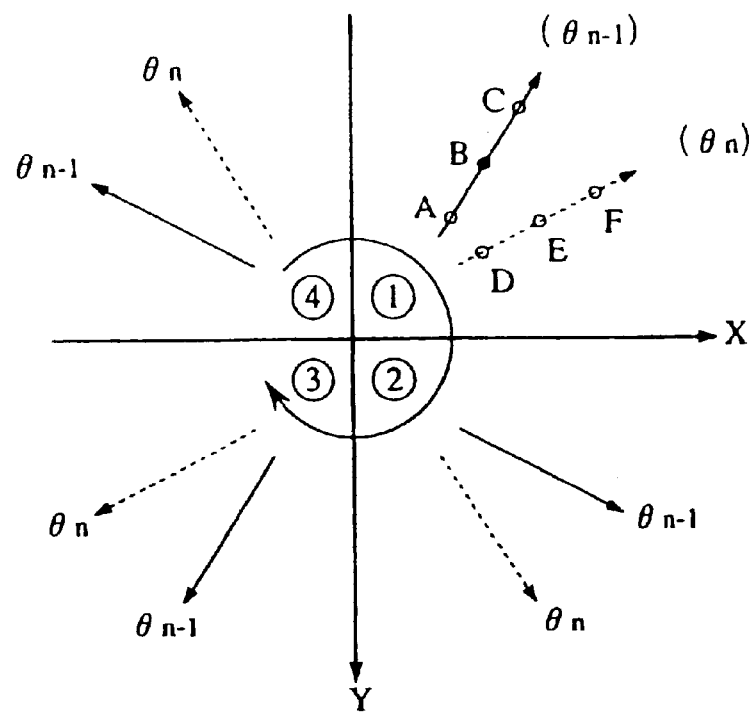
FIGS. 28A and 28B show how the point B and the points D–F are located in each quadrant when the scanning direction is clockwise and counterclockwise, respectively.
Figure 28:
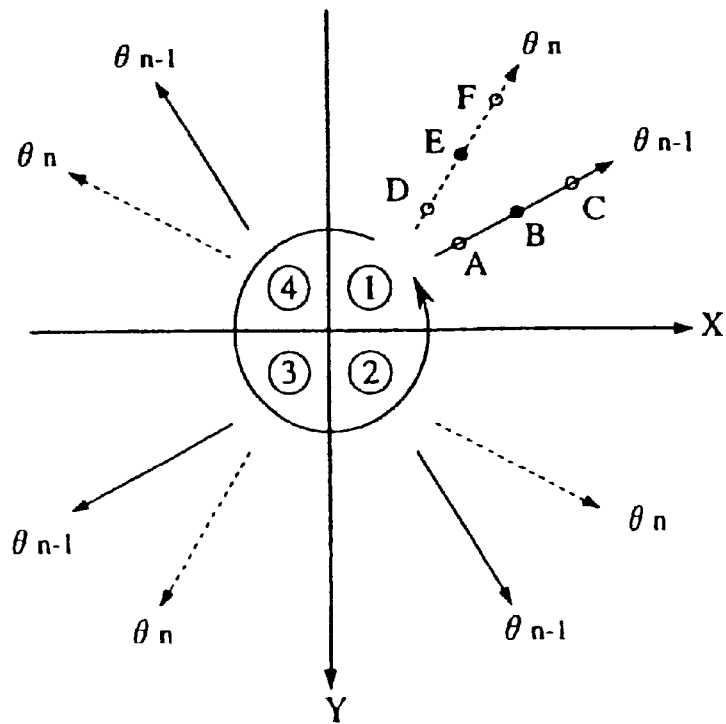

A chart in FIG. 26 shows sampling points to be checked and conditions for judging that no pixel dropout occurs in the individual sectors 0–7 for both clockwise and counter-clockwise scanning directions. FIG. 27 is a circuit diagram of the B versus A–C comparison circuit 271 which can perform the pixel dropout detection process according to the conditions prescribed in FIG. 26.

As can be seen from FIG. 26, there are cases where the same check items and conditions are applied to certain groups of sectors. For example, the sectors 0 and 4 have the same check items and conditions. It is understood from FIG. 26 that the B versus A–C comparison circuit 271 can be configured for four groups of sectors. FIG. 27 shows an example of circuit configuration thus constructed.

In the circuit configuration of FIG. 27, a gate 280 is for making a judgment on the presence or absence of x- and y-carries in the sectors 0 and 4 shown in FIG. 26. Similarly, a gate 281 is for making the same judgment in the sectors 1 and 5, a gate 282 is for making the same judgment in the sectors 2 and 6, and a gate 283 is for making the same judgment in the sectors 3 and 7. Outputs of these gates 280–283 are entered into a selector 284 which selects one of the outputs of the gates 280–283 in accordance with a sector group signal.

Referring now to FIGS. 28 to 34, the B versus D–F comparison circuit 270 of FIG. 24 is described below.

Figure 14:
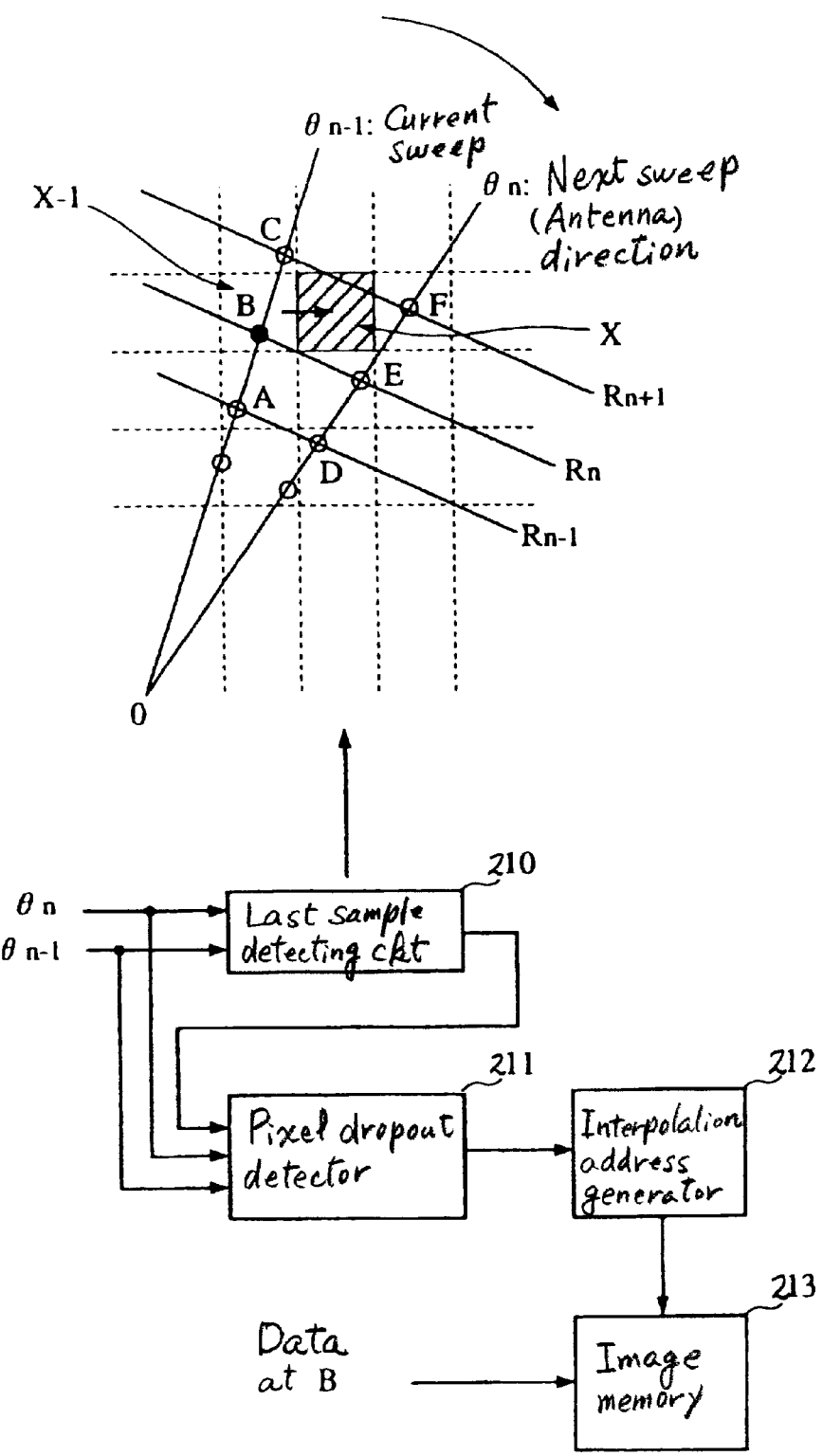
FIG. 14 is a diagram showing a circuit configuration for carrying out a first method of pixel data interpolation and its working in a radar system according to the invention.

It is possible to make a judgment as to whether the pixel X of FIG. 14 coincides with any of pixels to which the points D–F are allocated based on the difference between the total number of carries from the sweep origin 0 to the point B and the total number of carries from the sweep origin 0 to each of the points D–F.

Since the point B and the points D–F are allocated to the same pixel when they are located in the vicinity of the sweep origin, there is no difference in the number of carries. Each time a difference occurs in the number of carries as the sampling points are shifted outward away from the sweep origin 0, the number of times the difference has occurred is counted. The result of this counting operation represents a positional relationship between the point B and the points D–F. Two successive sweep lines are gradually separated from each other radially outward and, therefore, once the difference in the number of carries has reached a value over 1, it will not be decreased back to 1 or 0. Accordingly, once the difference in the number of carries has reached a proper value, it is no longer necessary count further. Then, the counting operation may be stopped, and it is possible to assume that pixels to which two sampling points taken on the two successive sweep lines are allocated are sufficiently separated from each other. Based on this assumption, the counting operation can be performed by a small-scale counter having a capacity of a few bits.

Since the point B and the points D–F are located on two different sweep lines, it is necessary to alter the counting direction depending on in which quadrant the two sweep lines are allocated.

There are the following three cases, (a) to (c), with respect to locations of two successive sweep lines.

Case (a):

Two sweep lines are located in quadrants in two opposite directions in this case (e.g., one sweep line in the first quadrant and the other sweep line in the third quadrant). Pixel dropouts always occur in this case. Although this case is theoretically possible, it is quite unrealistic to expect this case to happen, except in quite unusual circumstances. This type of pixel dropouts is excluded from consideration in performing pixel interpolation.

Case (b):

Two sweep lines are located in the same quadrant in this case. In this case, carry pulses are counted when a carry occurs at only one of two sampling points on two successive sweep lines. This is because if there are carries for both of the two sampling points, both carries cancel each other out, without causing any difference in the number of carries. The carry pulses for the sampling points on the two sweep lines are counted in opposite directions. This is because if a carry first occurs at the point B and next at the point E, two carries cancel each other out, eliminating the difference in the number of carries.

Case (c):

Two sweep lines are located in two adjacent quadrants in this case. This case will be described later in detail.

In Case (b) above, it is necessary to alter the carry counting direction depending on in which quadrant the two sweep lines are allocated.

Figures 29, 30:
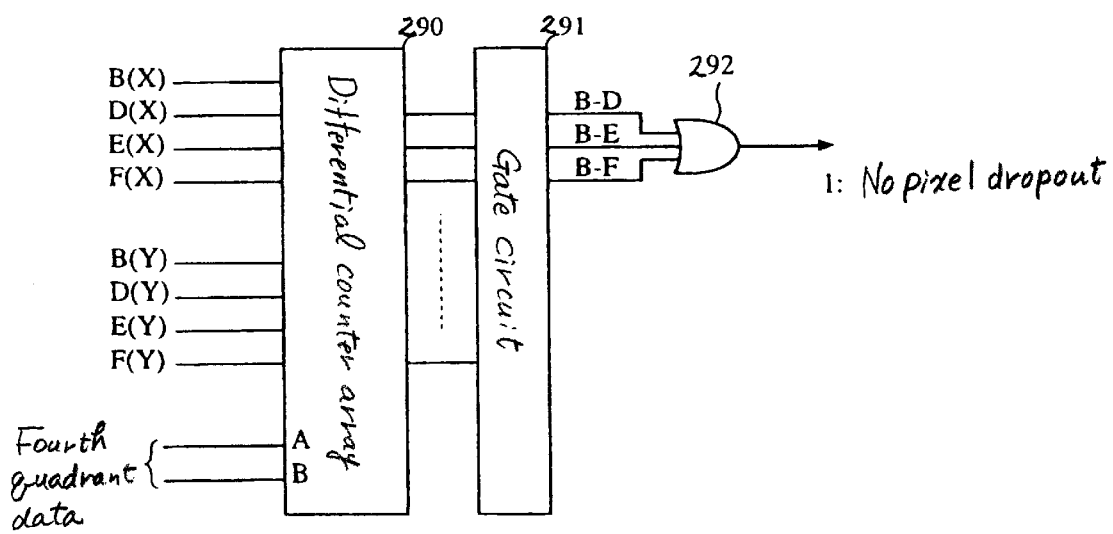
FIG. 29 is a chart showing counting directions of x- and y-carries applicable when the scanning direction is clockwise and counterclockwise in comparing the point B against the points D–F.
FIG. 30 is a circuit diagram of a B versus D–F comparison circuit of FIG. 24.

FIG. 28A shows how the point B and the points D–F are located in each quadrant when the scanning direction is clockwise and FIG. 28B shows how the point B and the points D–F are located in each quadrant when the scanning direction is counterclockwise. FIG. 29 is a chart showing counting directions of x- and y-carries applicable when the scanning direction is clockwise and counterclockwise.

When the scanning direction is clockwise as shown in FIG. 28A, for example, x-carries in the current beam direction $\theta_n$ are counted in the ascending (+: positive) direction while x-carries in the preceding beam direction $\theta_{n-1}$ are counted in the descending (−: negative) direction in the first quadrant. Plus and minus signs indicating the carry counting direction in FIG. 29 are determined such that count values are always positive (+). Accordingly, the count value of x-carries in the current beam direction $\theta_n$ is always larger than the count value of x-carries in the preceding beam direction $\theta_{n-1}$ in the first quadrant and, thus, the counting direction is positive (+) in the current beam direction $\theta_n$, negative (−) in the preceding beam direction $\theta_{n-1}$. For similar reasons, y-carries in the direction $\theta_n$ are counted in the descending (−: negative) direction while y-carries in the direction $\theta_{n-1}$ are counted in the ascending (+: positive) direction in the first quadrant so that count values are always positive (+)

Figure 31:
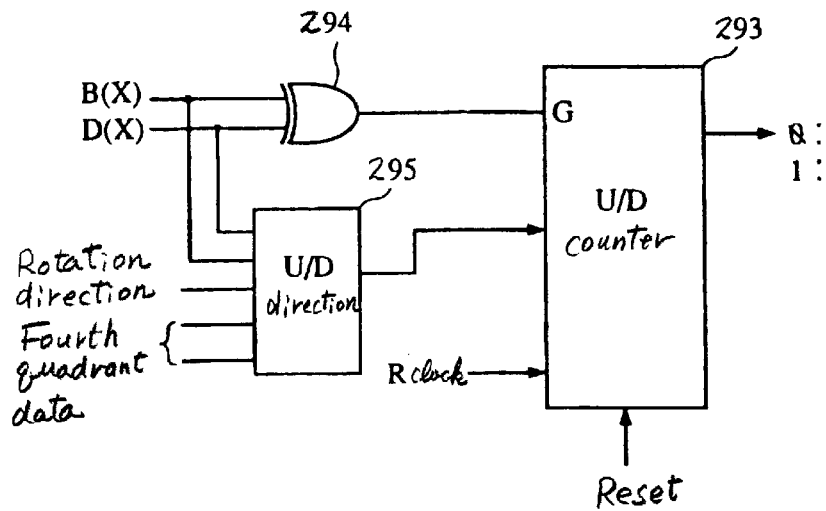
FIG. 31 is a circuit diagram of a differential counter circuit.

FIG. 30 is a circuit diagram of the B versus D–F comparison circuit 270 of FIG. 24, and FIG. 31 is a circuit diagram of a differential counter circuit which constitutes part of the B versus D–F comparison circuit 270. A differential counter array 290 of FIG. 30 is formed of an array of up/down counters 293 and associated circuits. The differential counter array 290 calculates the differences in the number of carries counted in the directions shown in FIG. 29 for pairs of sampling points B–D, B–E and B–F. For example, the differential counter circuit shown in FIG. 31 is for calculating the difference in the number of carries between the points B and D.

The differential counter circuit of FIG. 31 is formed of an up/down counter 293, an exclusive OR gate 294 and an up/down direction identification circuit 295. The exclusive OR gate 294 causes the up/down counter 293 to perform the counting operation when a carry occurs at only one of the points B and D. The up/down direction identification circuit 295 determines the carry counting direction according to the chart of FIG. 29. The up/down counter 293 outputs a state "0" or "1", wherein "0" indicates that the point D is allocated to the same pixel as the point B and "1" indicates that the pixel to which the point D is allocated is displaced by unit length 1 in the X-axis direction from the pixel to which the point B is allocated.

Figure 32:
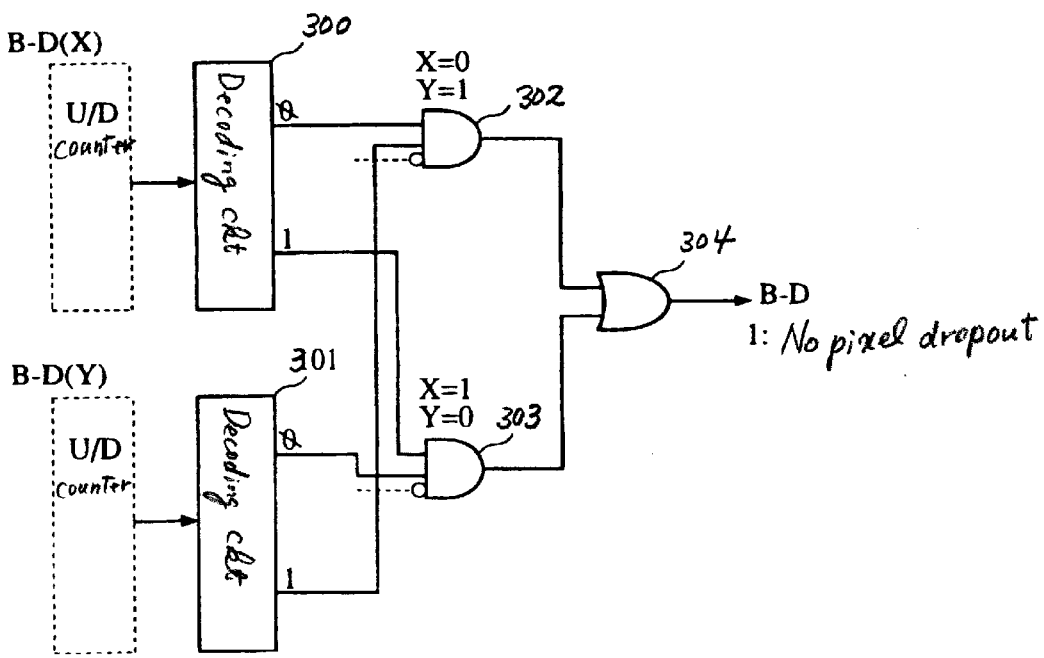
FIG. 32 is a circuit diagram of a portion of a gate circuit of FIG. 30.

FIG. 32 is a circuit diagram of a portion of a gate circuit 291 shown in FIG. 30. In FIG. 32, decoding circuits 300, 301 decode outputs of the up/down counters 293 and outputs of the decoding circuits 300, 301 are sent to AND gates 302, 303.

The AND gate 302 outputs a state "1" when the difference in the number of x-carries is 0 and the difference in the number of y-carries is 1 between the points B and D (i.e., X=0, Y=1). This corresponds to a case in which the pixel to which the point D is allocated is displaced by unit length 1 in the Y-axis direction from the pixel to which the point B is allocated in sector 0, 3, 4 or 7 and, thus, no pixel dropout occurs in this case. The AND gate 303 outputs a state "1" when the difference in the number of x-carries is 1 and the difference in the number of y-carries is 0 between the points B and D (i.e., X=1, Y=0) This corresponds to a case in which the pixel to which the point D is allocated is displaced by unit length 1 in the X-axis direction from the pixel to which the point B is allocated in sector 1, 2, 5 or 6 and, thus, no pixel dropout occurs in this case. While the portion of the gate circuit 291 shown in FIG. 32 is for examining the possibility of a pixel dropout between the sampling points B and D, the gate circuit 291 includes similar circuit portions for examining the possibility of a pixel dropout between the point B and the other sampling points than the point D.

An OR gate 292 shown in FIG. 30 produces a logical sum of outputs of the gate circuit 291 for the pairs of sampling points B–D, B–E and B–F. This logical sum is output from the OR gate 292 as an output of the B versus D–F comparison circuit 270. A state "1" output from the OR gate 292 indicates that there is no pixel dropout between the sampling points B–D, B–E or B–F.

The foregoing discussion made with reference to FIGS. 15–19 has dealt with Case (b) in which both the current sweep line in the preceding beam direction $\theta_{n-1}$ and the next sweep line in the current beam direction $\theta_n$ are located in the same quadrant. In Case (c) in which the two sweep lines are located in two adjacent quadrants, the carry counting operation is performed as described below.

Figure 33A:
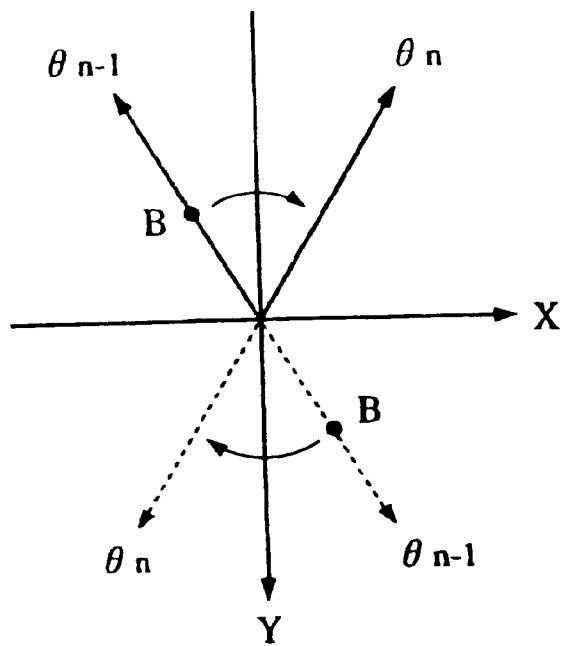
FIGS. 33A and 33B show situations in which two successive sweep lines are located in two adjacent quadrants.
Figure 33B:
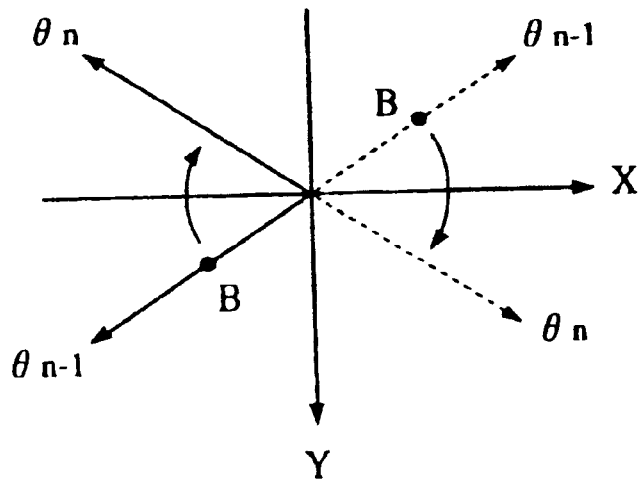

FIGS. 33A and 33B show situations in which the two successive sweep lines are located on both sides of the Y- and X-axes, respectively.

Situation (A):

In Situation (A) depicted in FIG. 33A, x-carry pulses are countedwhena carry occurs at least at one of two sampling points on the two successive sweep lines, and y-carry pulses are counted when a carry occurs at only one of two sampling points on the two successive sweep lines. The x-carry pulses for the sampling points on the two sweep lines are counted in the same direction, while the y-carry pulses for the sampling points on the two sweep lines are counted in opposite directions. Since the two sweep lines are in different quadrants located on opposite sides of the Y-axis in Situation (A), the difference in the number of x-carry pulses simply increases (and never decreases) as the sampling points on the two sweep lines are shifted outward away from the sweep origin. This is why the carry counting operation is performed in the above-mentioned manner.

Situation (B):

In Situation (B) depicted in FIG. 33B, x-carry pulses are counted when a carry occurs at only one of two sampling points on the two successive sweep lines, and y-carry pulses are counted when a carry occurs at least at one of two sampling points on the two successive sweep lines. The x-carry pulses for the sampling points on the two sweep lines are counted in opposite directions, while the y-carry pulses for the sampling points on the two sweep lines are counted in the same direction. Since the two sweep lines are in different quadrants located on opposite sides of the X-axis in Situation (B), the difference in the number of y-carry pulses simply increases (and never decreases) as the sampling points on the two sweep lines are shifted outward away from the sweep origin. This is why the carry counting operation is performed in the above-mentioned manner.

It is to be noted that the change in the count value of x-carries in Situation (A) and the count value of y-carries in Situation (B) is 1 even when a carry occurs at two sampling points on both of the two successive sweep lines, actually creating a difference of 2 in the number of carry pulses. This is because the count value is incremented by only 1 at one time. As it is impossible to discriminate between 1 and 2, the following method is used to discriminate them.

Since the two sweep lines are in different quadrants, the difference in the number of x- or y-carry pulses simply increases (and never decreases) as the sampling points on the two sweep lines are shifted outward away from the sweep origin. The difference in the number of carry pulses to be detected is 0, 1, 2 or above. If the difference is 2 or above, it is certain that a pixel dropout occurs. In this circumstance, provision is made to detect the occurrence of simultaneous carries at two sampling points on the two successive sweep lines. When this has been detected, it can be assumed that any two sampling points accessed later on the two successive sweep lines are not allocated to adjacent pixels.

Figure 34:
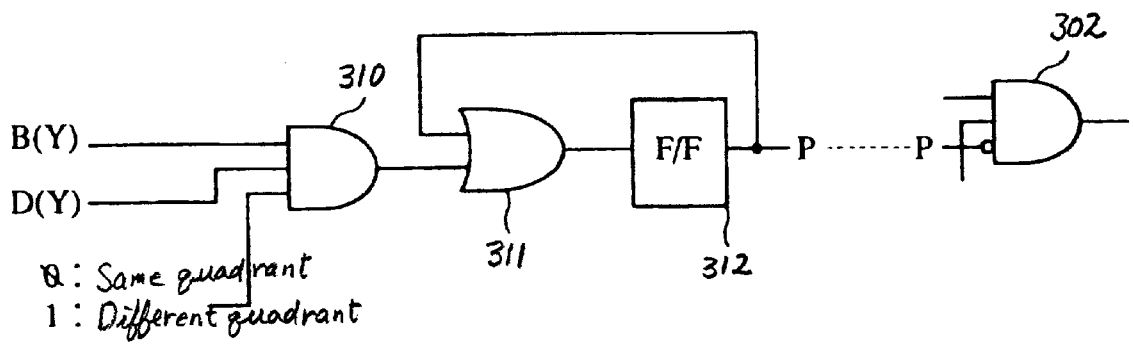
FIG. 34 is a circuit diagram of a processing circuit for detecting the occurrence of simultaneous y-carries at two sampling points on two successive sweep lines located in adjacent quadrants on opposite sides of the X-axis.

FIG. 34 is a circuit diagram of a processing circuit for detecting the occurrence of simultaneous y-carries at the two sampling points B and D on the two successive sweep lines located in adjacent quadrants on opposite sides of the X-axis (Situation (B) of FIG. 33B).

If y-carries occur simultaneously at the points B and D when the two sweep lines are located in adjacent quadrants on opposite sides of the X-axis as shown in FIG. 33B, an AND gate 310 of FIG. 34 outputs a state "1". This state "1" is stored by a combination of an OR gate 311 and a flip-flop 312 and preserved thereafter. An output P of the flip-flop 312 is entered into the AND gate 302 of FIG. 32.

When the output P is "1", or when y-carries have occurred simultaneously on the two sweep lines located on opposite sides of the X-axis, the AND gate 302 outputs a state "0". Since the AND gate 302 (FIG. 32) is a gate for detecting the status expressed by (X=0, Y=1), signals produced at the occurrence of simultaneous y-carries at the points B and D are considered as conditions for outputting the state "0". Similarly, for the AND gate 303 of FIG. 32, signals produced at the occurrence of simultaneous x-carries at the points B and D are considered as conditions for outputting the state "0". Processing circuits having the same configuration as FIG. 34 are connected individually to AND gates of the circuit portions (not shown) of the gate circuit 291 for the pairs of sampling points B–E and B–F.

The last sample detecting circuit 272 of FIG. 24 is now described in detail.

Figure 35:
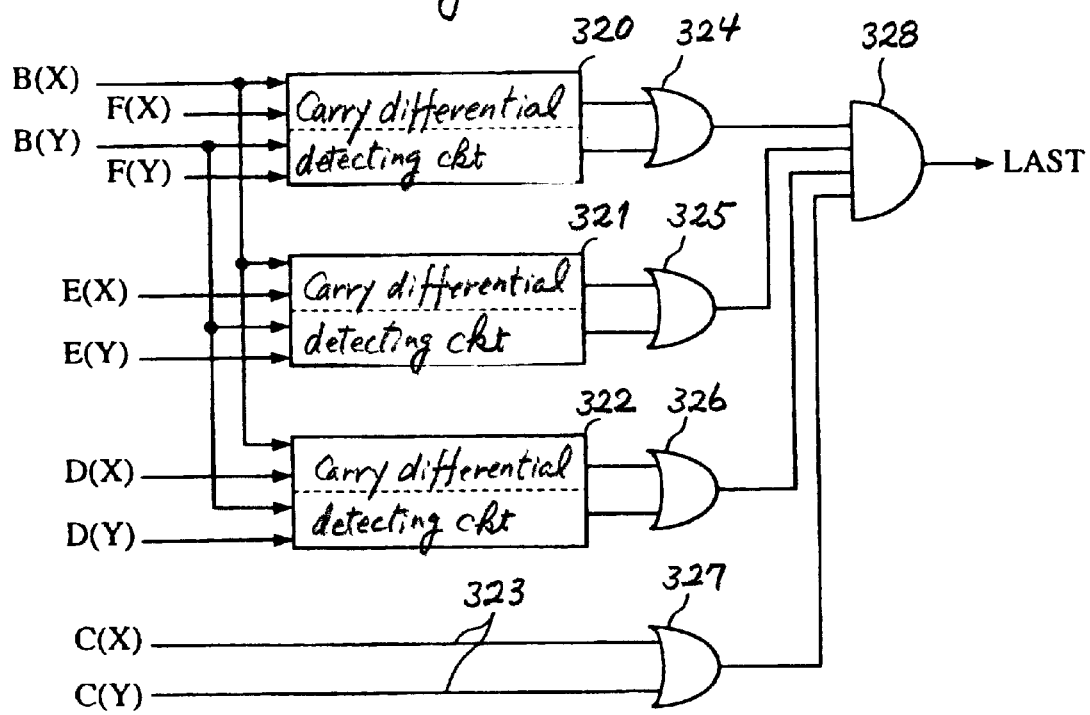
FIG. 35 is a circuit diagram of a last sample detecting circuit of FIG. 24.

As previously discussed with reference to FIG. 14, it is possible to judge that the point B is a last sampling point when none of the pixels to which the points C–F are allocated coincides with the pixel to which the point B is allocated. FIG. 35 is a circuit diagram of the last sample detecting circuit 272 of FIG. 24. Individual carry signals to be input to the last sample detecting circuit 272 are obtained from the circuit shown in FIG. 23. In FIG. 35, counters 320–322 detect the differences in the number of x- and y-carry pulses. These counters 320–322 are carry differential detecting circuits formed of up/down counters which count up or down only when there is a difference in the number of input carry pulses.

Referring to FIG. 14, two adjacent sampling points in the preceding beam direction (current sweep direction) $\theta_{n-1}$ and the current beam direction (next sweep direction) $\theta_n$ to be subjected to a sample allocation judgment for determining whether the sampling points are allocated to the same pixel (coordinates) are successively shifted outward away from the sweep origin 0 at a rate determined by the clock signal R. If two sampling points in the directions $\theta_{n-1}$ and $\theta_n$ to be subjected to the sample allocation judgment are allocated to the same pixel (coordinates), there is no difference in the number of carry pulses between the two sampling points. If the two sampling points are allocated to different pixels (coordinates), however, there arises a difference in the number of carry pulses. If there is a carry for the sampling point in the current beam direction (next sweep direction) $\theta_n$ and there is no carry for the sampling point in the preceding beam direction (current sweep direction) $\theta_{n-1}$, for example, the relevant counter is caused to count up by one. Contrary to this, if there is no carry for the sampling point in the current beam direction (next sweep direction) $\theta_n$ and there is a carry for the sampling point in the preceding beam direction (current sweep direction) $\theta_{n-1}$, the relevant counter is caused to count down by one. If there is a carry for the sampling point in each of the directions $\theta_{n-1}$ and $\theta_n$, or if there is no carry for the sampling point in either of the directions $\theta_{n-1}$ and $\theta_n$, the counter does not count up or down. This operation is performed on successive sampling points on each sweep line outward away from the sweep origin 0 according to the clock signal R. If the count value of the counter into which carry pulses for the points B and F of FIG. 14 are entered is "0", for example, the points B and F are allocated to the same pixel. If, however, the count value of the counter is "1", the point F is allocated to a pixel next to a pixel to which the point B is allocated. The counting (ascending or descending) direction of the aforementioned counter varies depending on in which quadrant the sweep line is located.

Figure 15A:
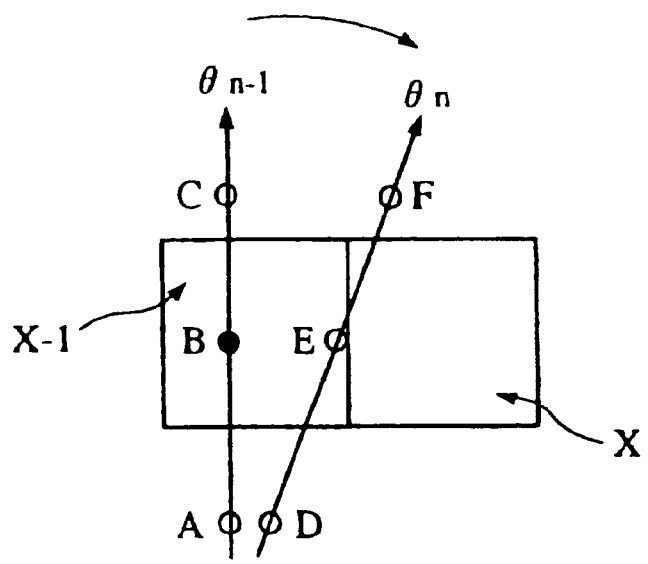
FIGS. 15A and 15B are diagrams showing why point B must be a last sampling point allocated to pixel X−1 when performing pixel data interpolation depicted in FIG. 14.
Figure 15B:
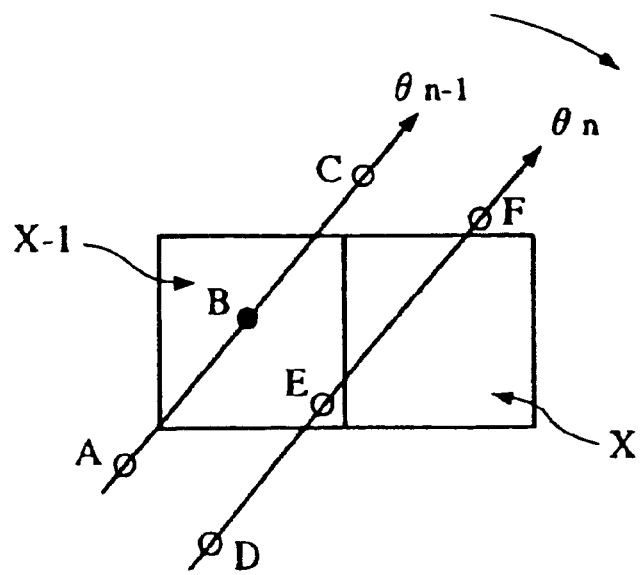

FIGS. 15A and 15B show carry counting (ascending or descending) directions in the first to fourth quadrants applicable when the scanning direction is clockwise and counterclockwise, respectively.

When the radar antenna 1 rotates clockwise, the sampling point in the current beam direction (next sweep direction) $\theta_n$, among the two sampling points to be subjected to the sample allocation judgment, precedes the sampling point in the preceding beam direction (current sweep direction) $\theta_{n-1}$ with respect to the number of x-carry pulses in the first quadrant. Thus, the x-carry pulses for the sampling points in the direction $\theta_n$ are counted in the ascending direction (+) and those in the direction $\theta_{n-1}$ are counted in the descending direction (−) in the first quadrant so that the difference in the number of the x-carry pulses has a positive (+) value. On the other hand, the sampling point in the preceding beam direction (current sweep direction) $\theta_{n-1}$, among the two sampling points to be subjected to the sample allocation judgment, precedes the sampling point in the current beam direction (next sweep direction) $\theta_n$ with respect to the number of y-carry pulses in the first quadrant. Thus, the y-carry pulses for the sampling points in the direction $\theta_{n-1}$ are counted in the ascending direction (+) and those in the direction $\theta_n$ are counted in the descending direction (−) in the first quadrant so that the difference in the number of the y-carry pulses has a positive (+) value.

FIG. 29 shows the counting directions of x- and y-carries applicable when the scanning direction is clockwise and counterclockwise in comparing the point B against the points D–F in the individual quadrants.

Referring again to FIG. 35, the counters 320–322 give the differences in the number of carry pulses between the point B and each of its adjacent sampling points shown in FIG. 14. More particularly, the counter 320 gives the difference in the number of x-carry pulses and the difference in the number of y-carry pulses between the points B and F, the counter 321 gives the difference in the number of x-carry pulses and the difference in the number of y-carry pulses between the points B and E, and the counter 322 gives the difference in the number of x-carry pulses and the difference in the number of y-carry pulses between the points B and D.

Of these three counters 320–322, the counter 120 for obtaining the difference in the number of x-carry pulses between the points B and F, for example, gives the count value "1" when the number of the x-carry pulses from the sweep origin 0 for the point B differs from that for the point F. It is not necessary to provide any dedicated circuit for detecting the difference in the number of carry pulses between sampling points on the same sweep line. This is because if a carry occurs when the sampling point is shifted from the point B to point C in the preceding beam direction (current sweep direction) $\theta_{n-1}$ of FIG. 14, creating a difference in the number of carry pulses between the points B and C, for example, it is apparent that these sampling points (B and C) are allocated to different pixels. Therefore, lines 323 shown in FIG. 35 convey the x- and y-carry pulses for the point C directly to a gate circuit in a succeeding stage.

OR gates 324–327 individually produce logical sums of signals output from the counters 320–322 and signals delivered through the lines 323. Outputs of these OR gates 324–327 are entered into an AND gate 328. The AND gate 328 outputs a state "1" when all the inputs are "1", that is, when none of the adjacent four points C–F is allocated to the same pixel as the point B. The state "1" output from the AND gate 328 indicates that the point B is the last sampling point.

As shown in the foregoing discussion, the OR gate 273 of FIG. 24 outputs a state "0" indicating that a pixel dropout occurs only when the outputs of the B versus D–F comparison circuit 270, the B versus A–C comparison circuit 271 and the last sample detecting circuit 272 are all "0".

The interpolation address generator 223 of FIG. 19 is now described below.

Since the main cause of pixel dropouts is that successive sweep lines spread in fanlike form away from the sweep origin 0, it is preferable to interpolate the pixel dropouts using image data borrowed from nearby pixels located in the tangential direction, rather than the radial direction.

Referring once again to FIG. 14, the interpolation address for the pixel X to be interpolated is obtained by incrementing the address of the pixel X–1 by 1 in the X-axis direction when the point B has been judged to be a last sampling point and a pixel dropout has been detected by the pixel dropout detector 221. It is to be noted, however, that the interpolation address should be obtained by decrementing the address of the pixel X–1 by 1 in the X-axis direction, or by incrementing or decrementing the address of the pixel X–1 by 1 in the Y-axis direction, depending on the locations of the relevant sweep lines are located. More particularly, whether the address of the pixel X–1 should be incremented or decremented in the X- or Y-axis direction is determined depending on in which one of the eight sectors the point B is located, and on the scanning direction.

Figure 36A:
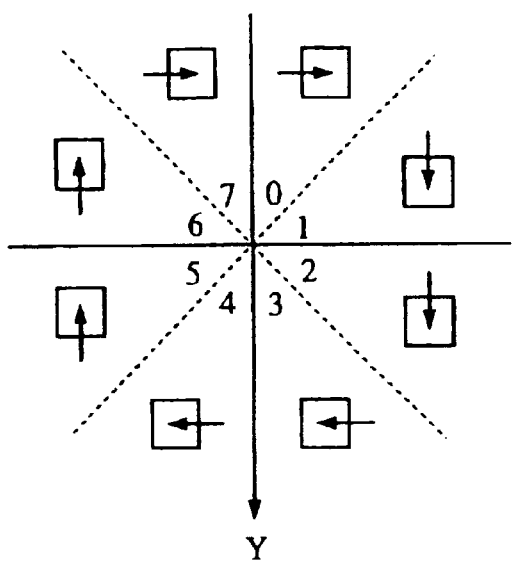
Figure 36B:
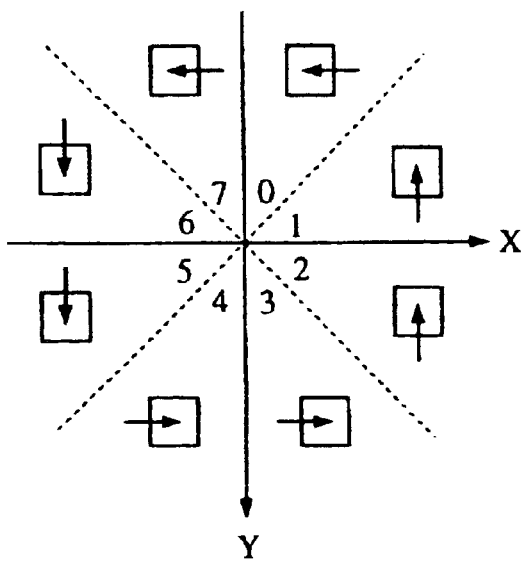

FIGS. 36A–36B show in which direction a pixel dropout should be interpolated depending on the location of the pixel X to be interpolated and the scanning direction, wherein FIG. 36A is for clockwise scanning and FIG. 36B is for counterclockwise scanning. If the scanning direction is clockwise and a pixel dropout exists in sector 0, for example, the pixel X to be interpolated is obtained by incrementing the address of the pixel X–1 by 1 in the X-axis direction. If the scanning direction is clockwise and the pixel X–1 to which the point B is allocated is located in sector 1, the pixel X to be interpolated is obtained by incrementing the address of the pixel X–1 by 1 in the Y-axis direction.

Figure 37:
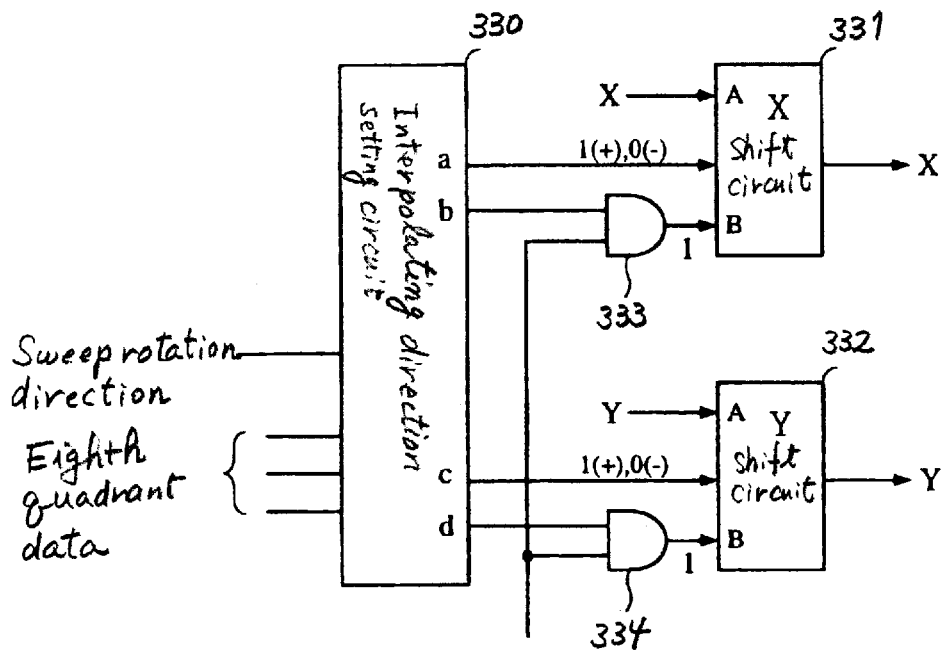
FIG. 37 is a circuit diagram of an interpolation address generator of FIG. 19.

FIG. 37 is a circuit diagram of the interpolation address generator 223 of FIG. 19.

An interpolating direction setting circuit 230 determines the direction of interpolation according to the chart shown in FIGS. 23A–23B, using the scanning direction and sector data which specifies one of the eight sectors in which the point B is located. The interpolating direction setting circuit 330 outputs interpolating direction data to an x-shift circuit 331, a y-shift circuit 332 and an AND circuits 333, 334. An interpolation signal output from the OR gate 273 of FIG. 24 is entered into the x-shift circuit 331 and the y-shift circuit 332 via the AND circuit 333 and the AND circuit 334, respectively. When the state of the interpolation signal is "1" (interpolation bar, or the inverse, is "0"), the x-shift circuit 331 shifts the x-coordinate of the pixel X to be interpolated by 1 or the y-shift circuit 332 shifts the y-coordinate of the pixel X to be interpolated by 1.

In the circuit configuration of FIG. 37, output terminals a and b of the interpolating direction setting circuit 330 give a state "1" and its output terminals c and d give a state "0" when the pixel X to be interpolated is located in sector 0, for example. If the state of the interpolation signal is "1" (interpolation required) in this case, the x-shift circuit 131 adds 1 entered from its input terminal B to the x-coordinate of the pixel X entered from its input terminal A, and outputs the result of addition.

When an interpolation address has been generated in the above-described manner, data derived from the point B and stored in the time-delay buffer 222 is written in the specified address of the image memory 207 to fill the pixel X to be interpolated. When the state of the interpolation signal is "0" (interpolation not required), the interpolation address generator 223 outputs the x- and y-coordinates of the pixel X without shifting to the image memory 207. The clock gate 24 of FIG. 19 temporarily suspends the operation of the primary memory 204, the secondary memory 205 and the time-delay buffer 222 to allow sufficient time for performing the above-described interpolating operation.

When a pixel dropout has been detected at the pixel X and the point B has been judged to be a last sampling point, the pixel X is interpolated using the data borrowed from its adjacent pixel X–1 to which the point B is allocated in the aforementioned fashion.

Figure 16:
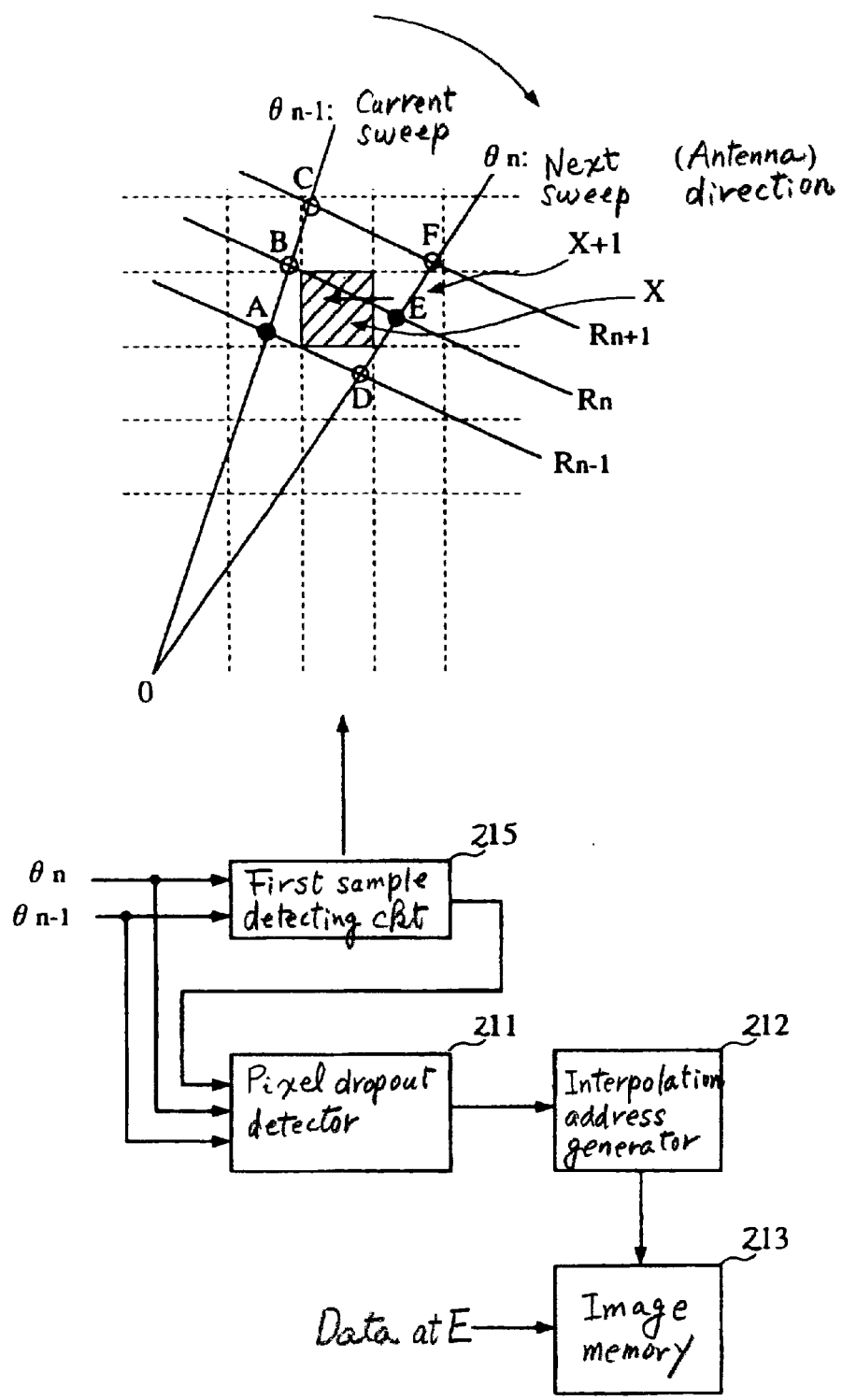
FIG. 16 is a diagram showing a circuit configuration for carrying out a second method of pixel data interpolation and its working in a radar system according to the invention.
Figure 17:
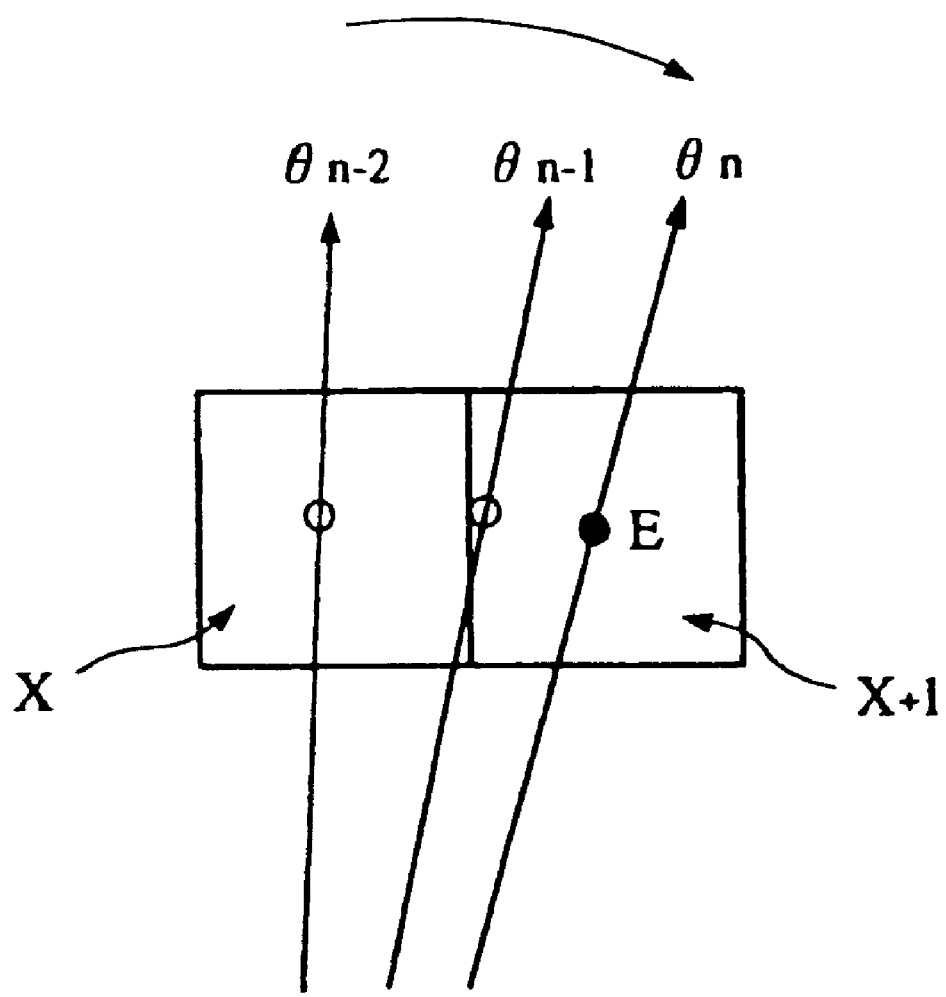
FIG. 17 is a diagram showing why point E must be a first sampling point allocated to pixel X+1 when performing pixel data interpolation depicted in FIG. 16.

While the foregoing embodiment is based on the circuit configuration shown in FIG. 14, it is possible to employ the circuit configuration of FIG. 16 in an alternative embodiment of the invention. In this second embodiment, a first sample detecting circuit 352 is provided instead of the last sample detecting circuit 272.

Figure 38:
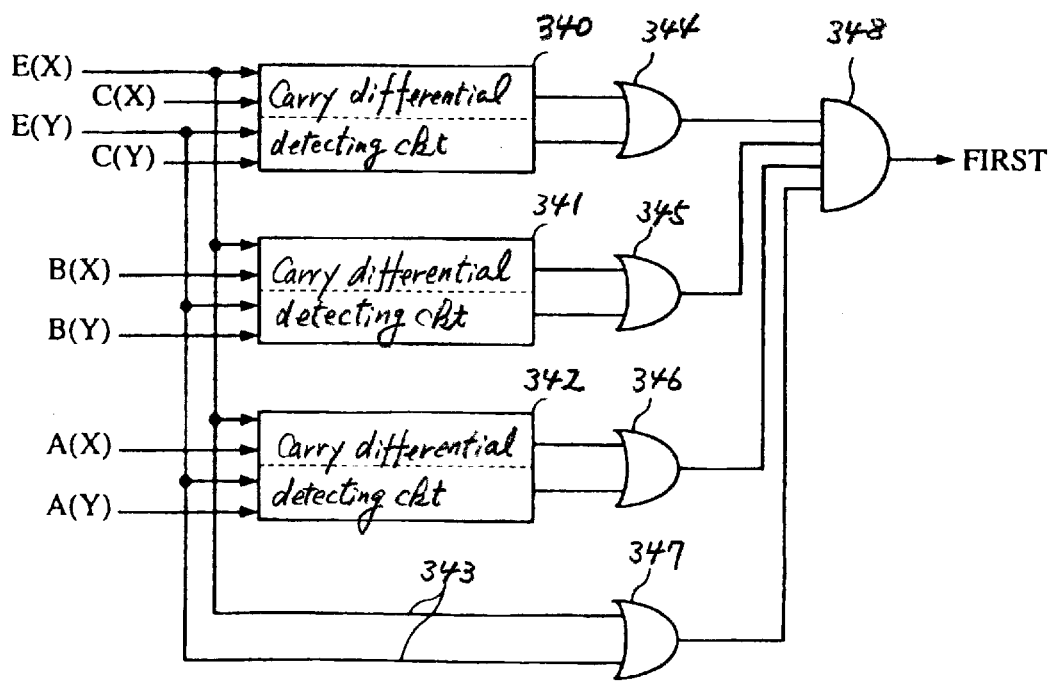
FIG. 38 is a circuit diagram of a first sample detecting circuit employed in another embodiment of the invention.

FIG. 38 is a circuit diagram of the first sample detecting circuit 352. Counters 340–342 for detecting the differences in the number of x- and y-carry pulses, OR gates 344–347 and an AND gate 348 are configured in the same way as the last sample detecting circuit 272 depicted in FIG. 35.

In the first sample detecting circuit 352, the point E shown in FIG. 16 is judged to be a first sampling point when none of the pixels to which the points A–D are allocated coincides with the pixel to which the point E is allocated. This first sample identification judgment is made by detecting the differences in the number of x- and y-carry pulses, in a manner similar to the earlier-described last sample identification judgment.

Figure 39:
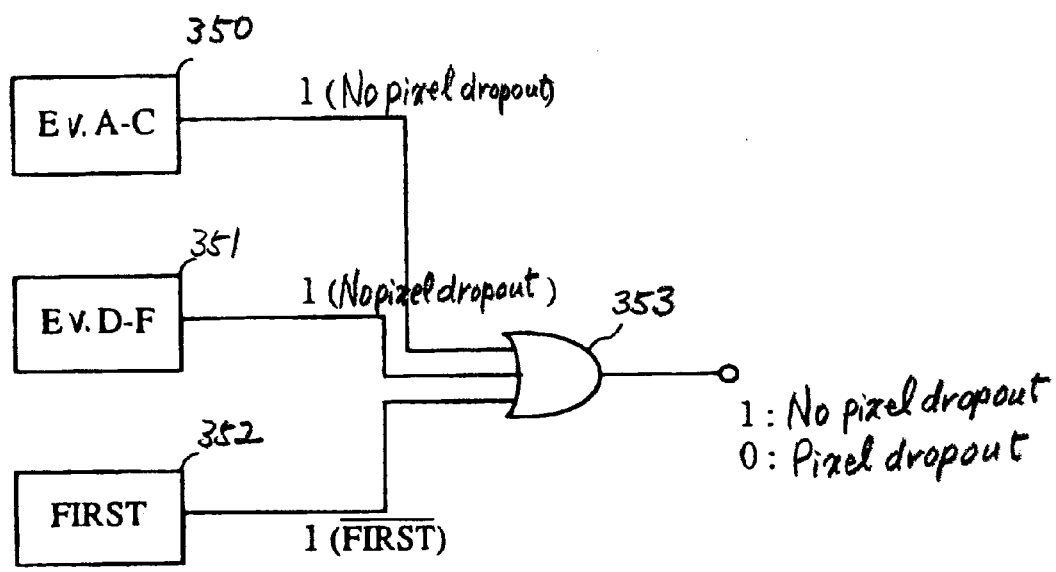
FIG. 39 is a circuit diagram of aportion of a pixel dropout detector of the embodiment.

The portion of the pixel dropout detector 221 shown in FIG. 19 is modified in the second embodiment as depicted in FIG. 39. An E versus A–C comparison circuit 350 judges whether a pixel dropout occurs at the pixel X based on a comparison of the point E against each of the points A–C. Likewise, an E versus D–F comparison circuit 351 judges whether a pixel dropout occurs at the pixel X based on a comparison of the point E against the points D and F. The first sample detecting circuit 352 is configured as shown in FIG. 38. Outputs of the E versus A–C comparison circuit 350, the E versus D–F comparison circuit 151 and the first sample detecting circuit 352 are entered into an OR gate 153. The OR gate 353 outputs a state "0" indicating that a pixel dropout occurs only when the outputs of the E versus A–C comparison circuit 150, the E versus D–F comparison circuit 351 and the first sample detecting circuit 352 are all "0".

While the second embodiment employs the interpolation address generator 223 having the same circuit configuration as shown in FIG. 37, plus and minus signs, or positive and negative directions, are inverted because the interpolating direction is reversed. The time-delay buffer 222 of FIG. 19 is not required in the second embodiment as it is not necessary to preserve received signals for one sweep line. The second embodiment has otherwise the same construction as the first embodiment.

Figure 40:
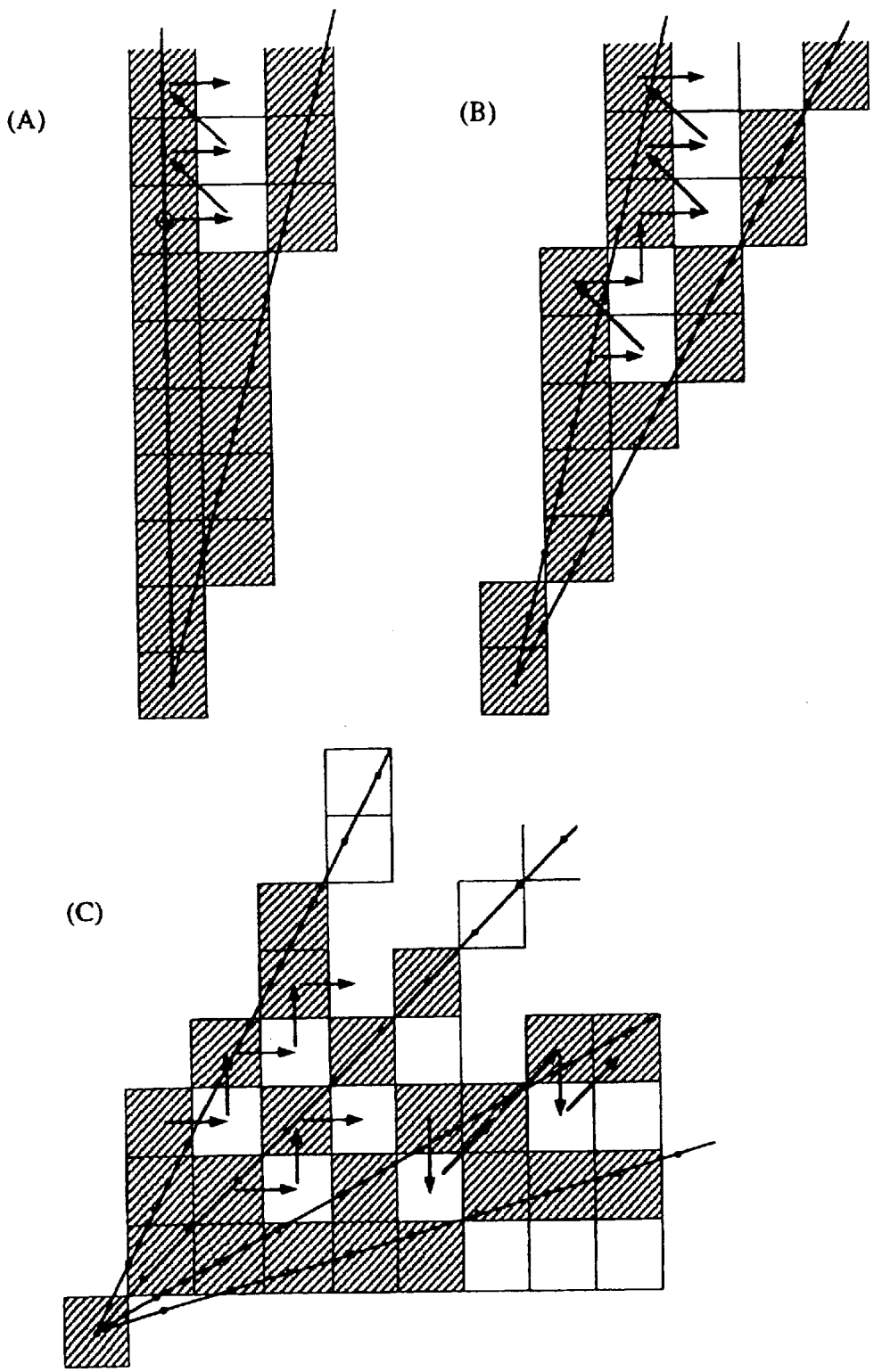
FIGS. 40A and 40C are diagrams showing three different patterns of the shifting of addresses.

FIGS. 40A–40C show three different patterns of the shifting of addresses (x- and y-coordinates output from the interpolation address generator 223) along successive sweep lines. In these different patterns, pixel dropouts are interpolated as shown by individual arrows.

Although the preferred embodiments of the invention have been illustrated and described in detail, it will be apparent to those skilled in the art that various modifications may be made therein without departing from the spirit of the invention or from the scope of the appended claims.

What is claimed is:

1. A radar or like system comprising:
   an image memory for storing signals defined in a Cartesian coordinate system which are converted from corresponding signals defined in a polar coordinate system;
   write data generating means for performing correlation operation on the data having been stored in said image memory means and fresh input data and for rewriting resultant correlation signals in the same memory elements of the image memory means for rotations of the antenna; and
   last sample detecting means for judging whether a pixel to which a sample point i on a first sweep line is allocated does not coincide with any of the pixels to which a plurality of adjacent sample points on the first sweep line $\theta_{n-1}$ and a second sweep line $\theta_n$ are allocated and for determining the sample point i as the last sample point if they are not coincident with each other;
   said write data generating means uses, when a sample point i is judged as the last sample point for a pixel, data having been obtained at the sample point i as the fresh input data.

2. A radar or like system as claimed in claim 1 wherein the plurality of adjacent sample points on the first sweep line and the second sweep line consists of four sample points as (1) a sample point adjacent to and in the outer side with respect to the sample point i on the first sweep line, (2) a sample point at the same distance from the sweep origin on the second sweep line and (3) two sample points on the second sweep line, which are adjacent to and on both sides of the same distance sample point.

3. A radar or like system as claimed in claim 1 further comprising:
   first sample detecting means for judging whether a pixel to which a sample point j on the second sweep line is allocated does not coincide with any of the pixels to which a plurality of adjacent sample points on the first sweep line $\theta_{n-1}$ and the second sweep line $\theta_n$ are allocated and for determining the sample point j as the first sample point if they are not coincident with each other;
   a memory for storing the maximum value data obtained at respective sample points for a pixel on the second sweep line;
   maximum value data extracting means for writing fresh input data obtained at a sample point j allocated to a pixel and on the second sweep line into said memory if this sample point j is determined as the first sample point, and for writing into said memory data having larger value out of fresh input data obtained at a sample point j or data corresponding to the pixel and previously having been stored in said memory if this sample point j is not determined as the first sample point; and
   the write data generating means uses, when a sample point i is judged as the last sample point, the data having been obtained at the sample point i for the pixel as the fresh input data.

4. A radar or like system as claimed in claim 3 wherein the plurality of adjacent sample points on the first sweep line and the second sweep line consists of four sample points as (1) a sample point adjacent to and in the inner side with respect to the sample point j on the second sweep line, (2) a sample point at the same distance from the sweep origin on the first sweep line and (3) two sample points on the first sweep line, which are adjacent to and on both sides of the same distance sample point.

5. A radar or like system as claimed in claim 3 wherein the memory comprises memory elements for storing data during the whole one sweep line.

6. A radar or like system as claimed in claim 5 wherein the memory delays in time received data by a time corresponding to the whole one sweep line.

7. A radar or like system comprising:
   a primary memory storing in real time received data;
   coordinate converter for converting a point defined in a polar coordinate system to a corresponding point defined in a Cartesian coordinate system;
   first sample detecting means for judging whether a pixel to which a sample point j on a second sweep line is allocated does not coincide with any of the pixels to which a plurality of adjacent sample points on a first sweep line $\theta_{n-1}$ and the second sweep line $\theta_n$ are allocated and for determining the sample point j as the first sample point if they are not coincident with each other;
   last sample detecting means for judging whether a pixel to which a sample point i on the first sweep line is allocated does not coincide with any of the pixels to which a plurality of adjacent sample points on the first sweep line $\theta_{n-1}$ and the second sweep line $\theta_n$ are allocated and for determining the sample point i as the last sample point if they are not coincident with each other;
   an image memory with a memory element corresponding to the resultant point converted by the coordinate converter and defined in a Cartesian coordinate system being accessed;
   a memory for storing the maximum value data for a pixel obtained at respective sample points on the second sweep line;
   maximum value data extracting means for writing fresh input data obtained at a sample point j allocated to a pixel and on the second sweep line into said memory if this sample point j is determined as the first sample point, and for writing into said memory data having larger value out of fresh input data obtained at a sample point j or data corresponding to the pixel and previously having been stored in said memory if this sample point j is not determined as the first sample point;
   the write data generating means uses, when a sample point i is judged as the last sample point, the data having been obtained at the sample point i for the pixel as the fresh input data; and
   an indicator for displaying the data output from said image memory.

8. A radar or like system as claimed in claim 1 wherein echo signals are received and sampled at points corresponding to the sample points the second sweep line drawn.

9. A radar or like system comprising:
   an antenna rotating at substantially constant speed, transmitting successively search signals and receiving echo signals in a direction corresponding to a second sweep line;

a primary memory storing in real time received data from said antenna;

coordinate converter for converting a point defined in a polar coordinate system to a corresponding point defined in a Cartesian coordinate system;

first sample detecting means for judging whether a pixel to which a sample point j on the second sweep line is allocated does not coincide with any of the pixels to which a plurality of adjacent sample points on a first sweep line $\theta_{n-1}$ and the second sweep line $\theta_n$ are allocated and for determining the sample point j as the first sample point if they are not coincident with each other;

last sample detecting means for judging whether a pixel to which a sample point i on the first sweep line is allocated does not coincide with any of the pixels to which a plurality of adjacent sample points on the first sweep line $\theta_{n-1}$ and the second sweep line $\theta_n$ are allocated and for determining the sample point i as the last sample point if they are not coincident with each other;

an image memory with a memory element corresponding to the resultant point converted by the coordinate converter and defined in a Cartesian coordinate system being accessed;

a memory for storing the maximum value data for a pixel obtained at respective sample points on the second sweep line;

maximum value data extracting means for writing fresh input data obtained at a sample point j allocated to a pixel and on the second sweep line into said memory if this sample point j is determined as the first sample point, and for writing into said memory data having larger value out of fresh input data obtained at a sample point j or data corresponding to the pixel and previously having been stored in said memory if this sample point j is not determined as the first sample point;

the write data generating means uses, when a sample point i is judged as the last sample point, the data having been obtained at the sample point i for the pixel as the fresh input data; and an indicator for displaying the data output from said image memory.

10. An image data writing method for a radar or like system comprising:

step for storing in an image memory signals defined in a Cartesian coordinate system which are converted from corresponding signals defined in a polar coordinate system;

step for performing correlation operation on the data having been stored in said image memory and fresh input data and for writing resultant signals in the same memory elements of the image memory for rotations of the antenna; and step for judging whether a pixel to which a sample point i on a first sweep line is allocated does not coincide with any of the pixels to which a plurality of adjacent sample points on the first sweep line $\theta_{n-1}$ and a second sweep line $\theta_n$ are allocated and for determining the sample point i as the last sample point if they are not coincident with each other;

said writing step uses, when a sample point i is judged as the last sample point, data having been obtained at the sample point i for the pixel as the fresh input data.

11. An image data writing method for a radar or like system comprising:

first sample detecting step for judging whether a pixel to which a sample point j on a second sweep line is allocated does not coincide with any of the pixels to which a plurality of adjacent sample points on a first sweep line $\theta_{n-1}$ and the second sweep line $\theta_n$ are allocated and for determining the sample point j as the first sample point if they are not coincident with each other;

step for storing in an memory the maximum value data obtained at sample points for a pixel on the second sweep line;

maximum value data extracting step for writing fresh input data obtained at a sample point j allocated to a pixel and on the second sweep line into said memory if this sample point j is determined as the first sample point, and for writing into said memory data having larger value out of fresh input data obtained at a sample point j or data corresponding to the pixel and previously stored in said memory if this sample point j is not determined as the first sample point for the pixel; and the maximum value data storing uses the data having been obtained at a sample point i as the fresh data when the sample point i is judged as the last sample point for the pixel.

12. A radar or like system comprising:

an image memory for storing signals defined in a Cartesian coordinate system which are converted from corresponding signals defined in a polar coordinate system;

last sample detecting means for judging whether a pixel to which a sample point i on a first sweep line is allocated does not coincide with any of the pixels to which a plurality of adjacent sample points on the first sweep line $\theta_{n-1}$ and a second sweep line $\theta_n$ are allocated and for determining the sample point i as the last sample point if they are not coincident with each other;

pixel dropout detecting means for judging whether the pixels to which the sample points are allocated coincide with a pixel adjacent to the pixel to which the last sample point belongs and positioned between the first and second sweep lines, and for determining that there are no sample points allocated to the adjacent pixel and thus there is a pixel dropout; and interpolation means for providing the dropout pixel with a signal based on signals stored in memory elements corresponding to pixels adjacent to the dropout pixel.

13. A radar or like system comprising:

an image memory for storing signals defined in a Cartesian coordinate system which are converted from corresponding signals defined in a polar coordinate system;

first sample detecting means for judging whether a pixel to which a sample point j on a second sweep line is allocated does not coincide with any of the pixels to which a plurality of adjacent sample points on a first sweep line $\theta_{n-1}$ and the second sweep line $\theta_n$ are allocated and for determining the sample point j as the first sample point if they are not coincident with each other;

pixel dropout detecting means for judging whether the pixels to which the sample points are allocated coincide with a pixel adjacent to the pixel to which the first sample point belongs and positioned between the second and first sweep lines, and for determining that there are no sample points allocated to the adjacent pixel and thus there is a pixel dropout; and interpolation means for providing the dropout pixel with a signal based on signals stored in memory elements corresponding to pixels adjacent to the dropout pixel.

14. A radar or like system as defined in claim 12 wherein the interpolation means provides the dropout pixel with a signal based on signals stored in memory elements corresponding to pixels adjacent to and positioned in a rotating direction of the antenna.

15. A radar or like system comprising:

a primary memory for storing received data in real time;

coordinate converting means for converting a point defined in a polar coordinate system to a corresponding point defined in a Cartesian coordinate system;

an image memory with a memory element corresponding to the resultant point converted by said coordinate converting means and defined in a Cartesian coordinate system being accessed;

an indicator for indicating the data output from said image memory;

last sample detecting means for judging whether a pixel to which a sample point i on a first sweep line is allocated does not coincide with any of the pixels to which a plurality of adjacent sample points on the first sweep line $\theta_{n-1}$ and a second sweep line $\theta_n$ are allocated and for determining the sample point i as the last sample point if they are not coincident with each other;

pixel dropout detecting means for judging whether the pixels to which the sample points are allocated coincide with a pixel adjacent to the pixel to which the last sample point belongs and positioned between the first and second sweep lines, and for determining that there are no sample points allocated to the adjacent pixel and thus there is a pixel dropout; and interpolation means for providing the dropout pixel with a signal based on signals stored in memory elements corresponding to pixels adjacent to the dropout pixel.

16. A data interpolation method for a radar or like system comprising:

step for converting signals defined in a polar coordinate system to signals defined in a Cartesian coordinate system and storing resultant converted signals in an image memory;

step for judging whether a pixel to which a sample point i on a first sweep line is allocated does not coincide with any of the pixels to which a plurality of adjacent sample points on the first sweep line $\theta_{n-1}$ and a second sweep line $\theta_n$ are allocated and for determining the sample point i as the last sample point if they are not coincident with each other;

step for judging whether the pixels to which the sample points are allocated coincide with a pixel adjacent to the pixel to which the last sample point belongs and positioned between the first and second sweep lines, and for determining that there are no sample points allocated to the adjacent pixel and thus there is a pixel dropout; and step for providing the dropout pixel with a signal based on signals stored in memory elements corresponding to pixels adjacent to the dropout pixel.

17. A data interpolation method for a radar or like system comprising:

step for converting received signals defined in a polar coordinate system to signals defined in a Cartesian coordinate system and storing resultant converted signals in an image memory;

step for judging whether a pixel to which a sample point j on a second sweep line is allocated does not coincide with any of the pixels to which a plurality of adjacent sample points on a first sweep line $\theta_{n-1}$ and the second sweep line $\theta_n$ are allocated and for determining the sample point j as the first sample point if they are not coincident with each other;

step for judging whether the pixels to which the sample points are allocated coincide with a pixel adjacent to the pixel to which the first sample point belongs and positioned between the second and first sweep lines, and for determining that there are no sample points allocated to the adjacent pixel and thus there is a pixel dropout; and step for providing the dropout pixel with a signal based on signals stored in memory elements corresponding to pixels adjacent to the dropout pixel.

18. A radar or like system comprising:

an image memory for storing signals defined in a Cartesian coordinate system which are converted from corresponding signals defined in a polar coordinate system;

means for drawing a first and a second sweep lines on pixels;

means for detecting the last sample point on the first sweep line for a pixel; and means for performing correlation operation on the data having been stored in said image memory means and fresh input data when the last sample point is detected and for rewriting resultant correlation signals in the same memory element of the image memory means corresponding to the pixel for rotations of the antenna.

19. A radar or like system comprising:

an antenna rotating at substantially constant speed, transmitting successively search signals and receiving echo signals in a direction corresponding to a second sweep line;

an image memory for storing signals defined in a Cartesian coordinate system which are converted from corresponding signals defined in a polar coordinate system;

means for drawing a first and the second sweep lines on pixels;

means for detecting the first sample point on the second sweep line for a pixel;

means for generating fresh data for the pixel when the first sample point is detected;

means for detecting the last sample point on the first sweep line for a pixel;

means for performing correlation operation on the data having been stored in said image memory means and fresh data when the last sample point is detected and for rewriting resultant correlation signals in the same memory element of the image memory means corresponding to the pixel for rotations of the antenna; and an indicator for displaying the data output from said image memory.

20. A radar or like system comprising:

an antenna rotating at substantially constant speed, transmitting successively search signals and receiving echo signals in a direction corresponding to a second sweep line;

an image memory for storing signals defined in a Cartesian coordinate system which are converted from corresponding signals defined in a polar coordinate system;

means for drawing a first and the second sweep lines on pixels;

means for detecting the first sample point on the second sweep line for a pixel;

means for generating fresh data for the pixel when the first sample point is detected;

means for detecting the last sample point on the first sweep line for a pixel;

means for performing correlation operation on the data having been stored in said image memory means and fresh data when the last sample point is detected and for rewriting resultant correlation signals in the same memory element of the image memory means corresponding to the pixel for rotations of the antenna;

means for detecting a dropout pixel which is adjacent to the pixel to which the last sample point belongs when the last sample is detected;

means for providing an interpolation signal with the dropout pixel and writing the signal into a memory elements of said image memory; and an indicator for displaying the data output from said image memory.

* * * * *